(12) United States Patent
Ogita

(10) Patent No.: US 9,658,767 B2
(45) Date of Patent: May 23, 2017

(54) INFORMATION PROCESSING DEVICE

(75) Inventor: Takeshi Ogita, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 811 days.

(21) Appl. No.: 13/568,586

(22) Filed: Aug. 7, 2012

(65) Prior Publication Data
US 2013/0093680 A1 Apr. 18, 2013

Related U.S. Application Data

(60) Provisional application No. 61/547,826, filed on Oct. 17, 2011.

(51) Int. Cl.
| | |
|---|---|
| *G06F 3/041* | (2006.01) |
| *G09G 5/00* | (2006.01) |
| *G06F 3/0488* | (2013.01) |
| *G06F 1/16* | (2006.01) |
| *H01Q 1/22* | (2006.01) |
| *H01Q 1/24* | (2006.01) |
| *H01Q 3/24* | (2006.01) |
| *H01Q 21/28* | (2006.01) |

(52) U.S. Cl.
CPC ........ *G06F 3/04886* (2013.01); *G06F 1/1626* (2013.01); *G06F 1/1684* (2013.01); *G06F 3/0418* (2013.01); *G06F 3/04883* (2013.01); *H01Q 1/2266* (2013.01); *H01Q 1/243* (2013.01); *H01Q 3/24* (2013.01); *H01Q 21/28* (2013.01)

(58) Field of Classification Search
USPC ........................................................ 345/173
See application file for complete search history.

(56) References Cited

U.S. PATENT DOCUMENTS 8,698,764 B1\* 4/2014 Karakotsios .......... G06F 1/1692
345/173
2006/0197750 A1 9/2006 Kerr et al.
2007/0285401 A1\* 12/2007 Ohki ..................... G06F 1/1616
345/173
2009/0244011 A1 10/2009 Ching
(Continued)

FOREIGN PATENT DOCUMENTS

| EP | 2 133 778 A2 | 12/2009 |
|---|---|---|
| EP | 2 175 344 A2 | 4/2010 |
| JP | 2008-027183 | 2/2008 |

OTHER PUBLICATIONS

Extended European Search Report issued Jan. 28, 2013 in Patent Application No. 12184250.4.

*Primary Examiner* — Jennifer Mehmood
*Assistant Examiner* — Carl Adams
(74) *Attorney, Agent, or Firm* — Oblon, McClelland, Maier & Neustadt, L.L.P.

(57) ABSTRACT

A mobile communication terminal that includes a display panel; a first touch panel provided on a surface of the display panel; a second touch panel provided on at least one surface of the mobile communication terminal other than the surface of the display panel; and a controller that controls the display panel based on at least one of a size and number of contacts corresponding to a touch input detected at the second touch panel.

7 Claims, 30 Drawing Sheets

(56) References Cited

U.S. PATENT DOCUMENTS

| | | | |
|---|---|---|---|
| 2009/0256809 A1* | 10/2009 | Minor | G06F 3/03547 345/173 |
| 2009/0303200 A1 | 12/2009 | Grad | |
| 2010/0085317 A1 | 4/2010 | Park et al. | |
| 2010/0103136 A1* | 4/2010 | Ono | G06F 3/0488 345/173 |
| 2011/0074692 A1* | 3/2011 | Causey | G06F 3/0216 345/169 |
| 2011/0199307 A1 | 8/2011 | Dinh et al. | |
| 2011/0242138 A1 | 10/2011 | Tribble | |
| 2012/0117506 A1* | 5/2012 | Koch | G06F 3/04886 715/773 |
| 2012/0235919 A1* | 9/2012 | Earnshaw | G06F 3/0213 345/169 |

* cited by examiner

FIG. 28

|  | INDEX FINER | THUMB |
|---|---|---|
| BUTTON SIZE | >13 mm | >14 mm |
| NON-HOLDING STATE | O |  |
| LAPTOP HOLDING STATE | O |  |
| BOTH-HAND HOLDING STATE |  | O |
| RIGHT-HAND HOLDING STATE |  | O |
| LEFT-HAND HOLDING STATE |  | O |
| PALM HOLDING STATE | O |  |

INFORMATION PROCESSING DEVICE

CROSS REFERENCE TO RELATED APPLICATION

The present application claims the benefit of the earlier filing date of U.S. Provisional Patent Application Ser. No. 61/547,826 filed on Oct. 17, 2011, the entire contents of which is incorporated herein by reference.

BACKGROUND

Field of the Disclosure

The present disclosure relates to a mobile information terminal having a touch panel device that can detect a touch or proximity of an external conductor such as a finger of a user by detecting, for example, a change in capacitance or the like.

Description of Related Art

Conventional mobile information terminals having a touch panel display a virtual keyboard and numeric keypad on a display screen. These mobile information terminals can recognize a key selected by the user from the keyboard or numeric keypad by detecting a user input made through the touch panel.

FIG. 50 is a schematic front view of a mobile information terminal 101 that has a display panel 102, the screen size of which is large to a certain extent, for example, five inches or more, and also has a touch panel 104, the panel size of which adapts to the screen size. In the example in FIG. 50, one of the shorter edges of the rectangular case of the mobile information terminal 101 is held with the right hand 105R of the user and the other edge is held with the left hand 105L.

When an external conductor such as a finger of a user touches or is brought close to the touch panel 104 of the mobile information terminal 101, the touch panel 104 can detect a change in capacitance, which is caused when the conductor touches or is brought close to the touch panel 104, and can also detect a position at which the capacitance has changed as coordinates. The display panel 102 can display various types of information on its screen; in the example in FIG. 50, a virtual keyboard such as a so-called QWERTY keyboard 103Q is displayed. Although the touch panel 104 can detect not only the touch of the external conductor but also its proximity; only the representation of the touch will be used in the description below to avoid explanation from becoming complex.

When, in the example in FIG. 50, the touch of the user's finger or the like is detected by the display panel 102, if the position at which the touch has been detected corresponds to a key button of the keyboard 103Q, the mobile information terminal 101 recognizes that the key button has been pressed (selected) by the user. That is, the mobile information terminal 101 displays the virtual keyboard 103Q on the display panel 102; when the user touches a desired key button on the keyboard 103Q, the mobile information terminal 101 accepts a character or the like corresponding to the key button.

As another example of a mobile information terminal having a display panel and a touch panel, an information processing device described in Japanese Unexamined Patent Application Publication No. 2008-27183 (PTL 1) is known. The information processing device described in this patent literature has a substantially rectangular, flat case having a main front part, the size of the case being such that it can be held with one hand. The case of the information processing device has a first side and a second side that are disposed across the main front part. In addition, the main front part of the information processing device has a full-screen liquid crystal touch panel formed by a liquid crystal display and a capacitive touch panel, and the first and second sides each have a sheet-shaped pressure-sensitive sensor that can senses a pressure distribution made by a user's finger on a planar area. The sheet-shaped pressure-sensitive sensors disposed on the first and second sides are provided to detect whether the information processing device is held with the right hand or left hand of the user. If the information processing device detects, from an output from the relevant pressure-sensitive sensor, that the user is holding the device with the right hand, the information processing device displays a user interface optimized for the right hand; if the information processing device detects that the user is holding the device with the left hand, the information processing device displays a user interface optimized for the left hand. The pressure-sensitive sensor may be replaced with a photosensor.

SUMMARY

The pressure-sensitive sensors described in the above patent literature are dedicated sensors used to sense whether the user is holding the information processing device with the right hand or left hand. That is, these sensors are not used other than for sensing whether the user is holding the information processing device with the right hand or left hand.

If dedicated sensors such as the above pressure-sensitive sensors are separately provided only for detecting whether the user is holding the device with the right hand or left hand, however, the manufacturing cost of the above information processing device is undesirably increased.

As described above, the pressure-sensitive sensors described in the above patent literature are disposed on the first and second sides of the information processing device. If, for example, the user holds the information processing device without touching the first or second side, therefore, the information processing device cannot determine the state in which the user is holding the terminal. As holding states in which the user holds the device, not only the holding state in which the user's hand touches a side of the device but also other various holding states can be considered. In the conventional method of detecting a holding state by using the above pressure-sensitive sensors, however, only holding states in which the user's hand touches a side of the device can be detected and other various holding states cannot be detected at all.

Furthermore, when the user touches the above keyboard or the like displayed on the screen of the display panel with a finger, for example, not only a case in which the user touches with, for example, an index finger but also a case in which the user touches with, for example, a thumb can be considered. However, the above conventional information processing device cannot determine whether a finger with which the user attempts to make an input is, for example, an index finger or a thumb. Accordingly, it cannot be necessarily said that the user interface screen displayed on the display panel is optimized.

Accordingly, the inventor recognizes the possibility that a mobile information terminal having various functions such as a function of displaying a user interface screen can achieve optimum functions for various holding states in which, for example, the user holds the mobile information terminal, without increasing the cost.

A mobile information terminal according to an embodiment of the present invention includes a display panel; a first touch panel provided on a surface of the display panel; a second touch panel provided on at least one surface of the mobile communication terminal other than the surface of the display panel; and a controller that controls the display panel based on at least one of a size and number of contacts corresponding to a touch input detected at the second touch panel.

That is, according to an embodiment of the present disclosure, it is possible to control prescribed functions of the terminal according at least to the area of contact detecting areas at the contacts of external conductors with the rear touch panel and to the number of these contact detecting areas.

According to an embodiment of the present disclosure, since prescribed functions of the terminal are controlled according at least to the area of contact detecting areas at the contacts of external conductors with the rear touch panel and to the number of these contact detecting areas, a mobile information terminal having various functions such as a function of displaying a user interface screen can achieve optimum functions for various holding states when, for example, the user holds the mobile information terminal, without increasing the cost.

BRIEF DESCRIPTION OF DRAWINGS

FIG. 25 illustrates a direction in which the touch panel is scanned and the level of a touch detection signal detected by the scan when a touch is actually made by a finger or the like.

FIG. 28 illustrates a relationship between each holding state and the button sizes of keys optimized for the sizes of fingers used according to the holding state.

DETAILED DESCRIPTION

An advanced mobile information terminal that has a display panel, the screen size of which is large to a certain extent, for example, five inches or more, and also has a capacitive touch panel, the panel size of which adapts to the screen size, will be described as an embodiment of the present disclosure with reference to the drawings, together with embodiments of an operation control method for the mobile information terminal, an operation control program for the mobile information terminal, and a recording medium on which the operation control program is stored.
[Schematic Block Structure of a Mobile Information Terminal in this Embodiment]

Figure 1:
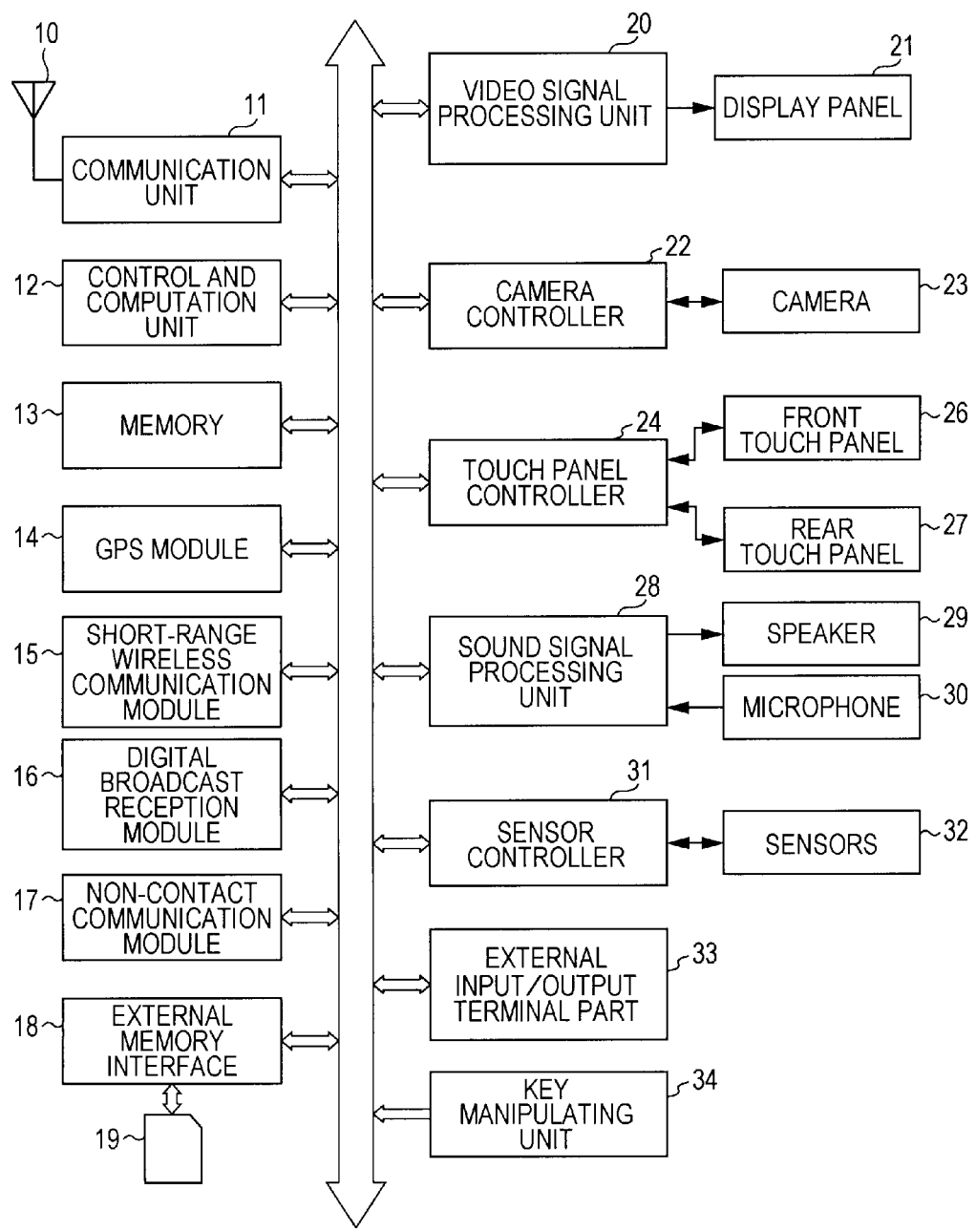
FIG. 1 is a block diagram that schematically shows an example of the internal structure of an advanced mobile information terminal according to an embodiment of the present disclosure.

FIG. 1 is a block diagram that schematically shows an example of the internal structure of an advanced mobile information terminal according to this embodiment.

In FIG. 1, the communication antenna 10 is, for example, a built-in antenna, which transmits and receives calls, e-mail, and radio signals used to download programs and connect to the Internet and other networks through a mobile telephone network or public wireless communication network. The communication unit 11, which includes an antenna circuit and a transmission and reception circuit, converts the frequencies of signals transmitted and received through the mobile telephone network or public wireless communication network, and modulates and demodulates these signals. In this embodiment, programs acquired through the communication antenna 10 and communication unit 11 include an operation control program in this embodiment; these programs will be described later in detail. The operation control program in this embodiment is a program that executes display control to achieve an interface based on touch detection outputs from a front touch panel 26 and a rear touch panel 27, which will be described later, camera control, sound output control, antenna control, and other types of control. Parts of the operation control program may be included in a display application program, a camera application program, a sound application program, a communication application program, and the like. Alternatively, the operation control program may be separately provided.

The speaker 29, disposed in the mobile information terminal in this embodiment, is used to, for example, reproduce music, output a received call, and output a ringer tone. The speaker 29 used to reproduce music is divided into two speakers of two channels (L and R channels) at the left and right. If the mobile information terminal has a rectangular case, for example, the L-channel speaker is disposed near the left-side shorter edge of the rectangular case and the R-channel speaker is disposed near the right-side shorter edge. The microphone 30 is used to, for example, collect external sound and sound to be transmitted. The microphone 30 may also be divided into two microphones of two channels at the left and right (L and R channels). If the mobile information terminal has a rectangular case, for example, the L-channel microphone may be disposed near the left-side shorter edge of the rectangular case and the R-channel speaker may be disposed near the right-side shorter edge. The sound signal processing unit 28 includes an amplifying circuit for the speaker 29, an amplifying circuit for the microphone 30, a decompressing and decoding circuit that decompresses and decodes compressed and coded sound data supplied from a control and computation unit 12, which will be described later, a digital-analog converting circuit that converts digital sound data, which has been decompressed and decoded, to an analog sound signal, an analog-digital converting circuit that converts an analog sound signal entered from the microphone 30 to a digital sound signal, and a compressing and coding circuit that compresses and codes the digital sound signal.

The key manipulating unit 34 includes hard keys provided on the case of the mobile information terminal in this embodiment and its peripheral circuits. The key manipulating unit 34 converts a manipulation input generated when the user manipulates a hard key to an electric signal, amplifies the manipulation input signal, converts the amplified signal from analog to digital, and sends the manipulation input data, which has been converted from analog to digital, to the control and computation unit 12. The key manipulating unit 34 in this embodiment may include a shutter key used at the time of photography by a camera 23, which will be described later, and also includes other various types of keys usable to a digital camera for a zoom operation, exposure setting, shutter speed setting, and other operations, as necessary.

The external memory interface 18 includes an interface circuit used for external memory data communication and an external memory slot into which an external memory 19 formed with a semiconductor storage medium or another memory is inserted and from which it is removed. The mobile information terminal in this embodiment can acquire various types of data and various types of programs through a storage medium, such as the external memory 19, inserted into the external memory interface 18. The various types of programs acquired through the external memory 19 include the operation control program in this embodiment and various types of application programs.

The external input/output terminal part 33 includes a cable connection connector and an external data communication interface circuit that are used for, for example, data communication through a cable and also includes charging terminals used to charge an internal battery through a power supply cable or the like and its charging interface circuit. The mobile information terminal in this embodiment can acquire various types of data and various types of programs from an external unit connected to the external input/output terminal part 33. The various types of programs acquired through the external input/output terminal part 33 include the operation control program in this embodiment, which will be described later, and various types of application programs. The operation control program in this embodiment may be prerecorded on a disk-like recording medium or another type of recording medium. In this case, the operation control program may be read out from the recording medium by a recording medium reproducing unit of, for example, a personal computer and may be then supplied to the external input/output terminal part 33. Of course, a recording medium reproducing unit may be directly connected to the external input/output terminal part 33 and the operation control program read out by the reproducing unit may be supplied to the mobile information terminal in this embodiment.

The short-range wireless communication module 15 includes a communication antenna intended for short-range wireless radio waves based on a wireless LAN or Bluetooth (Bluetooth: registered trademark) and a short-range wireless communication circuit. The operation control program in this embodiment may be acquired through the short-range wireless communication module 15.

The digital broadcast reception module 16 includes a reception antenna and a tuner, which are used for, for example, so-called digital television broadcasting or digital radio broadcasting. The digital broadcast reception module 16 can receive not only one channel of digital broadcasts but also a plurality of channels of digital broadcasts simultaneously. The digital broadcast reception module 16 can also receive data superimposed on digital broadcasts. Digital broadcast data received by the digital broadcast reception module 16 can be, for example, compressed by the control and computation unit 12 and can then be stored in a memory 13 or the like. The operation control program in this embodiment may be broadcasted as one piece of the digital broadcast data. In this case, the operation control program is extracted from the digital broadcast data received by the digital broadcast reception module 16 and is then stored in the mobile information terminal in this embodiment.

The non-contact communication module 17 performs so-called radio frequency-identification (RFID) though a non-contact communication antenna or non-contact communication carried out by using a non-contact IC card or the like. The operation control program in this embodiment may be acquired through the non-contact communication module 17.

The global positioning system (GPS) module 14, which has a GPS antenna, uses GPS signals sent from GPS geodetic satellites to obtain the latitude and longitude of the current position of the mobile information terminal. The GPS data (information representing the latitude and longitude) obtained by the GPS module 14 is sent to the control and computation unit 12. Thus, the control and computation unit 12 can know the current position of the mobile information terminal and its movement.

The sensors 32 include an acceleration sensor, inclination sensor, direction sensor, temperature sensor, humidity sensor, and illuminance sensor, for example.

The sensor controller 31 obtains acceleration, inclination, direction, temperature, humidity, and illuminance, for example, from output signals supplied from the sensors 32. The sensor controller 31 also includes sensor drivers that control the operations of the sensors 32.

The camera 23 includes an imaging sensor used to photograph a still picture or moving picture, an optical system for forming an image of a subject on the imaging sensor, an auto focus mechanism that drives the lens of the optical system for auto focusing, an auto iris mechanism that drives the iris of the optical system to carry out auto iris adjustment, a shutter speed adjustment mechanism that mechanically or electronically adjusts shutter speed, an image stabilizing mechanism control that corrects so-called blur, a lamp or the like that emits photograph fill light, and a driving circuit that drives these mechanisms. The optical system of the camera 23 may include an optical zoom mechanism. The camera 23 may include two optical systems at the right and left so that so-called three-dimensional (3D) images can be photographed. If, for example, the mobile information terminal has a rectangular case, a left-side optical system may be provided near the shorter edge on the left side of the rectangular case and a right-side optical system may be provided near the shorter edge on the right side.

The camera controller 22 controls various operations at the time of photography by the camera 23; for example, the camera controller 22 performs imaging operation control for the imaging sensor in the camera 23, driving control for the lens of the optical system, auto focus control for auto focusing, auto iris control, shutter speed control, the image stabilizing mechanism, light emitting control for photograph fill light. If the camera 23 includes two optical systems at the right and left, as described above, that enable 3D images to be photographed, the camera controller 22 can control these two optical systems. In this embodiment, the camera controller 22 creates image data used for a display purpose from imaging signals supplied from the imaging sensor of the camera 23, and supplies the imaging data to a video signal processing unit 20. In this embodiment, it is also possible to send the image data created by the camera controller 22 to the control and computation unit 12 to compress the image data, and send the compressed image data to the memory 13 or the external memory 19 connected to the external memory interface 18 to store the compressed image data therein.

The video signal processing unit 20 performs, for example, a decompressing and decoding process by which compressed and coded video data supplied from the control and computation unit 12 is decompressed and decoded, a process by which the digital video data that has been decompressed and decoded or digital broadcast video data received by the digital broadcast reception module 16 is displayed on a display panel 21, and a process by which a reproduced image read out from the memory 13 or the like is displayed on the display panel 21. The video signal processing unit 20 also creates video signals used to display desktop images, various menu images, character input screens, photo images, composite images, virtual key images, virtual button images, and the like, which are supplied from the control and computation unit 12, and displays these images on the display panel 21. When a 3D image is photographed by the camera 23, the video signal processing unit 20 also executes a process by which the 3D image is displayed on the display panel 21. The display panel 21 is a liquid crystal panel, an organic electroluminescence (EL) panel, or the like. The display panel 21 enables so-called auto-stereoscopic 3D display as a function of displaying the 3D image.

The front touch panel 26, which is disposed on the front of the display panel 21, has a sensor that is large enough to cover the substantially entire surface of the display panel. The front touch panel 26 is structured so that a plurality of transparent electrode patterns are arranged on a panel surface, which is made of transparent sensor glass, in the X and Y directions. Each of the plurality of transparent electrode patterns detects a change in capacitance so that the front touch panel 26 can detect the fact that at least one external conductor, such as a finger of a user, has touched or has been brought close to the panel surface and can output information about X and Y coordinates on the panel surface at which the at least one external conductor has touched or has been brought close to the panel surface. Although the front touch panel 26 and the rear touch panel 27, which will be described later, can detect not only the touch of the external conductor but also its proximity; only the representation of the touch will be used in the description below to avoid explanation from becoming complex.

The rear touch panel 27 is disposed on the rear of the case, opposite to the front of the case on which the display panel 21 is disposed. The rear touch panel 27 is structured so that a plurality of transparent electrode patterns are arranged on a panel surface, which is made of transparent sensor glass, in the X and Y directions. Each of the plurality of transparent electrode patterns detects a change in capacitance so that the rear touch panel 27 can detect the fact that at least one external conductor, such as a finger of a user, has touched the panel surface and can output information about X and Y coordinates on the panel surface at which the at least one external conductor has touched the panel surface. Although the rear touch panel 27 may have the same size as, for example, the front touch panel 26, or may be smaller or larger than the front touch panel 26, the rear touch panel 27 is large enough for the holding state to be decided when the user holds the mobile information terminal with, for example, a hand, as will be described below.

In addition to the front touch panel 26 and rear touch panel 27, the mobile information terminal in this embodiment may have side touch panels, as described below, which are attached to sides of the case.

The touch panel controller 24 controls the operation and scanning of the front touch panel 26 and rear touch panel 27, decides the fact that an external conductor has touched the front touch panel 26 or rear touch panel 27 according to the capacitance detected by the front touch panel 26 or rear touch panel 27 and the information about the X and Y coordinate positions, computes the position of the touch, the size of the external conductor that has touched, a distance of an approach when, for example, the conductor has approached the panel surface, and calculates the duration of the touch, a time interval at which a touch or like has been detected, a direction in which the external conductor has moved while touching, a speed at which the external conductor has moved while touching, the trace of the movement, and the like. The touch panel controller 24 then sends data obtained from the detection, computation, and calculation to the control and computation unit 12. If the mobile information terminal in this embodiment has side touch panels as well, the touch panel controller 24 controls the operation and scanning of the side touch panels and performs computation and calculation according to the detection output as described above.

The memory 13 includes an internal memory disposed in the terminal and a removable card memory. An example of the removable card memory is a card that stores so-called subscriber identity module (SIM) information and the like. The internal memory includes read only memory (ROM) and random access memory (RAM). The ROM prestores an operating system (OS), a control program used by the control and computation unit 12 to control the individual units, initial settings, dictionary data, predicted character conversion dictionary data, various types of sound data, a text editor, an HTML editor, a mailer, an image editor, programs including the operation control program in this embodiment, and the like. The ROM may be a rewritable ROM such as a NAND-type flash memory or electrically erasable programmable read-only memory (EEPROM); it can store electronic mail data, data of a telephone directory and mail addresses, data of still pictures and moving pictures, user settings, and the like. The RAM stores data at any time, as a work area and buffer area when the control and computation unit 12 carries out various types of data processing.

The control and computation unit 12 includes a central processing unit (CPU). It controls the communication unit 11, video signal processing unit 20, camera controller 22, touch panel controller 24, sound signal processing unit 28, sensor controller 31, GPS module 14, short-range wireless communication module 15, digital broadcast reception module 16, non-contact communication module 17, external memory interface 18, external input/output terminal part 33, key manipulating unit 34, and other units, and carries out computations as necessary. The control and computation unit 12 executes various application programs such as the text editor, HTML editor, mailer, and image editor stored in the memory 13 as well as the operation control program in this embodiment. Although the control and computation unit 12 also controls displays and the like, which are provided on the display panel 21 according to the detection information from the front touch panel 26 and rear touch panel 27, by executing the operation control program according to this embodiment, the flow of a process in this control will be described later.

In addition, the mobile information terminal in this embodiment of course includes a clock that measures a time and a time of the day, a battery that supplies power to individual units, a power management IC that controls the power, and other constituent components included in an ordinary mobile information terminal.

[Schematic Structure of the Mobile Information Terminal in this Embodiment]

Figure 2:
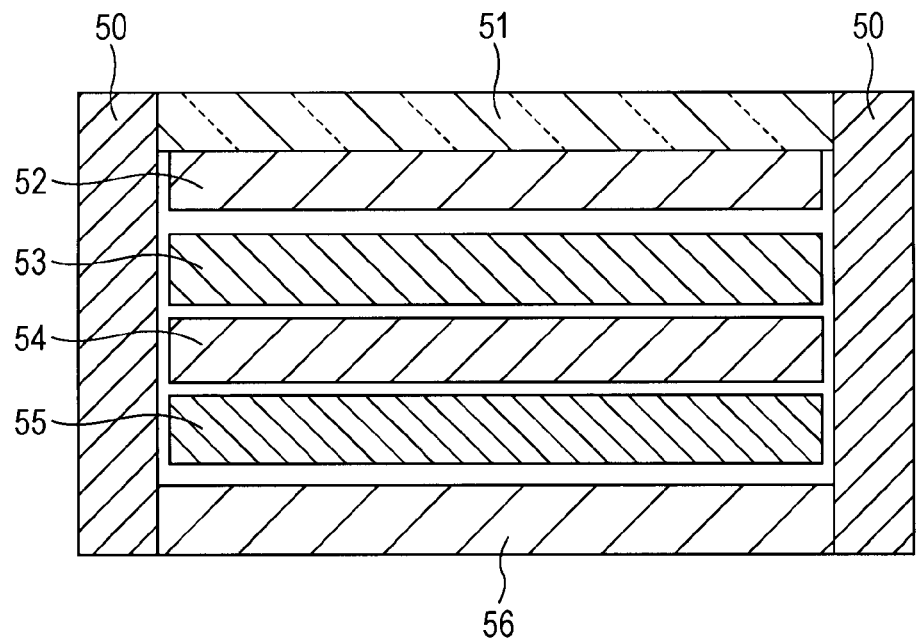
FIG. 2 schematically illustrates the sectional structure of the mobile information terminal in the embodiment of the present disclosure.

FIG. 2 schematically illustrates the sectional structure of the mobile information terminal in the embodiment. Although the structure in FIG. 2 shows only components used to explain the operation in this embodiment, the mobile information terminal in this embodiment of course includes all components provided in an ordinary mobile information terminal besides these components.

In the mobile information terminal in this embodiment, a glass 51 in a flat plate shape is provided on the front side of the terminal, a front touch panel 52 is placed inside the glass 51, and a display panel 53 is further placed inside the front touch panel 52, as shown in FIG. 2. The front touch panel 52 corresponds to the front touch panel 26 in FIG. 1 and the display panel 53 corresponds to the display panel 21 in FIG. 1. A rear touch panel 56 is provided on the rear side of the terminal. The rear touch panel 56 corresponds to the rear touch panel 27 in FIG. 1. A glass similar to the glass 51 on the front side may be provided on the outer surface of the rear touch panel 56.

In the mobile information terminal in this embodiment, a driving circuit and circuit board 54 and a battery 55 are provided in a space between the display panel 53 and the rear touch panel 56. The driving circuit and circuit board 54 includes, on a circuit board, electronic circuits that form the video signal processing unit 20, touch panel controller 24, communication unit 11, control and computation unit 12, memory 13, camera controller 22, sound signal processing unit 28, and other units shown in FIG. 1. The battery 55 includes a secondary battery that supplies electric power to the individual units.

These components are appropriately placed in the case 50 of the mobile information terminal in this embodiment.

[Detection of a Holding State and Interface Examples According to the Detected Holding State]

The mobile information terminal structured as shown in FIGS. 1 and 2 can control a screen display on the display panel 53 and a relationship between objects displayed on the screen of the display panel 53 and a touch detecting area on the front touch panel 26 according to information about the number of external conductors for which touches were detected on the rear touch panel 27 and the sizes of these external conductors as described in the following user interface examples.

First Interface Example

When the mobile information terminal in this embodiment has been placed in an operation mode in which, for example, characters are entered, if areas on each of which a touch was detected on the rear touch panel 27 are of at least a predetermined size and the number of these touch detecting areas of at least the predetermined size is, for example, two or more, the terminal displays a keyboard in a predetermined form (so-called QWERTY keyboard in this example) on the screen of the display panel 21 as a first interface in this embodiment. The predetermined size and the number of touch detecting areas of at least the predetermined size will be described below in detail.

Figure 3:
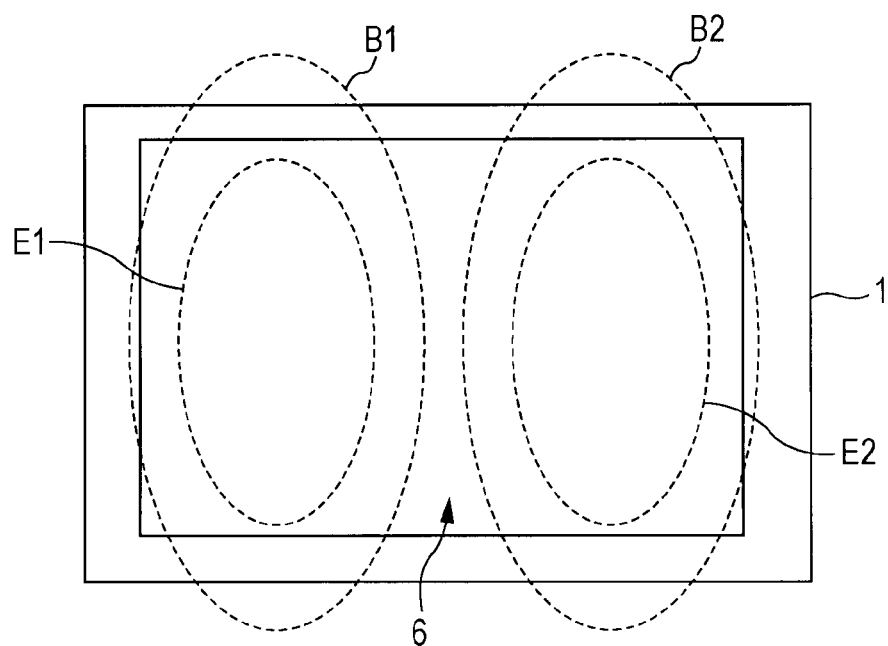
FIG. 3 is a drawing used to explain a touch detecting area detected by a rear touch panel in a first interface.
Figure 4:
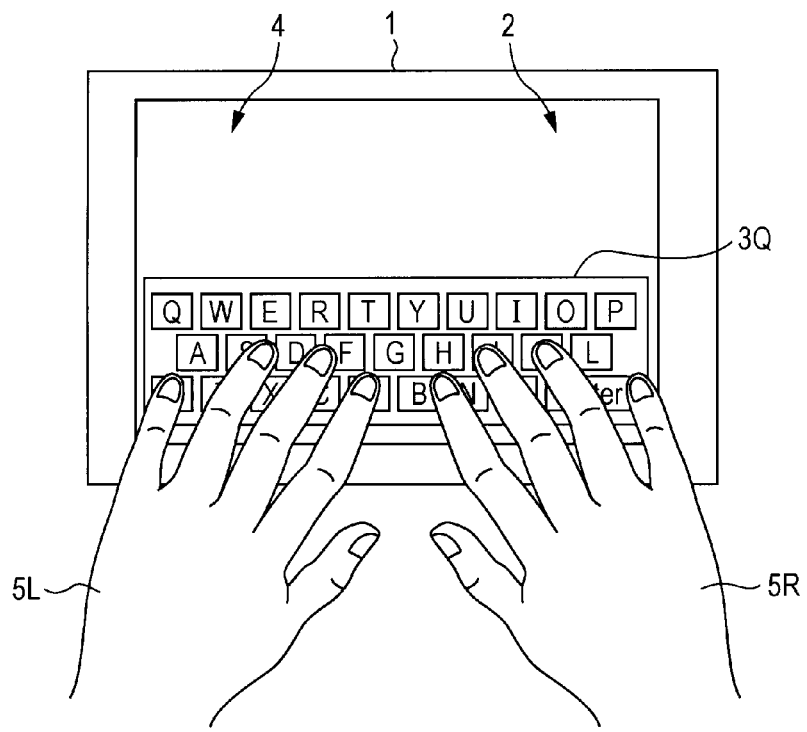
FIG. 4 illustrates an example in which a QWERTY keyboard is displayed on a display panel in the first interface.

If two touch detecting areas E1 and E2 of at least the predetermined size are detected on the panel surface 6 of the rear touch panel 27 as shown in, for example, FIG. 3, the mobile information terminal 1 in this embodiment displays a QWERTY keyboard 3Q including keys, each of which has a size suitable for use when the user enters characters and the like with the five fingers of the right hand 5R of the user and the five fingers of the left hand 5L, on the screen 2 of the display panel 21 as shown in, for example, FIG. 4. At this time, the mobile information terminal 1 in this embodiment associates the key buttons constituting the QWERTY keyboard 3Q with the touch detecting areas on the panel surface 4 of the front touch panel 26. The sizes of the key buttons and the sizes of the touch detecting areas associated with these key buttons will be described later in detail.

Specifically, the state in which the two touch detecting areas E1 and E2 of at least the predetermined size have been detected on the rear touch panel 27 as shown in FIG. 3 can be considered to be, for example, a state in which the mobile information terminal 1 is placed on the right and left thighs B1 and B2 of the user, that is, the mobile information terminal 1 is in a laptop holding state. When the mobile information terminal 1 is in the laptop holding state as shown in FIG. 3, the user can be considered to be able to use freely fingers of both hands 5R and 5L.

Accordingly, when the two touch detecting areas E1 and E2 of at least the predetermined size are detected on the rear touch panel 27 as shown in FIG. 3, the mobile information terminal 1 displays, on the screen 2 of the display panel 21, the QWERTY keyboard 3Q having a size suitable for use when the user enters characters and the like with fingers of the both hands 5R and 5L as shown in FIG. 4.

Thus, the first interface example enables the user to enter characters by using fingers of both hands 5R and 5L to press (that is, touch) desired key buttons of the QWERTY keyboard 3Q.

When the mobile information terminal in this embodiment has been placed in an operation mode in which, for example, characters are entered, even in a non-holding state, in which a touch by the external conductor has not been detected on the rear touch panel 27, the mobile information terminal displays the QWERTY keyboard 3Q on the screen of the display panel 21 as in the case of the first interface. That is, even when the mobile information terminal is placed on a table or the like, the user can enter characters and the like by using fingers of both hands 5R and 5L as described above, so even in the non-holding state, the mobile information terminal in this embodiment displays the QWERTY keyboard 3Q on the screen of the display panel 21.

Second Interface Example

When the mobile information terminal in this embodiment has been placed in an operation mode in which, for example, characters are entered, if all areas on each of which a touch was detected on the rear touch panel 27 are smaller than the predetermined size and the number of touch detecting areas smaller than the predetermined size is, for example, five or more, the terminal divides a QWERTY keyboard into two parts. Then, the mobile information terminal displays one of them in the vicinity of the right edge of the screen of the display panel 21 and also displays the other in the vicinity of the left edge of the screen of the display panel 21 as a second interface of this embodiment. The predetermined size and the number of touch detecting areas smaller than the predetermined size will be described below in detail.

Figure 5:
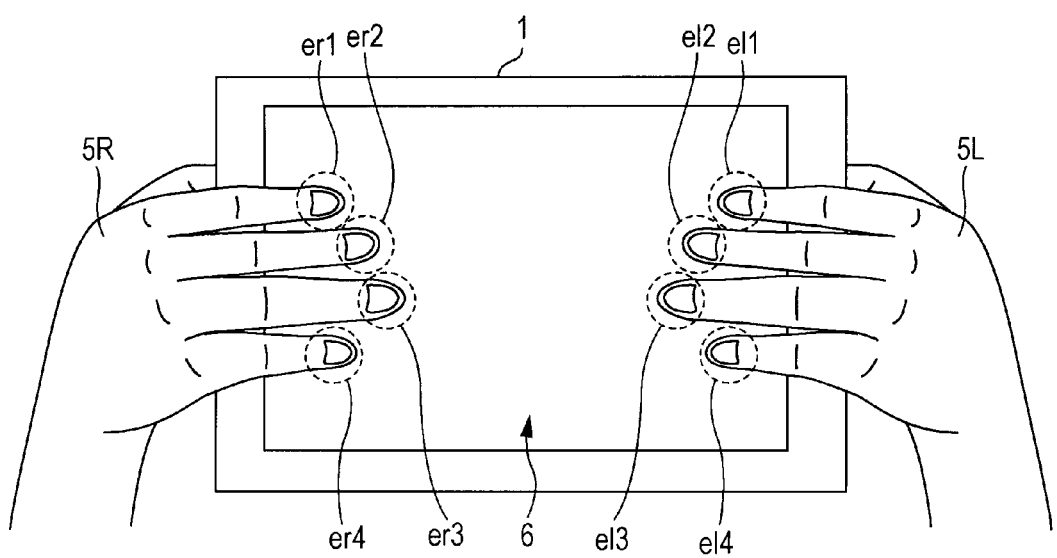
FIG. 5 is a drawing used to explain a touch detecting area detected by the rear touch panel in a second interface.
Figure 6:
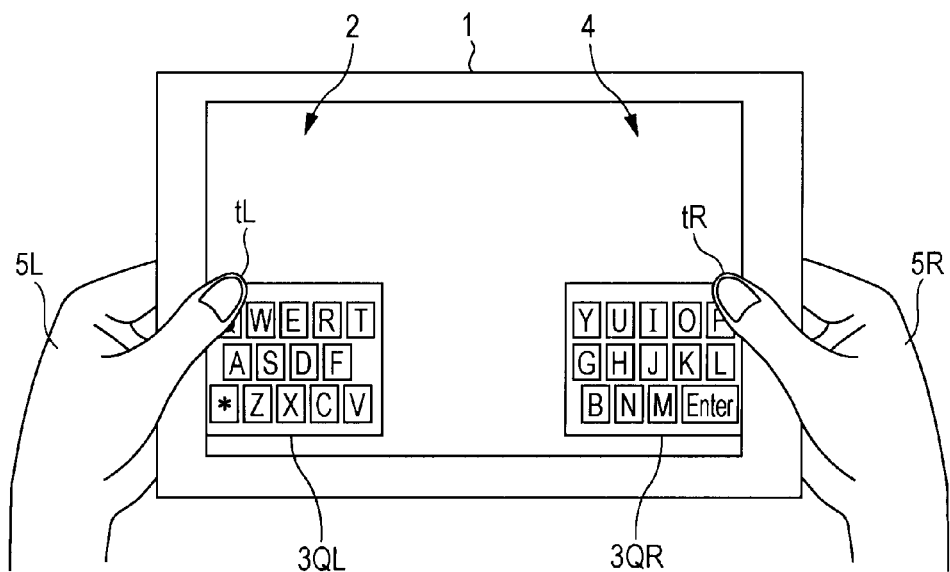
FIG. 6 illustrates an example in which divided QWERTY keyboards are displayed on the display panel in the second interface.

If, for example, all that were detected on the panel surface 6 of the rear touch panel 27 are five or more touch detecting areas smaller than the predetermined size (eight touch detecting areas er1 to er4 and el1 to el4 in the example in FIG. 5) as shown in FIG. 5, the mobile information terminal 1 in this embodiment divides a QWERTY keyboard into two parts as shown in FIG. 6. Then, the mobile information terminal 1 places a divided keyboard 3QR in the vicinity of the right edge of the screen 2 of the display panel 21 and also places the other divided keyboard 3QL in the vicinity of the left edge of the screen 2. The mobile information terminal 1 in this embodiment makes the size of each key button of the divided keyboard 3QR for the right hand and the divided keyboard 3QL for the left hand suitable for use when the user uses the thumb tR of the right hand 5R and the thumb tL of the left hand 5L to enter characters and the like. Furthermore, the mobile information terminal 1 in this embodiment associates the key buttons of the divided keyboard 3QR for the right hand and the divided keyboard 3QL for the left hand with the touch detecting areas on the panel surface 4 of the front touch panel 26. The sizes of the key buttons and the sizes of the touch detecting areas associated with these key buttons will be described later in detail.

Specifically, the state in which the five or more touch detecting areas er1 to er4 and el1 to el4 smaller than the predetermined size have been detected on the rear touch panel 27 as shown in FIG. 5 can be considered to be, for example, a both-hand holding state in which the user holds the mobile information terminal 1 with the right hand 5R and left hand 5L from the right side and left side, that is, a holding state in which the thumb tR of the right hand 5R and the thumb tL of the left hand 5L are both on the same side as the screen 2 of the display panel 21 and the remaining four fingers of the right hand 5R and the remaining four fingers of the left hand 5L are on the same side as the panel surface 4 of the rear touch panel 27. When the mobile information terminal 1 is in the both-hand holding state as shown in FIG. 5, fingers of the user with which the user can touch the panel surface 4 of the front touch panel 26 can be considered to be the thumb tR of the right hand 5R and the thumb tL of the left hand 5L. When the mobile information terminal is held from the right side and left side as shown in FIG. 5, the positions of the thumb tR of the right hand 5R and the thumb tL of the left hand 5L with which the user can touch the screen 2 can be considered to be in the vicinity of the positions at which the terminal is held with the right hand 5R and left hand 5L.

Accordingly, if all that were detected on the panel surface 6 of the rear touch panel 27 are five or more touch detecting areas smaller than the predetermined size as in the example in FIG. 5, the mobile information terminal 1 in this embodiment displays the divided keyboards 3QR and 3QL, the size of which is suitable for use when the user uses the thumb tR of the right hand 5R and the thumb tL of the left hand 5L to enter characters and the like, in the vicinity of the right hand 5R and the left hand 5L on the screen 2 of the display panel 21.

Thus, the second interface example enables the user to enter characters by using the thumb tR of the right hand 5R and the thumb tL of the left hand 5L to press (that is, touch) desired key buttons of the divided keyboards 3QR intended for the right hand and 3QL intended for the left hand.

Figure 7:
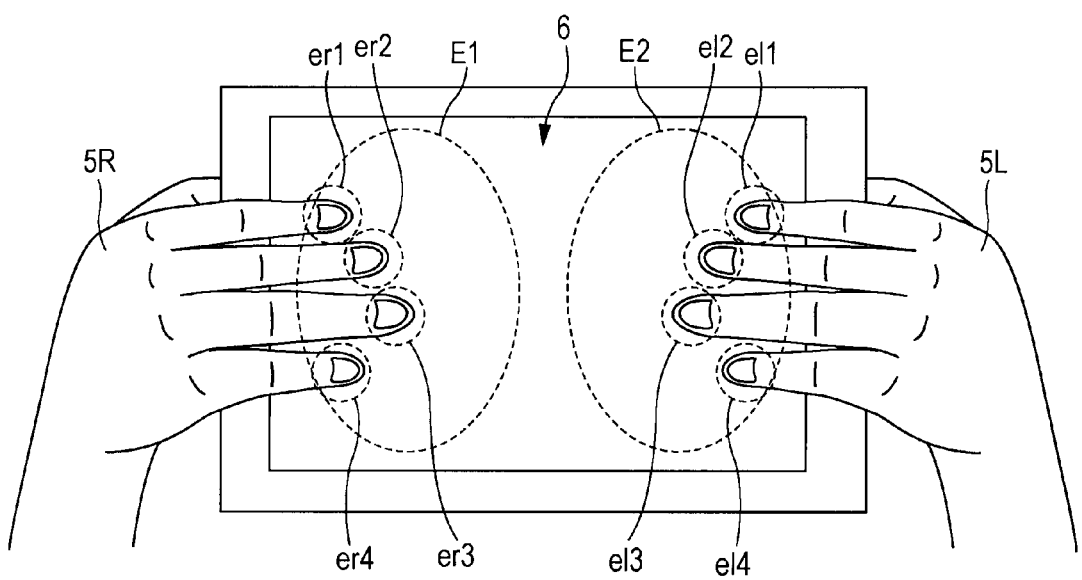
FIG. 7 is a drawing used to explain another example in which a touch detecting area detected by the rear touch panel in the second interface.

Even if, for example, there are two or more touch detecting areas of at least the predetermined size as described in the first interface example above, five or more touch detecting areas smaller than the prescribed size may be further detected as shown in FIG. 7. Then, the mobile information terminal in this embodiment can carry out keyboard display control and touch panel control as in the case of the second interface example. That is, if the mobile information terminal is held with both hands as in the case of the second interface example and is further placed on, for example, the laps of the user, the two touch detecting areas E1 and E2 of at least the prescribed size and five or more touch detecting areas er1 to er4 and el1 to el4 smaller than the prescribed size are detected on the rear touch panel 27, as shown in FIG. 7. Since the holding state in FIG. 7 is the both-hand holding state, however, fingers of the user with which the user can touch the panel surface 4 of the front touch panel 26 can be considered to be only the thumb tR of the right hand 5R and the thumb tL of the left hand 5L. In the example in FIG. 7, therefore, the mobile information terminal in this embodiment can carry out both keyboard display control and touch panel control as in the case of the second interface example.

[Touch Sensitive Position Adjustment Control when the Second Interface is Used]

In the second interface example described above, the mobile information terminal in this embodiment can carry out control so as to appropriately adjust touch sensitive positions, on the front touch panel 26, related to the key buttons on the divided keyboard 3QR intended for the right hand.

Figure 8:
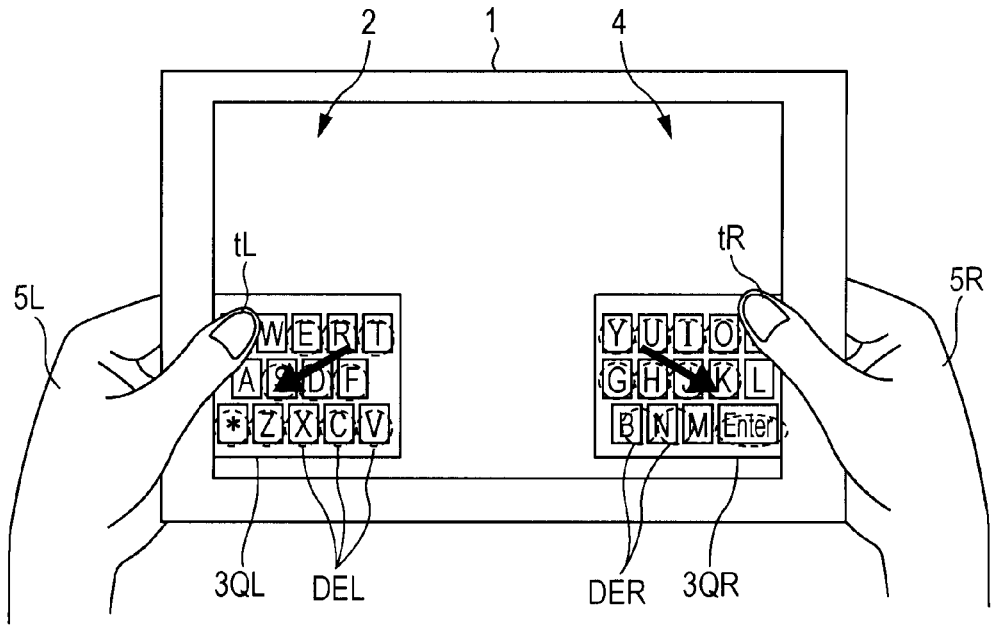
FIG. 8 is a drawing used to explain an example of adjusting a shift of touch sensitive positions corresponding to the keys of the divided keyboards displayed on the display panel in the second interface.

Specifically, the mobile information terminal in this embodiment can carry out adjustment control so that the touch sensitive positions DER, on the front touch panel 26, that correspond to the key buttons on the divided keyboard 3QR intended for the right hand are shifted from the on-screen positions at which the key buttons of the divided keyboard 3QR intended for the right hand are displayed toward the position at which the mobile information terminal is held with the right hand 5R of the user by an amount equal to predetermined coordinates, as indicated by the arrow oriented toward the right hand 5R in FIG. 8. Similarly, the mobile information terminal in this embodiment can carry out adjustment control so that the touch sensitive positions DEL, on the front touch panel 26, that correspond to the key buttons on the divided keyboard 3QL intended for the left hand are shifted from the on-screen positions at which the key buttons of the divided keyboard 3QL intended for the right hand are displayed toward the position at which the mobile information terminal is held with the left hand 5L of the user by an amount equal to predetermined coordinates, as indicated by the arrow oriented toward the left hand 5L in FIG. 8.

Adjustment control of the touch sensitive positions DEL will be described below by using the left hand 5L side as an example.

Figure 9:
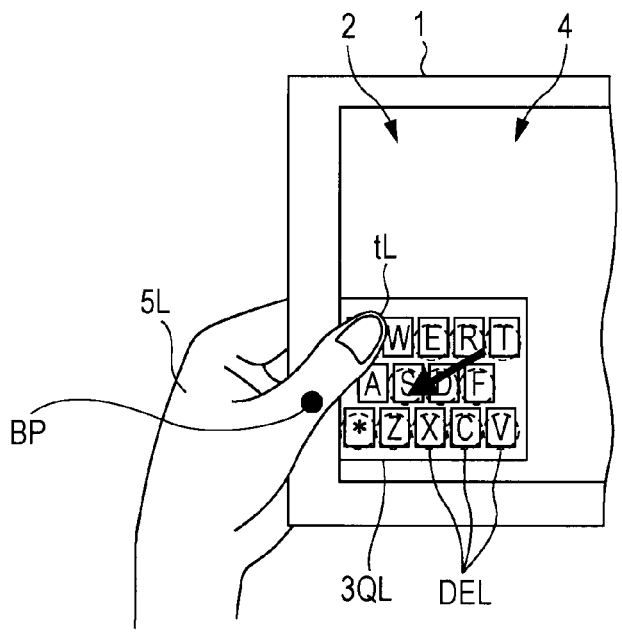
FIG. 9 is a drawing used to explain computation carried out when the shift of the touch sensitive positions corresponding to the keys of the keyboard is adjusted.

The mobile information terminal in this embodiment obtains a holding position at which the user holds the case of the terminal with the left hand 5L as shown in FIG. 9, through a computation, from the positions of the touch detecting areas el1 to el4 smaller than the predetermined size on the panel surface 6 of the rear touch panel 27 as shown in FIG. 5, and also obtains a basal position BP of the thumb tL of the left hand 5L through a computation when the case of the mobile information terminal is held at that holding position.

The mobile information terminal in this embodiment then carries out adjustment control so as to move the touch sensitive positions DEL, on the front touch panel 26, that corresponds to the key buttons on the divided keyboard 3QL intended for the left hand toward the position at which the mobile information terminal is held with the left hand 5L by an amount equal to a predetermined coordinate in the x-axis direction and a predetermined coordinate in the y-direction from an origin of x and y coordinates, the origin being the basal position BP of the thumb tL of the left hand 5L.

Figure 10:
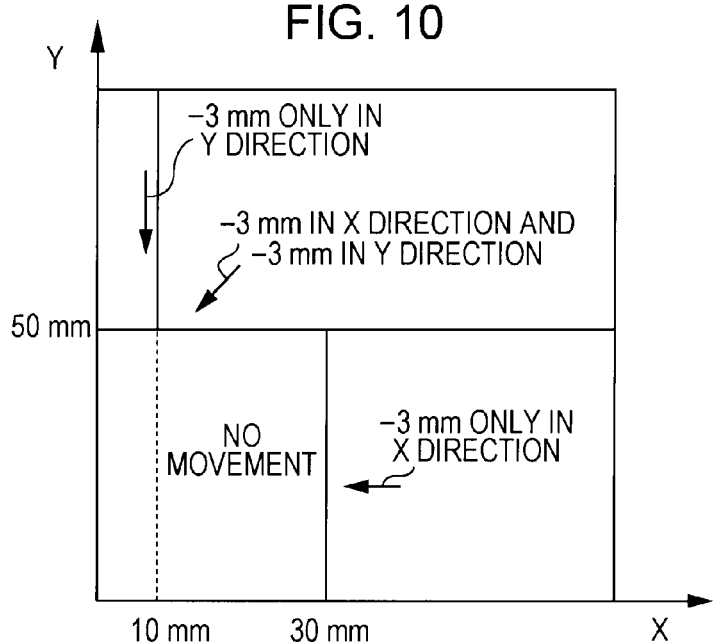
FIG. 10 is a drawing used to explain, in more detail, computation carried out when the shift of the touch sensitive positions corresponding to the keys of the keyboard is adjusted.

To be more specific, for example, as shown in FIG. 10, the mobile information terminal in this embodiment moves the touch sensitive positions DEL corresponding to key buttons located, for example, in a range 30 mm or more apart from the basal position BP, which is taken as the origin coordinates (x, y)=(0, 0), in the x-axis direction and within a range of less than 50 mm from the origin coordinates in the y-axis direction by, for example, −3 mm in the x-axis direction so that these touch sensitive positions can be more easily touched with the thumb tL of the left hand 5L of the user. Furthermore, the mobile information terminal in this embodiment moves the touch sensitive positions DEL corresponding to key buttons located, for example, in a range 10 mm or more apart from the origin coordinates in the x-axis direction and 50 mm or more apart from the origin coordinates in the y-axis direction by, for example, −3 mm in the x-axis direction and −3 mm in the y-axis direction so that these touch sensitive positions can be more easily touched with the thumb tL of the left hand 5L of the user. Furthermore, the mobile information terminal in this embodiment moves the touch sensitive positions DEL corresponding to key buttons located, for example, within a range of less than 10 mm from the origin coordinates in the x-axis direction and in a range 50 mm or more apart from the origin coordinates in the y-axis direction by, for example, −3 mm only in the y-axis direction so that these touch sensitive positions can be more easily touched with the thumb tL of the left hand 5L of the user. The mobile information terminal does not move the touch sensitive positions DEL corresponding to key buttons located, for example, within a range of less than 30 mm from the origin coordinates in the x-axis direction and within a range of less than 50 mm from the origin coordinates in the y-axis direction because there is a risk that these touch sensitive positions may not be easily touched with the thumb tL of the left hand 5L of the user.

Figure 11:
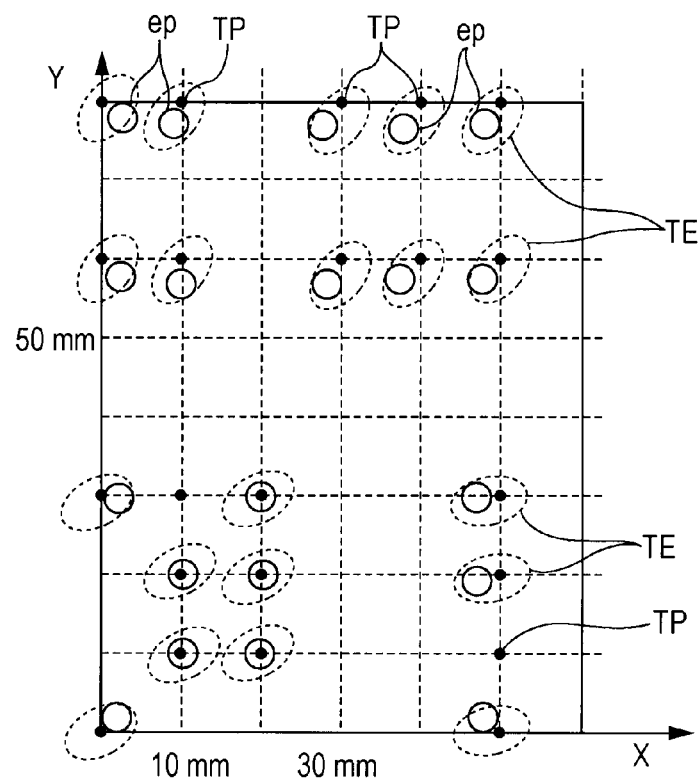
FIG. 11 is a drawing used to explain usefulness of shift adjustment performed for a touch sensitive position according to a displacement between a target touch position and a position at which a touch of a thumb made toward the target touch position was actually detected.

In a case in which the touch sensitive positions DEL in individual ranges have been moved as shown in FIG. 10, FIG. 11 illustrates examples of target touch positions TP that the user intends to touch with the thumb tL of the left hand 5L of the user, touch positions TE that the user actually touched with the thumb tL relative to the target touch positions TP, and detected points ep that were actually detected on the front touch panel 26 from the touch positions TP. As seen from the example in FIG. 11, the actual touch positions TE at which the thumb tL of the left hand 5L of the user actually touched tend to be shifted from their corresponding target touch positions TP in the ranges shown in FIG. 10, so it is found that adjustment control carried out by the mobile information terminal in this embodiment for the touch sensitive positions DEL is effective.

Third Interface Example

When the mobile information terminal in this embodiment has been placed in an operation mode in which, for example, characters are entered, if all areas on each of which a touch was detected on the rear touch panel 27 are smaller than the predetermined size and the number of touch detecting areas smaller than the predetermined size is, for example, four or less, the terminal places and displays a keyboard in a predetermined form (a so-called keyboard having 10 keys) at a location, on the screen of the display panel 21, that corresponds to the positions at which touches were detected on the rear touch panel 27, as a third interface in this embodiment. The predetermined size and the number of touch detecting areas smaller than the predetermined size will be described below in detail.

Figure 12:
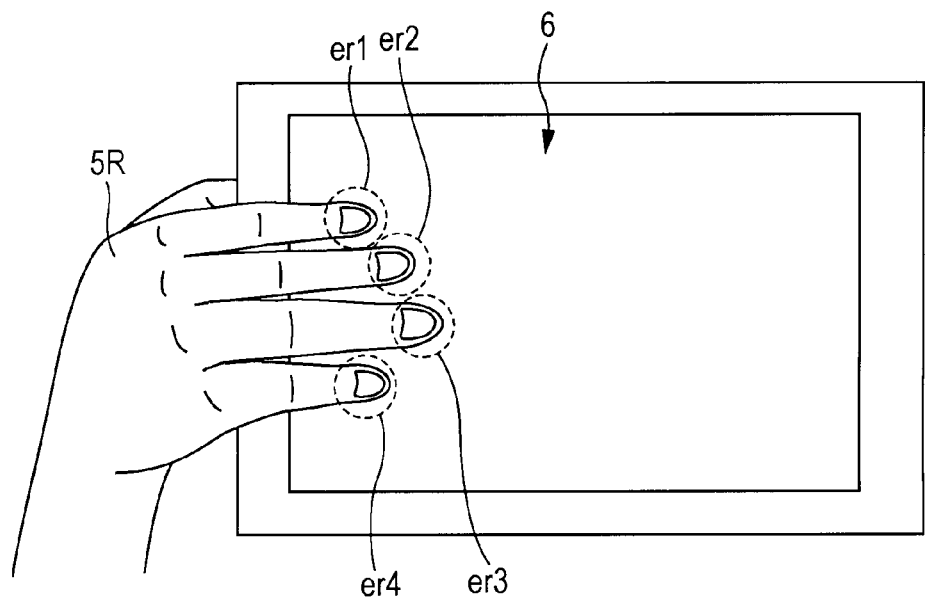
FIG. 12 is a drawing used to explain the touch detecting area detected by the rear touch panel when the mobile information terminal is held with the right hand in a third interface.
Figure 13:
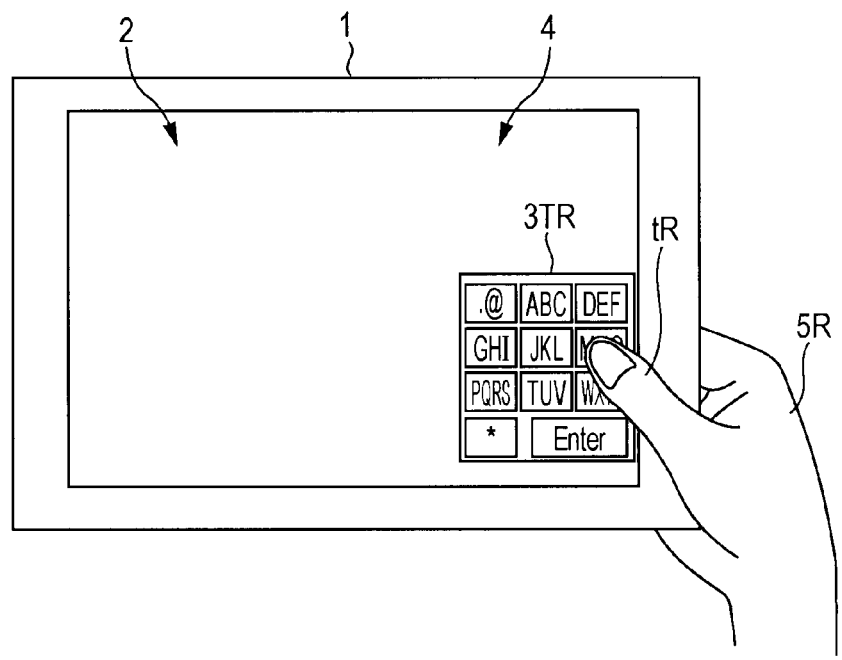
FIG. 13 illustrates an example in which a 10-key keyboard is displayed on the display panel when the mobile information terminal is held with the right hand in the third interface.

If, for example, as shown in FIG. 12, all that were detected on the panel surface 6 of the rear touch panel 27 are at most four touch detecting areas smaller than the predetermined size (four touch detecting areas er1 to er4 in the example in FIG. 12) and these touch detecting areas er1 to er4 are located in the vicinity of the right edge when viewed from the same side as the screen 2 of the display panel 21, the mobile information terminal 1 in this embodiment places a 10-key keyboard 3TR used to enter alphabetical characters as shown in, for example, FIG. 13 at a location, in the vicinity of the right edge of the display panel 21, that corresponds to the areas in which touches were detected on the rear touch panel 27. The mobile information terminal 1 in this embodiment makes the size of each key button of the 10-key keyboard 3TR suitable for use when the user enters characters and the like with the thumb. Furthermore, the mobile information terminal 1 in this embodiment associates the keys constituting the 10-key keyboard 3TR with the touch detecting areas on the panel surface 4 of the front touch panel 26. The size of each key button and the size of the touch detecting area associated with the key button will be described below in detail.

Specifically, the state in which the at most four touch detecting areas er1 to er4 smaller than the predetermined size are detected on the rear touch panel 27 and these touch detecting areas er1 to er4 are located in the vicinity of the right edge when viewed from the same side as the screen 2 of the display panel 21 as shown in, for example, FIG. 12 can be considered to be, for example, a right-hand holding state in which the user holds the right edge of the mobile information terminal 1 with the right hand 5R, that is, a holding state in which the thumb tR of the right hand 5R is on the same side of the screen 2 of the display panel 21 and the remaining four fingers of the right hand 5R are on the same side as the panel surface 4 of the rear touch panel 27. When the mobile information terminal 1 is in the right-hand holding state as shown in FIG. 12, fingers of the user with which the user can touch the panel surface 4 of the front touch panel 26 can be considered to be the thumb tR of the right hand 5R. When the mobile information terminal is held with the right hand as shown in FIG. 12, the position of the thumb tR of the right hand 5R with which the user can touch the screen 2 can be considered to be in the vicinity of the position at which the terminal is held with the right hand 5R.

Accordingly, if all that were detected on the panel surface 6 of the rear touch panel 27 are four or fewer touch detecting areas smaller than the predetermined size and these touch detecting areas er1 to er4 are located in the vicinity of the right edge when viewed from the same side as the screen 2 of the display panel 21 as in the example in FIG. 12, the mobile information terminal 1 in this embodiment displays the 10-key keyboard 3TR, the size of which is suitable for use when the user uses the thumb tR of the right hand 5R to enter characters and the like, in the vicinity of right hand 5R of the user on the screen 2 of the display panel 21 as shown in FIG. 13.

Thus, the third interface example enables the user to enter characters by using the thumb tR of the right hand 5R to press (that is, touch) desired key buttons on the 10-key keyboard 3TR intended for the right hand.

Figure 14:
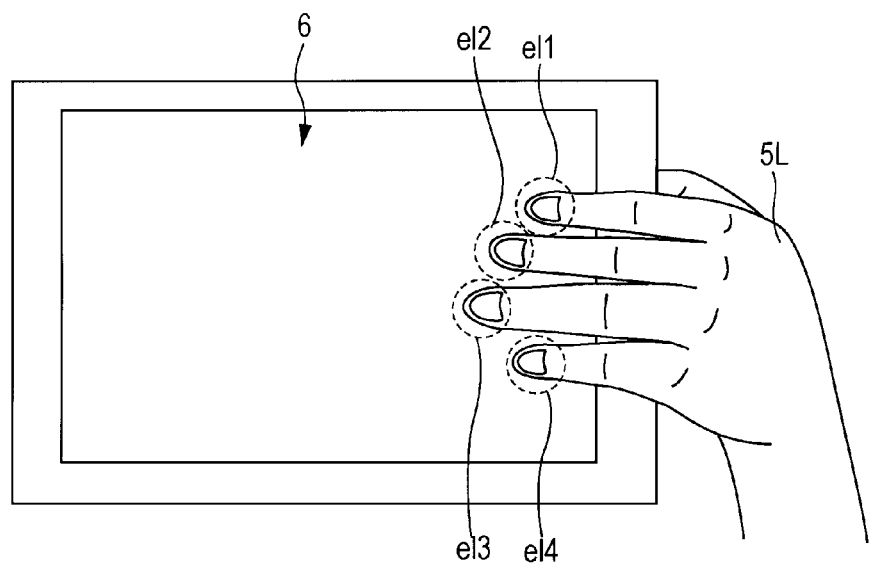
FIG. 14 is a drawing used to explain the touch detecting area detected by the rear touch panel when the mobile information terminal is held with the left hand in the third interface.
Figure 15:
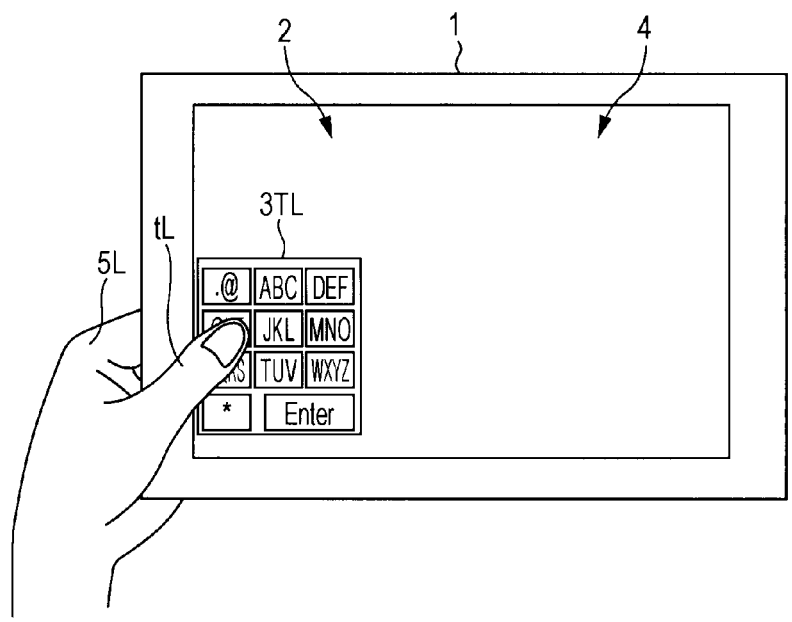
FIG. 15 illustrates an example in which the 10-key keyboard is displayed on the display panel when the mobile information terminal is held with the left hand in the third interface.

With the third interface example in this embodiment, if, for example, as shown in FIG. 14, all that were detected on the panel surface 6 of the rear touch panel 27 are at most four touch detecting areas smaller than the predetermined size (four touch detecting areas el1 to el4 in the example in FIG. 14) and these touch detecting areas el1 to el4 are located in the vicinity of the left edge when viewed from the same side as the screen 2 of the display panel 21, the mobile information terminal 1 in this embodiment places a 10-key keyboard 3TL used to enter alphabetical characters as shown in, for example, FIG. 15 at a location, in the vicinity of the left edge of the display panel 21, that corresponds to the areas in which touches were detected on the rear touch panel 27. In this case as well, as in the example in FIG. 13, the mobile information terminal 1 in this embodiment makes the size of each key button of the 10-key keyboard 3TL suitable for use when the user enters characters and the like with the thumb. Furthermore, the mobile information terminal 1 in this embodiment associates the keys constituting the 10-key keyboard 3TL with the touch detecting areas on the panel surface 4 of the front touch panel 26.

Specifically, the state in which the at most four touch detecting areas el1 to el4 smaller than the predetermined size are detected on the rear touch panel 27 and these touch detecting areas el1 to el4 are located in the vicinity of the left edge when viewed from the same side as the screen 2 of the display panel 21 as shown in, for example, FIG. 14 can be considered to be, for example, a left-hand holding state in which the user holds the left edge of the mobile information terminal 1 with the left hand 5L, that is, a holding state in which the thumb tL of the left hand 5L is on the same side of the screen 2 of the display panel 21 and the remaining four fingers of the left hand 5L are on the same side as the panel surface 4 of the rear touch panel 27. When the mobile information terminal 1 is in the left-hand holding state as shown in FIG. 14, fingers of the user with which the user can touch the panel surface 4 of the front touch panel 26 can be considered to be the thumb tL of the left hand 5L. When the mobile information terminal is held with the left hand as shown in FIG. 14, the position of the thumb tL of the left hand 5L with which the user can touch the screen 2 can be considered to be in the vicinity of the position at which the terminal is held with the left hand 5L.

Accordingly, if all that were detected on the panel surface 6 of the rear touch panel 27 are four or fewer touch detecting areas smaller than the predetermined size and these touch detecting areas el1 to el4 are located in the vicinity of the left edge when viewed from the same side as the screen 2 of the display panel 21 as in the example in FIG. 14, the mobile information terminal 1 in this embodiment displays the 10-key keyboard 3TL, the size of which is suitable for use when the user uses the thumb tL of the left hand 5L to enter characters and the like in the vicinity of left hand 5L of the user on the screen 2 of the display panel 21, as shown in FIG. 15.

Thus, the third interface example enables the user to enter characters by using the thumb tL of the left hand 5L to press (that is, touch) desired key buttons on the 10-key keyboard 3TL intended for the left hand.

[Touch Sensitive Position Adjustment Control when the Third Interface is Used]

In the third interface example described above, when displaying the key buttons on the 10-key keyboard 3TR intended for the right hand and the 10-key keyboard 3TL intended for the left hand, the mobile information terminal in this embodiment can carry out control so as to appropriately adjust touch sensitive positions, on the front touch panel 26, related to the key buttons on the 10-key keyboards 3TR and 3TL as in the second interface example described above.

Figure 16:
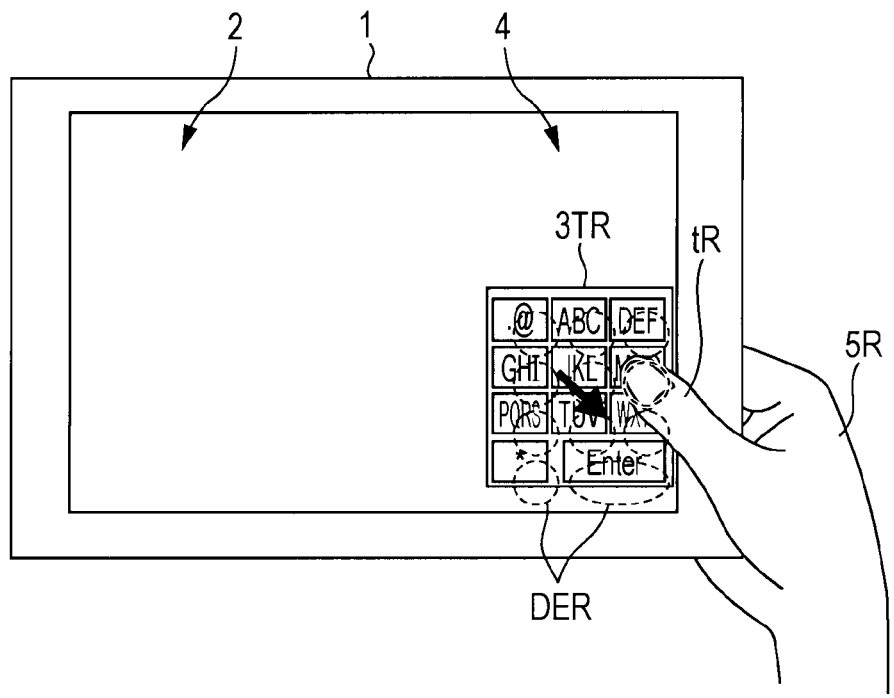
FIG. 16 is a drawing used to explain an example of adjusting a shift of touch sensitive positions corresponding to the keys of the 10-key keyboard displayed on the display panel in the third interface.

Specifically, if the right-hand holding state is taken as an example, the mobile information terminal in this embodiment can carry out adjustment control so that the touch sensitive positions DER, on the front touch panel 26, that correspond to the key buttons on the 10-key keyboard 3TR intended for the right hand are shifted from the on-screen positions at which the key buttons on the 10-key keyboard 3TR intended for the right hand are displayed toward the position at which the mobile information terminal is held with the right hand 5R of the user by an amount equal to predetermined coordinates, as indicated by the arrow oriented toward the right hand 5R in FIG. 16. Although not shown, in the left-hand holding state as well, as in the right-hand holding state described above, the mobile information terminal in this embodiment can carry out adjustment control so that the touch sensitive positions DEL, on the front touch panel 26, that correspond to the key buttons on the 10-key keyboard 3TL intended for the right hand are shifted from the on-screen positions at which the key buttons on the 10-key keyboard 3TL intended for the right hand are displayed toward the position at which the mobile information terminal is held with the left hand 5L of the user by an amount equal to predetermined coordinates, as in the right-hand holding state.

Adjustment control of the touch sensitive positions DEL in the right-hand holding state and left-hand holding state can be achieved by moving coordinate positions as in the case of the second interface described above.

Fourth Interface Example

When the mobile information terminal in this embodiment has been placed in an operation mode in which, for example, characters are entered, if an area on which a touch was detected on the rear touch panel 27 is of at least the predetermined size and the number of areas of at least the predetermined size is one, the terminal displays a QWERTY keyboard on the screen of the display panel 21, as a fourth interface in this embodiment, which is smaller in size than the example in FIG. 4. The predetermined size and the number of touch detecting areas of at least the predetermined size will be described below in detail.

Figure 17:
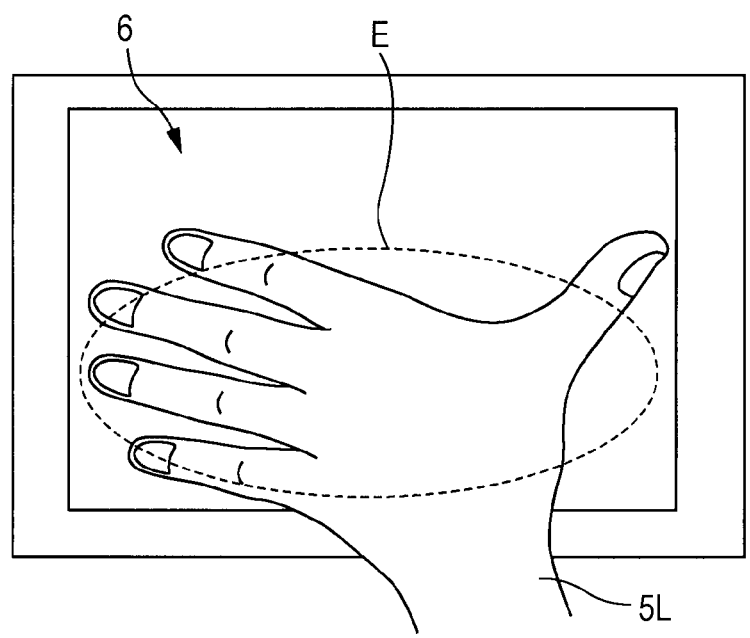
FIG. 17 is a drawing used to explain the touch detecting area detected by the rear touch panel in a fourth interface.
Figure 18:
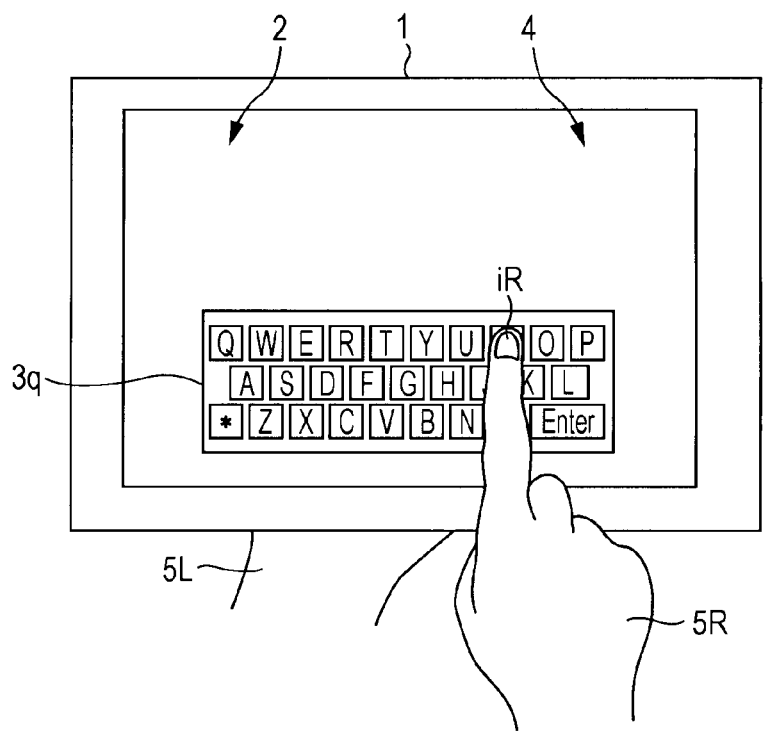
FIG. 18 illustrates an example in which a small QWERTY keyboard is displayed on the display panel in a fourth interface.

If one touch detecting area E of at least the predetermined size is detected on the panel surface 6 of the rear touch panel 27 as shown in, for example, FIG. 17, the mobile information terminal 1 in this embodiment displays a QWERTY keyboard 3q including keys, each of which has a size suitable for use when the user enters characters and the like with the index finger iR of the right hand 5R of the user, on the screen 2 of the display panel 21 as shown in, for example, FIG. 18. At this time, the mobile information terminal 1 in this embodiment associates the key buttons constituting the QWERTY keyboard 3q with the touch detecting areas on the panel surface 4 of the front touch panel 26. The sizes of the key buttons and the sizes of the touch detecting areas associated with these key buttons will be described later in detail.

Specifically, the state in which the one touch detecting area E of at least the predetermined size is detected on the rear touch panel 27 as shown in FIG. 17 can be considered to be, for example, a state in which the user holds the mobile information terminal 1 with one palm from the same side as the rear touch panel 27 (palm holding state). When the mobile information terminal 1 is in the palm holding state as shown in FIG. 17, the user can be considered to be able to use freely the hand that does not hold the mobile information terminal 1.

Accordingly, when the one touch detecting area E of at least the predetermined size is detected on the rear touch panel 27 as shown in FIG. 17, the mobile information terminal 1 displays, on the screen 2 of the display panel 21, the QWERTY keyboard 3q having a size suitable for use when the user enters characters and the like with the index finger of the free hand as shown in FIG. 18. FIGS. 17 and 18 illustrate an example in which the user holds the mobile information terminal with the palm of the left hand 5L and is manipulating the QWERTY keyboard 3q with the index finger iR of the right hand 5R.

Thus, the fourth interface example enables the user to enter characters by using, for example, the index finger iR of the right hand 5R to press (that is, touch) desired key buttons on the QWERTY keyboard 3q.

As a variation of the fourth interface, when the touch detecting area E of at least the predetermined size is detected on the rear touch panel 27, a plurality of touch detecting areas smaller than the predetermined size may also be detected together the touch detecting area E. In this case, it is also possible to decide whether the user holds the mobile information terminal with the palm of the right hand 5R or left hand 5L according to, for example, a positional relationship between the touch detecting area E of at least the predetermined size and the plurality of touch detecting areas smaller than the predetermined size.

Figure 19:
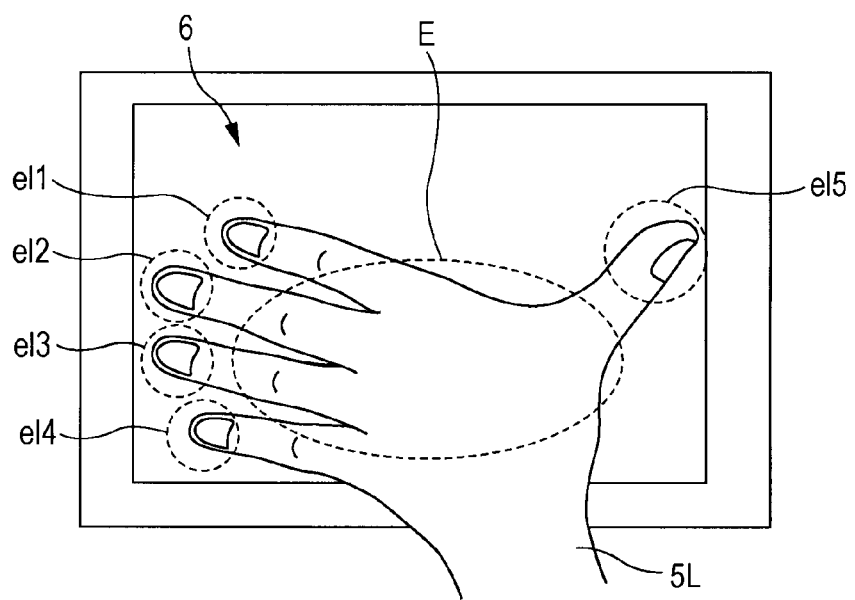
FIG. 19 is a drawing used to explain the touch detecting area detected by the rear touch panel when the mobile information terminal is held with the palm of the left hand in the fourth interface.
Figure 20:
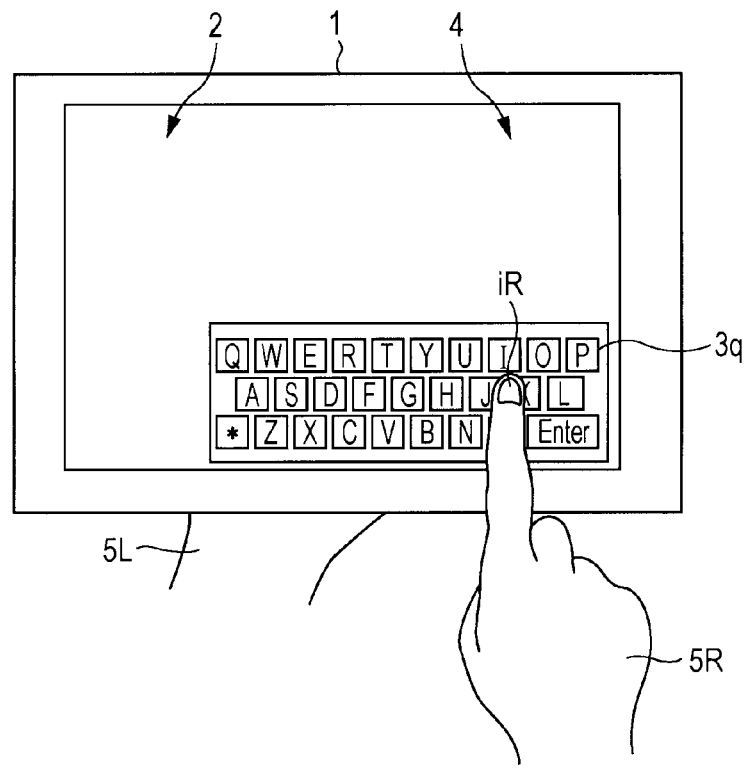
FIG. 20 illustrates an example in which a QWERTY keyboard is displayed on the right side of the display panel when the mobile information terminal is held with the palm of the left hand in the fourth interface.

If one touch detecting area E of at least the predetermined size and a plurality of touch detecting areas smaller than the predetermined size (el1 to el4 and el5) are simultaneously detected on the panel surface 6 of the rear touch panel 27 as shown in, for example, FIG. 19 and the major portion (el1 to el4) of the plurality of touch detecting areas smaller than the predetermined size in terms of the number of touch detecting areas is, for example, on the left side relative to the touch detecting area E of at least the predetermined size, the mobile information terminal 1 in this embodiment may display the QWERTY keyboard 3q including keys, each of which has a size suitable for use when the user enters characters and the like with the index finger iR of the right hand 5R of the user at a displaced location, for example, the lower right corner within the screen 2 of the display panel 21, as shown in, for example, FIG. 20.

Specifically, the state in which one touch detecting area E of at least the predetermined size and a plurality of touch detecting areas smaller than the predetermined size (el1 to el4 and el5) are simultaneously detected on the rear touch panel 27 as shown in, for example, FIG. 19 can be considered to be, for example, a state in which the user holds the rear touch panel 27 of the mobile information terminal 1 with, for example, one palm of the user (palm holding state). With the mobile information terminal 1 placed in the palm holding state as shown in FIG. 19, if the major portion (el1 to el4) of the plurality of touch detecting areas smaller than the predetermined size in terms of the number of touch detecting areas is, for example, on the left side relative to the touch detecting area E of at least the predetermined size, the mobile information terminal 1 can be considered to be placed in the palm holding state in which the user holds the rear touch panel 27 of the mobile information terminal 1 with the palm of the left hand 5L. In this case, the user can be considered to be able to use freely the right hand 5R that does not hold the mobile information terminal 1.

Accordingly, when one touch detecting area E of at least the predetermined size and touch detecting areas smaller than the predetermined size are simultaneously detected on the rear touch panel 27 as shown in, for example, FIG. 19 and the major portion of the plurality of touch detecting areas smaller than the predetermined size in terms of the number of touch detecting areas is on the left side relative to the touch detecting area E of at least the predetermined size, the mobile information terminal 1 in this embodiment shifts the display position to, for example, the lower right corner within the screen 2 of the display panel 21 as shown in FIG. 20, so that the user can easily input characters and the like with the index FIG. 1R of the right hand 5R.

Thus, this variation of the fourth interface enables the user to enter characters by using the index FIG. 1R of the right hand 5R to press (that is, touch) desired key buttons on the QWERTY keyboard 3q.

Figure 21:
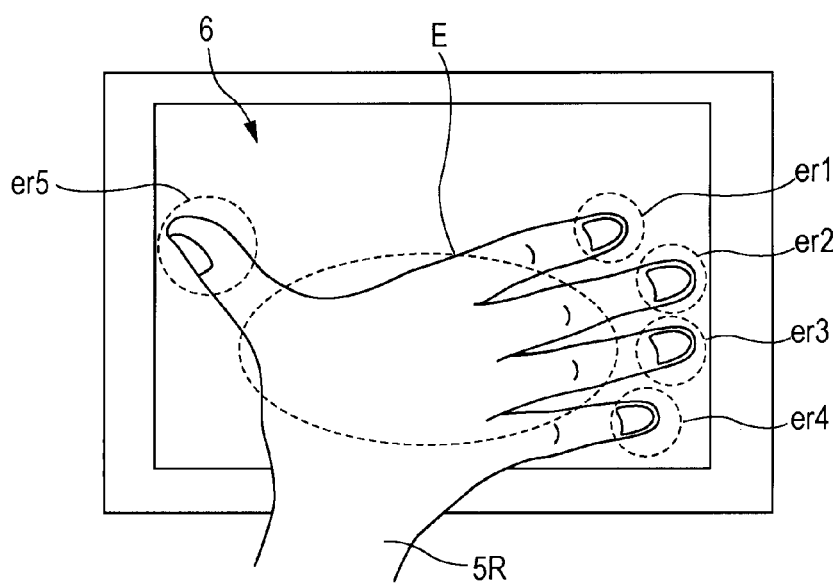
FIG. 21 is a drawing used to explain the touch detecting area detected by the rear touch panel when the mobile information terminal is held with the palm of the right hand in the fourth interface.
Figure 22:
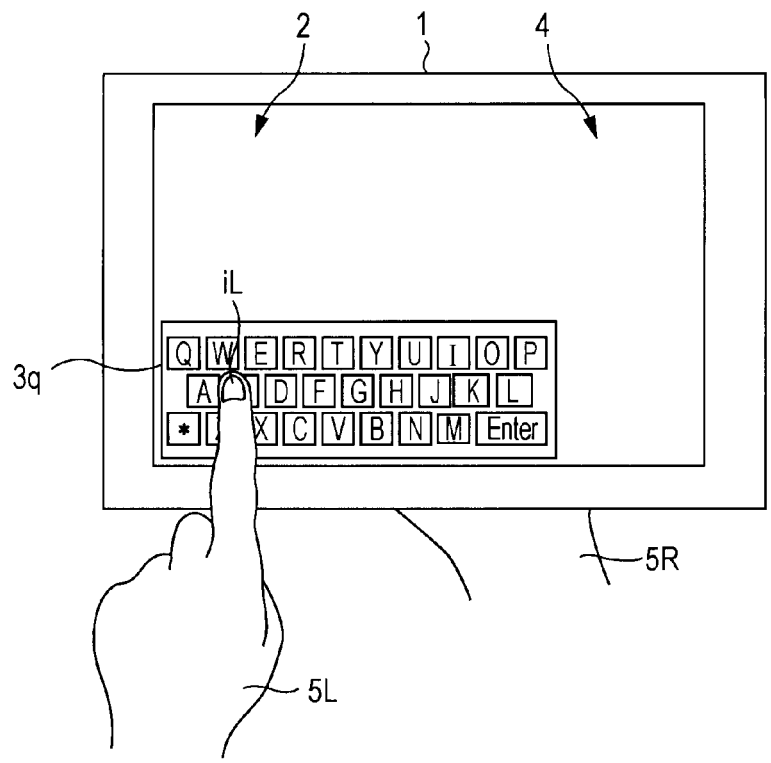
FIG. 22 illustrates an example in which a QWERTY keyboard is displayed on the left side of the display panel when the mobile information terminal is held with the palm of the right hand in the fourth interface.

In another variation of the fourth interface, if one touch detecting area E of at least the predetermined size and a plurality of touch detecting areas smaller than the predetermined size (er1 to er4 and er5) are simultaneously detected on the panel surface 6 of the rear touch panel 27 as shown in, for example, FIG. 21 and the major portion (er1 to er4) of the plurality of touch detecting areas smaller than the predetermined size in terms of the number of touch detecting areas is, for example, on the right side relative to the touch detecting area E of at least the predetermined size, the mobile information terminal 1 in this embodiment can also display the QWERTY keyboard 3q including keys, each of which has a size suitable for use when the user enters characters and the like with the index finger iL of the left hand 5L of the user at a displaced location, for example, the lower left corner within the screen 2 of the display panel 21, as shown in, for example, FIG. 22.

Thus, this variation of the fourth interface enables the user to enter characters by using the index FIG. 1L of the left hand 5L to press (that is, touch) desired key buttons on the QWERTY keyboard 3q.

[Predetermined Size, Touch Detecting Area Size, Number of Touch Detecting Areas, and Determination of a Holding State from them]

As described above, the mobile information terminal in this embodiment uses the sizes of areas on each of which a touch is detected on the panel surface 6 of the rear touch panel 27 and the number of these areas as information from which the state in which the terminal is held by the user is determined.

Figure 23:
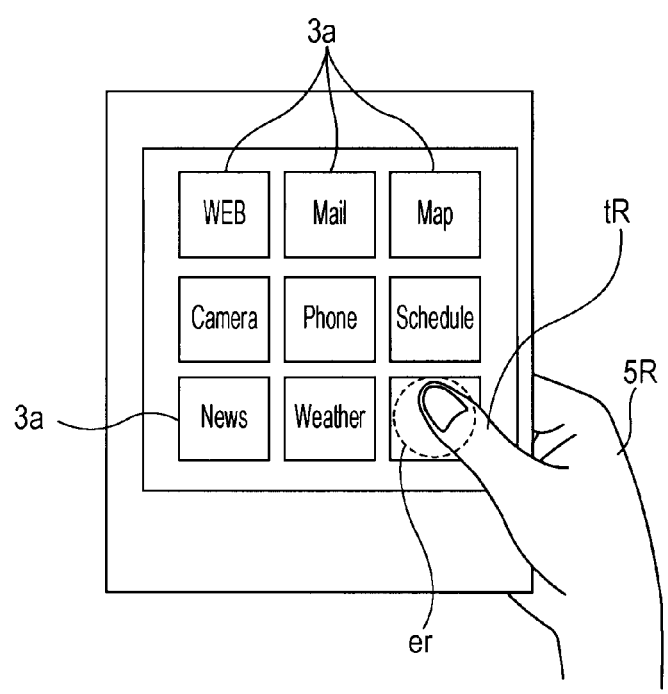
FIG. 23 is a drawing used to explain a relationship between an evaluation object and the size of a thumb of a test subject when the size of an area in which a touch is detected is judged.

In this embodiment, the predetermined size used to determine the size of the area on which a touch is detected is determined from the sizes of touch detecting areas er obtained when a plurality of test subjects irrespective of sex or age touch evaluation objects with, for example, their thumb tR of the right hand 5R, the evaluation objects being application selection icons 3a displayed on the screen as shown in FIG. 23.

Figure 24:
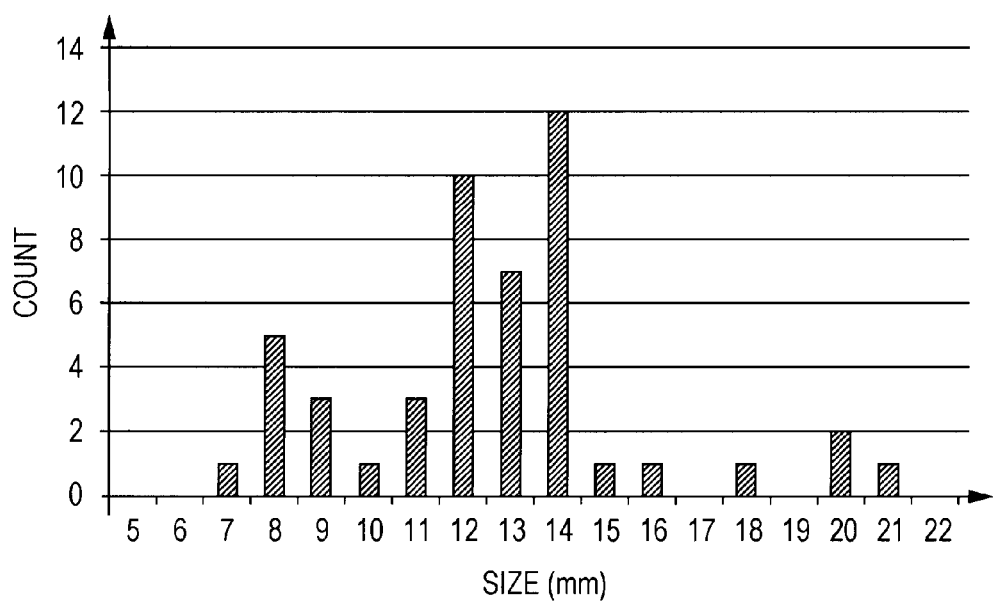
FIG. 24 is a graph representing a distribution of the sizes of touch detecting areas obtained when a plurality of test subjects made a touch with their thumb.
Figure 25:
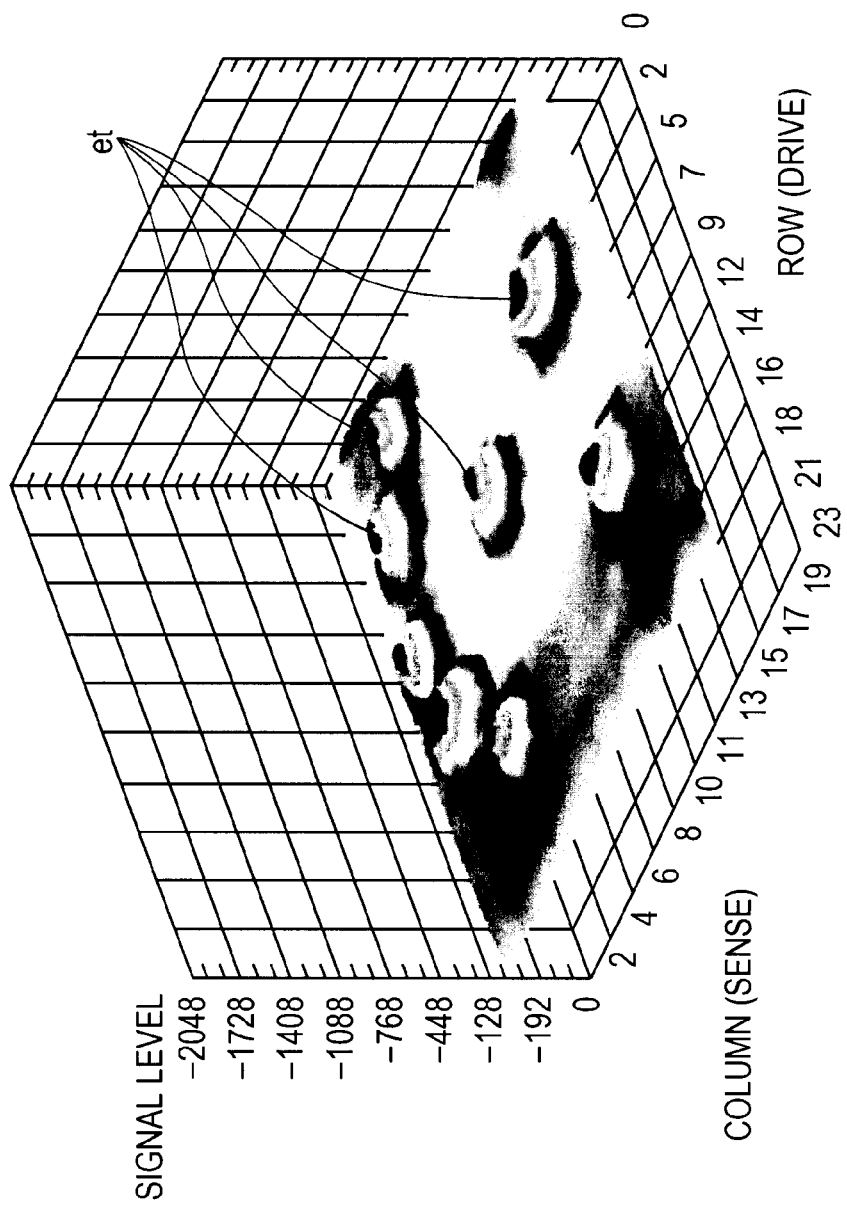
Figure 26:
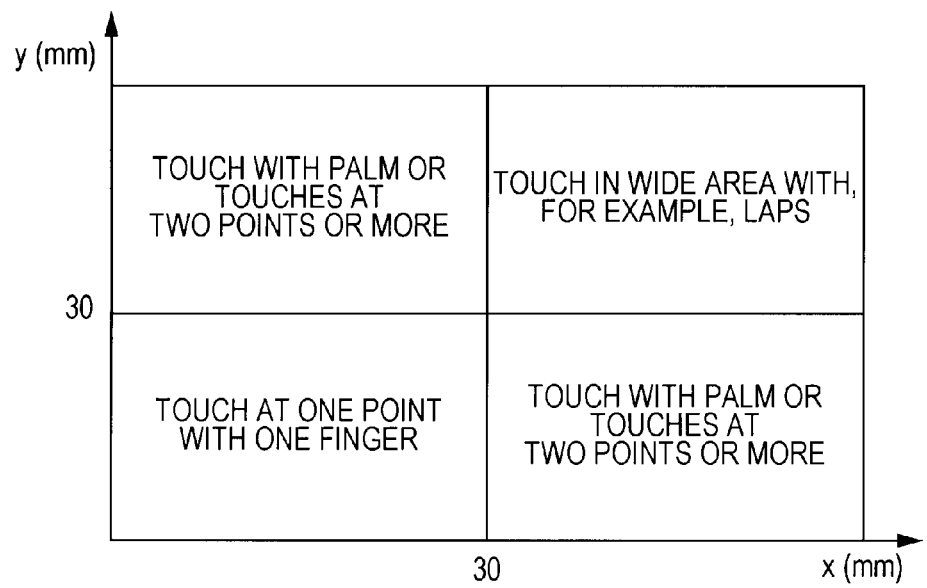
FIG. 26 illustrates relationships among the sizes (in mm) of touch detecting areas in the x direction and y direction in which the touch detection signal level exceeds a predetermined signal level, the number of these touch detecting areas, and the holding state corresponding to the sizes of these touch detecting areas and the number of touch detecting areas.

In this embodiment, FIG. 24 illustrates a distribution of the sizes of touch detecting areas obtained when the plurality of persons made a touch with their thumb. FIG. 25 illustrates a direction in which the touch panel is scanned and the level of a touch detection signal detected by the scan when a touch is actually made by a finger or the like. FIG. 26 illustrates relationships among the sizes (in mm) of touch detecting areas in the x direction and y direction in which the touch detection signal level exceeds a predetermined signal level, the number of these touch detecting areas, and the holding state corresponding to the sizes of these touch detecting areas and the number of these touch detecting areas.

Specifically, as seen from FIG. 24, the size (diameter or length) of each touch detecting area obtained when the thumb tR is in touch on the touch panel falls within the range of 7 mm to 21 mm. In this embodiment, therefore, the predetermined size is set to 30 mm to allow a certain amount of margin for the maximum size 21 mm. Accordingly, the mobile information terminal in this embodiment decides that if the size of the touch detecting area on the touch panel is less than 30 mm, the mobile information terminal decides that a finger of a person is in touch and that if the size of the touch detecting area on the touch panel is 30 mm or more, the mobile information terminal decides that thighs, a palm, or the like is in touch.

The mobile information terminal in this embodiment obtains the number of touch detecting areas by counting the number of touch detecting areas et in each of which a touch detection signal exceeding a predetermined signal level has been obtained through touch panel scanning as shown in FIG. 25.

As shown in FIG. 26, if the size of a touch detecting area in which the touch detection signal level has exceeded the predetermined signal level is smaller than 30 mm in both the x and y directions and the number of touch detecting areas is one, for example, then the mobile information terminal in this embodiment determines that the mobile information terminal has been touched at one point with one figure.

As shown in FIG. 26, if the size of a touch detecting area in which the touch detection signal level has exceeded the predetermined signal level is 30 mm or more in one of the x and y directions and the number of touch detecting areas is two or more, for example, then the mobile information terminal in this embodiment decides that mobile information terminal has been touched with a palm or at two points or more and thereby determines that the holding state is, for example the palm holding state.

As shown in FIG. 26, if the size of a touch detecting area in which the touch detection signal level has exceeded the predetermined signal level is 30 mm or more in both the x and y directions, for example, the mobile information terminal in this embodiment decides that mobile information terminal has been touched in a wide area by thighs or the like and thereby determines that the holding state is, for example, the laptop holding state.

[Explanation of the Sizes of Key Buttons and the Sizes of Touch Detecting Areas Associated with these Key Buttons]

As described above, the mobile information terminal in this embodiment can decide how the user the holds the terminal and can perform control so as to optimize the size of each key button of a keyboard to be displayed on the screen 2 of the display panel 21 and the size of a touch detecting area associated with the key button size.

Figure 27:
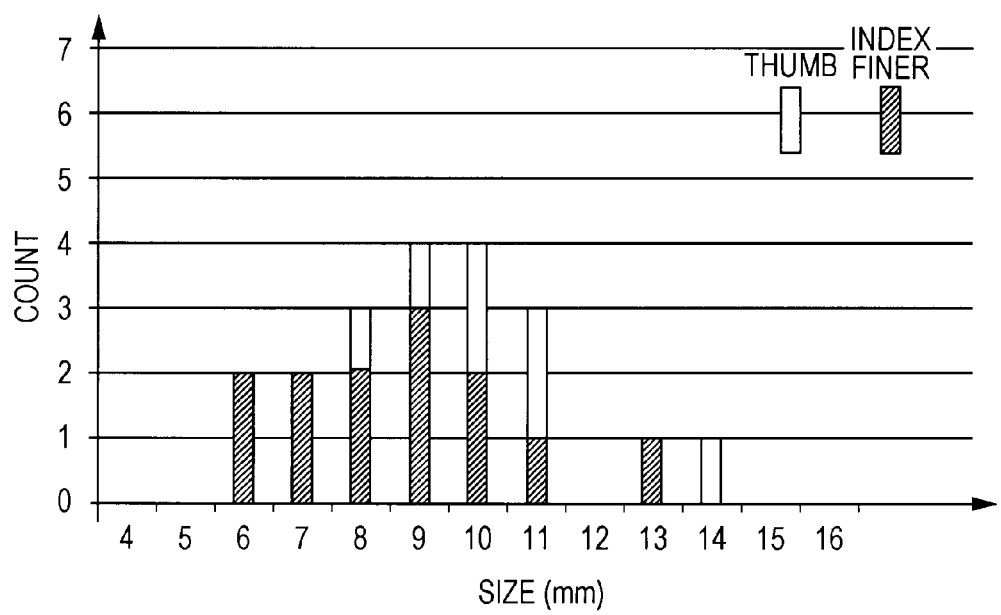
FIG. 27 is a graph representing a distribution of sizes of touch detecting areas when a plurality of test subjects made touches with a thumb and index finger.

It has been found that the size of a touch detecting area obtained when the touch panel is touched with, for example, a thumb of a user's hand is at most 21 mm as in the example in FIG. 24. If a small-sized key button of, for example, a QWERTY keyboard as described above is touched, however, it has been found in actual tests that the sizes of touch detecting areas touched with a thumb are distributed to 14 mm or less and the sizes of touch detecting areas touched with an index finger are distributed to 13 mm or less as shown in, for example, FIG. 27.

Accordingly, when the mobile information terminal in this embodiment displays a keyboard or the like on the display panel 21 according to the state in which the user holds the terminal, the terminal optimizes the size of each key button of the keyboard according to the holding state as shown in FIG. 28. Specifically, if, for example, the state of holding by the user is the laptop holding state or another type of hand-free holding state, the size of the key button is determined to be less than 13 mm as shown in FIG. 28, assuming that a touch has been made with an index finger of the user or the like. If, for example, the state of holding by the user is the right-hand holding state or left-hand holding state, the size of the key button is determined to be less than 14 mm, assuming that a touch has been made with a thumb of the user or the like. If, for example, the state of holding by the user is the palm holding state, the size of the key button is determined to be less than 13 mm assuming that a touch has been made with an index finger of the user. Then, the mobile information terminal in this embodiment sets the size of the touch detecting area on the touch panel to match the key button size.

[Flowchart for Interface Display Control According to the Holding State]

Figure 29:
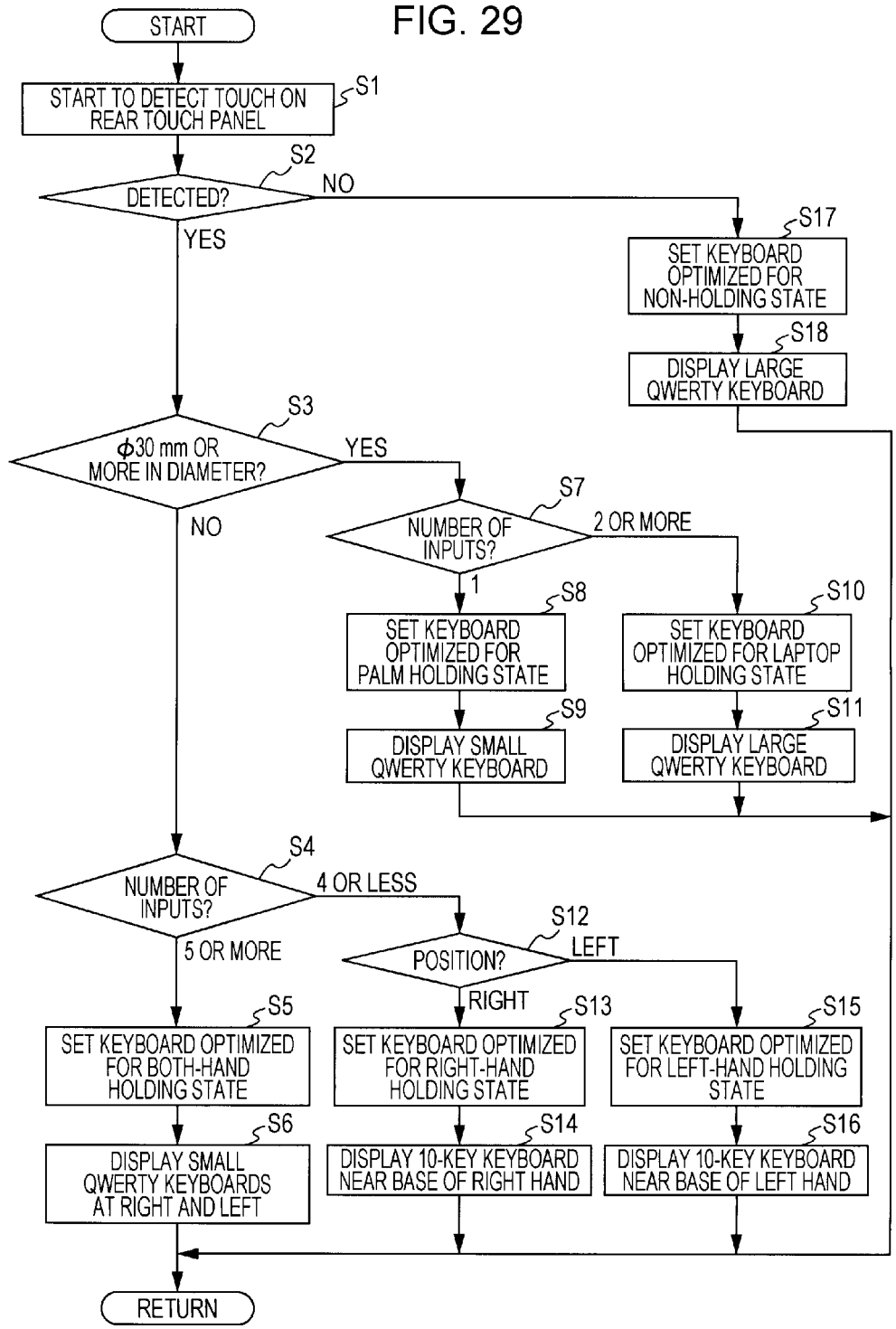
FIG. 29 is a flowchart illustrating the flow of processing carried out when a QWERTY keyboard, a 10-key keyboard, or the like is displayed according to the holding state.

FIG. 29 illustrates the flow of processing carried out by the mobile information terminal in this embodiment when the control and computation unit 12 in FIG. 1 displays a QWERTY keyboard, a 10-key keyboard, or the like on the display panel 21 through the video signal processing unit 20 according to the touch detection information obtained from the front touch panel 26 through the touch panel controller 24. The processing in the flowchart in FIG. 29 is implemented when the control and computation unit 12 executes the operation control program in this embodiment. The operation control program in this embodiment may be provided as an independent program or parts of the operation control program may be included in various application programs by which, for example, characters and the like can be input. When the operation control program is provided separately as an independent program, the operation control program cooperates with the application program being executed in response to a request from the application program.

In the mobile information terminal in this embodiment, when the control and computation unit 12 enters an operation mode in which characters and the like are input, that is, an operation mode in which a QWERTY keyboard described above, numeric keys, or key buttons such as selection icons are displayed on the display panel 21, the control and computation unit 12 starts the processing in the flowchart in FIG. 29.

When the processing in the flowchart in FIG. 29 starts, the control and computation unit 12 controls the touch panel controller 24 as the process in step S1 to start touch detection through the rear touch panel 27.

The control and computation unit 12 then monitors, as the process in step S2, whether a touch has been made by an external conductor on the rear touch panel 27. If a touch has been detected, the control and computation unit 12 causes the processing to proceed to step S3. If a touch has not been detected, the control and computation unit 12 causes the processing to proceed to step S17.

If the processing proceeds to step S17, the control and computation unit 12 decides that the mobile information terminal is in the non-holding state described above and sets a keyboard optimized for the non-holding state, that is, makes a setting to display the QWERTY keyboard 3Q as shown in FIG. 4. The control and computation unit 12 then causes the video signal processing unit 20 to display the QWERTY keyboard 3Q shown in FIG. 4 on the screen 2 of the display panel 21 as the process in step S18. After the process in step S18 has been completed, the control and computation unit 12 returns the processing to the beginning.

If a touch has been detected in step S2 and the processing proceeds to step S3, the control and computation unit 12 decides whether there is a touch detecting area the size of which is at least the predetermined size (30 mm or more in this embodiment). If the control and computation unit 12 decides in step S3 that there is no touch detecting area 30 mm or more in size, that is, the touch detecting area is less than 30 mm in size, the control and computation unit 12 causes the processing to proceed to step S4 and later. If the control and computation unit 12 decides that there is a touch detecting area 30 mm or more in size, the control and computation unit 12 causes the processing to proceed to step S7 and later.

If the processing proceeds to step S7, the control and computation unit 12 decides the number of touch detecting areas 30 mm or more in size. If that number is one, the control and computation unit 12 causes the processing to proceed to step S8. If that number is two or more, the control and computation unit 12 causes the processing to proceed to step S10.

If the processing proceeds to step S10, the control and computation unit 12 decides that the mobile information terminal in this embodiment has been placed in the laptop holding state and sets a keyboard optimized for the laptop holding state, that is, makes a setting to display the QWERTY keyboard 3Q as shown in FIG. 4. The control and computation unit 12 then causes the video signal processing unit 20 to display the QWERTY keyboard 3Q shown in FIG. 4 on the screen 2 of the display panel 21 as the process in step S11. After the process in step S11 has been completed, the control and computation unit 12 returns the processing to the beginning.

If the processing proceeds to step S8, the control and computation unit 12 decides that the mobile information terminal in this embodiment has been placed in the palm holding state and sets a keyboard optimized for the palm holding state, that is, makes a setting to display the QWERTY keyboard 3q as shown in FIG. 18. The control and computation unit 12 then causes the video signal processing unit 20 to display the QWERTY keyboard 3q shown in FIG. 18 on the screen 2 of the display panel 21 as the process in step S9. After the process in step S9 has been completed, the control and computation unit 12 returns the processing to the beginning. When the mobile information terminal in this embodiment decides that the holding state is the palm holding state in the process in step S8, the terminal may also decide a holding state as illustrated in FIGS. 19 to 22 and then may set a displays of a keyboard optimized for the holding state.

If the processing proceeds from step S3 to step S4, the control and computation unit 12 decides the number of touch detecting areas less than 30 mm in size. If that number is five or more, the control and computation unit 12 causes the processing to proceed to step S5. If that number is four or less, the control and computation unit 12 causes the processing to proceed to step S12.

If the processing proceeds to step S5, the control and computation unit 12 decides that the mobile information terminal in this embodiment has been placed in the both-hand holding state and sets a keyboard optimized for the both-hand holding state, that is, makes a setting to display the divided keyboards 3QL and 3QR as shown in FIG. 6. The control and computation unit 12 then causes the video signal processing unit 20 to display the divided keyboards 3QL and 3QR shown in FIG. 6 on the screen 2 of the display panel 21 as the process in step S6. After the process in step S6 has been completed, the control and computation unit 12 returns the processing to the beginning.

If the processing proceeds to step S12, the control and computation unit 12 decides the positions of the touch detecting areas. If the positions of the touch detecting areas are near the right edge of the mobile information terminal, the control and computation unit 12 causes the processing to proceed to step S13. If the positions of the touch detecting areas are near the left edge of the mobile information terminal, the control and computation unit 12 causes the processing to proceed to step S15.

If the processing proceeds to step S13, the control and computation unit 12 decides that the mobile information terminal in this embodiment has been placed in the right-hand holding state and sets a keyboard optimized for the right-hand holding state, that is, makes a setting to display the 10-key keyboard 3T as shown in FIG. 13 near the right edge of the screen 2 of the display panel 21. The control and computation unit 12 then causes the video signal processing unit 20 to display the 10-key keyboard 3T shown in FIG. 13 on the screen 2 of the display panel 21 as the process in step S14. After the process in step S14 has been completed, the control and computation unit 12 returns the processing to the beginning.

If the processing proceeds to step S15, the control and computation unit 12 decides that the mobile information terminal in this embodiment has been placed in the left-hand holding state and sets a keyboard optimized for the left-hand holding state, that is, makes a setting to display the 10-key keyboard 3T as shown in FIG. 15 near the right edge of the screen 2 of the display panel 21. The control and computation unit 12 then causes the video signal processing unit 20 to display the 10-key keyboard 3T shown in FIG. 15 on the screen 2 of the display panel 21 as the process in step S16. After the process in step S16 has been completed, the control and computation unit 12 returns the processing to the beginning.

[Example of Using a Proximity Sensor to Improve Precision in Holding State Judgment]

In addition to interface control based on touch detection information, as described above, which is obtained from the rear touch panel 27, the mobile information terminal in this embodiment can also improve precision in holding state judgment by using proximity detection information obtained from a proximity sensor provided on, for example, the mobile information terminal.

Figure 30:
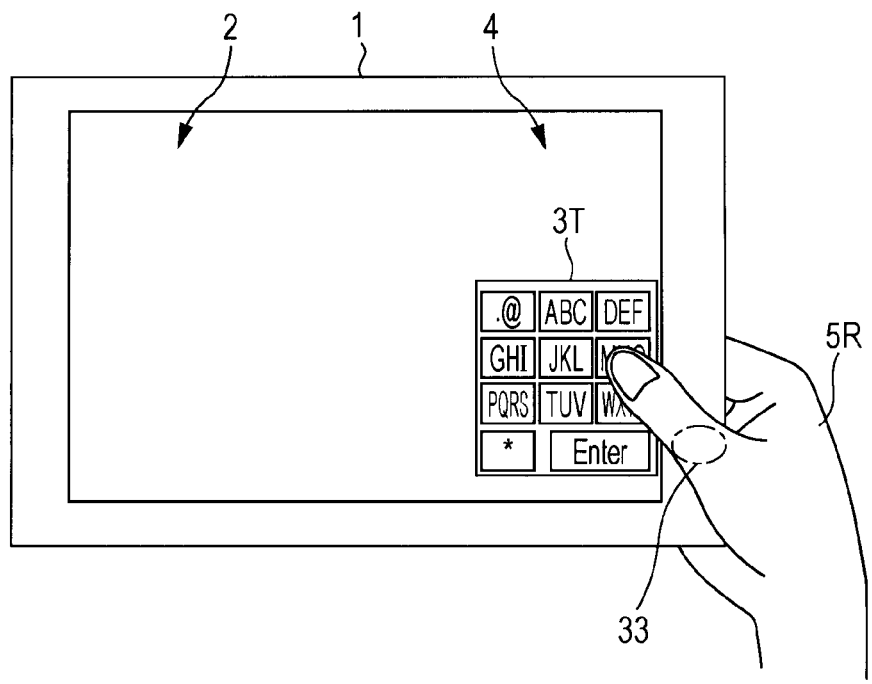
FIG. 30 is a drawing used to explain an example of improving precision in holding state judgment by using a proximity sensor.
Figure 31:
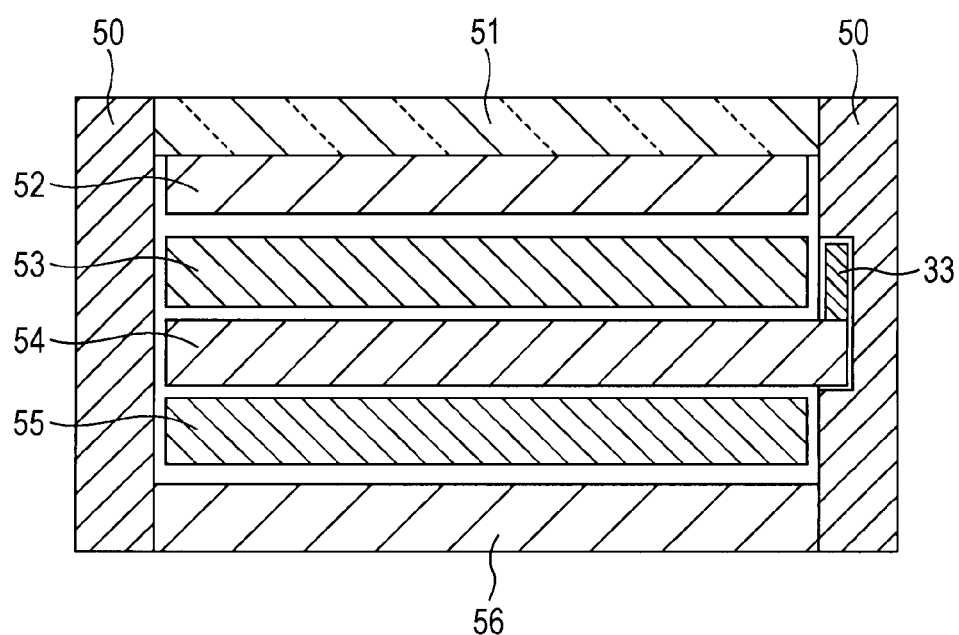
FIG. 31 schematically illustrates the sectional structure of a mobile information terminal in an embodiment that can improve precision in holding state judgment by using the proximity sensor.

Specifically, the mobile information terminal 1 in this embodiment has a proximity sensor 33 at the left edge of the case as shown in FIGS. 30 and 31. FIG. 31 schematically illustrates the sectional structure of the mobile information terminal in this embodiment as in FIG. 2. As shown in FIG. 31, the proximity sensor 33 is electrically connected to the driving circuit and circuit board 54, which controls the operation of the proximity sensor 33; the driving circuit and circuit board 54 includes an electronic circuit that can process a proximity detection signal from the proximity sensor 33.

In the case of the structure shown in FIGS. 30 and 31, if the mobile information terminal 1 is held with, for example, the right hand 5R of the user, the proximity detection signal is obtained from the proximity sensor 33; if the mobile information terminal 1 is held with, for example, the left hand 5L, the proximity detection signal is not obtained from the proximity sensor 33.

Accordingly, if the holding state has been decided to be, for example, the right-hand holding state from the touch detection information from the rear touch panel 27 and the proximity detection signal has been obtained from the proximity sensor 33, the mobile information terminal in this embodiment can reliably judge that the terminal has been placed in the right-hand holding state, in which the user holds the terminal with the right hand 5R. Conversely, if the holding state has been decided to be, for example, the left-hand holding state from the touch detection information from the rear touch panel 27 and the proximity detection signal has not been obtained from the proximity sensor 33, the mobile information terminal in this embodiment can reliably judge that the terminal has been placed in the left-hand holding state, in which the user holds the terminal with the left hand 5L.

Figure 32:
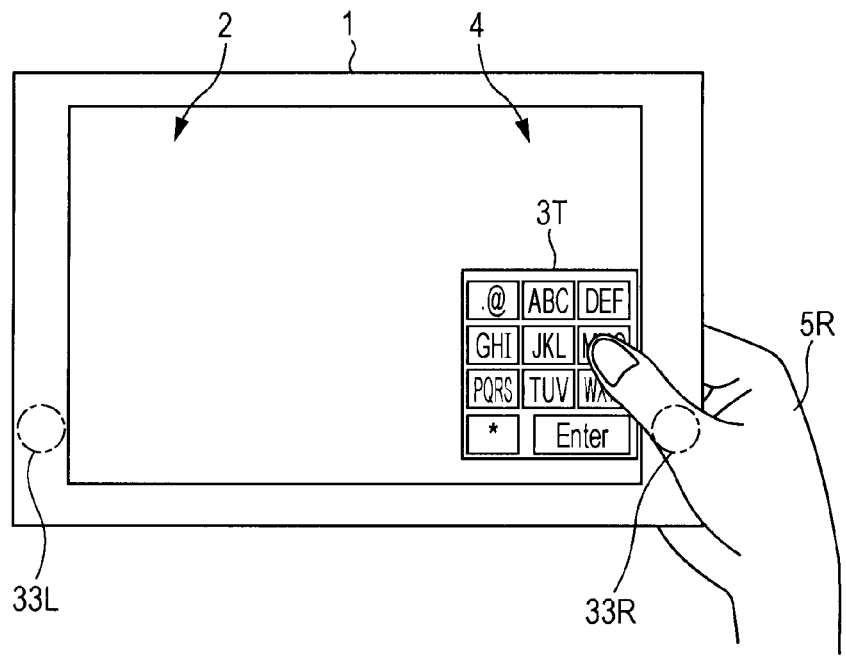
FIG. 32 is a drawing used to explain another example of further improving precision in holding state judgment by using proximity sensors.
Figure 33:
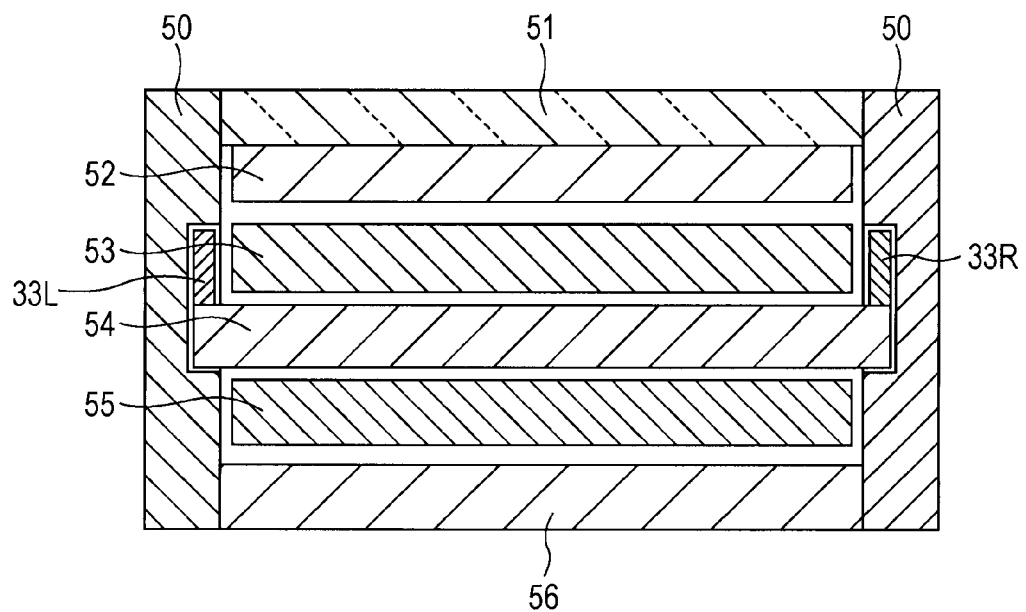
FIG. 33 schematically illustrates the sectional structure of a mobile information terminal according to another embodiment that can further improve precision in holding state judgment by using the proximity sensors.

The mobile information terminal 1 in this embodiment may also have both a proximity sensor 33L at the left edge of the case and a proximity sensor 33R at the right edge as shown in FIGS. 32 and 33. In addition to interface control based on touch detection information, which is obtained from the rear touch panel 27, the mobile information terminal in this embodiment can further improve precision in holding state judgment by using proximity detection signal obtained from the proximity sensors 33L and 33R. FIG. 33 schematically illustrates the sectional structure of the mobile information terminal in this embodiment as in FIG. 2. As shown in FIG. 33, the proximity sensors 33L and 33R are electrically connected to the driving circuit and circuit board 54, which controls the operations of the proximity sensors 33L and 33R; the driving circuit and circuit board 54 includes an electronic circuit that can process proximity detection signals from the proximity sensors 33L and 33R.

In the case of the structure shown in FIGS. 32 and 33, if the mobile information terminal 1 is held with, for example, the right hand 5R of the user, the proximity detection signal from the proximity sensor 33R is obtained but the proximity detection signal from the proximity sensor 33L is not obtained. In the case of the mobile information terminal 1, for example, if the mobile information terminal 1 is held with, for example, the left hand 5L, the proximity detection signal from the proximity sensor 33L is obtained but the proximity detection signal from the proximity sensor 33R is not obtained. If the mobile information terminal 1 is held with both hands, the right hand 5R and left hand 5L, of the user as in the example in FIG. 6, proximity signals are obtained from both the proximity sensors 33R and 33L.

Accordingly, if the holding state has been decided to be, for example, the right-hand holding state from the touch detection information from the rear touch panel 27 and only the proximity detection signal from the proximity sensor 33R has been obtained, the mobile information terminal 1 in this embodiment can reliably judge that the terminal has been placed in the right-hand holding state, in which the user holds the terminal with the right hand 5R. Conversely, if the holding state has been decided to be, for example, the left-hand holding state from the touch detection information from the rear touch panel 27 and only the proximity detection signal from the proximity sensor 33L has been obtained, the mobile information terminal 1 in this embodiment can reliably judge that the terminal has been placed in the left-hand holding state, in which the user holds the terminal with the left hand 5L. If the holding state has been decided to be, for example, the both-hand holding state from the touch detection information from the rear touch panel 27 and both the proximity detection signal from the proximity sensor 33R and the proximity detection signal from the proximity sensor 33L have been obtained, the mobile information terminal 1 in this embodiment can reliably judge that the terminal has been placed in the both-hand holding state, in which the user holds the terminal with both hands.

[Example of Using a Side Touch Panel to Improve Precision in Holding State Judgment]

Besides the above example of using a proximity sensor to improve precision in holding state judgment, in addition to interface control based on touch detection information, as described above, which is obtained from the rear touch panel 27, the mobile information terminal in this embodiment can also improve precision in holding state judgment by using proximity detection information obtained from a side touch panel provided on, for example, a side of the case of the terminal.

The touch panel disposed on a side of the case may have the same structure as the front touch panel 26 and rear touch panel 27. Alternatively, for example, the touch panel may be formed by, for example, extending the front touch panel 26 or rear touch panel 27.

When the touch panel is formed by extending the front touch panel 26 or rear touch panel 27, the touch panel is structured, for example, as described below. Although, in the example described below, the front touch panel 26 is expanded to form the side panel, the rear touch panel 27 can also be of course expanded in the same way.

A capacitive touch panel such as the front touch panel 26 is structured with an X-Y transparent electrode pattern formed on a sensor glass as a constituent component thereof. The sensor glass is made of a transparent glass plate. The X-Y transparent electrode pattern is formed on the surface of the sensor glass; a plurality of square transparent electrode units are arranged as a plurality of rows in the X direction and Y direction.

With the front touch panel 26 in this embodiment, of the square transparent electrode units arranged in the X direction and Y direction, a prescribed square transparent electrode unit at, for example, the outermost edge of a side of the case is capacitively connected to a conductive print pattern that extends to the side of the case of the terminal.

In this embodiment, therefore, when an external conductor touches the conductive print pattern, the front touch panel 26 can detect the touch of the external conductor through the prescribed square transparent electrode unit capacitively connected to the conductive print pattern. That is, on the front touch panel 26 in this embodiment, the detection area of the X-Y transparent electrode pattern is extended by the conductive print pattern. With the mobile information terminal in this embodiment, therefore, the conductive print pattern can be used as the side touch panel.

Figure 34:
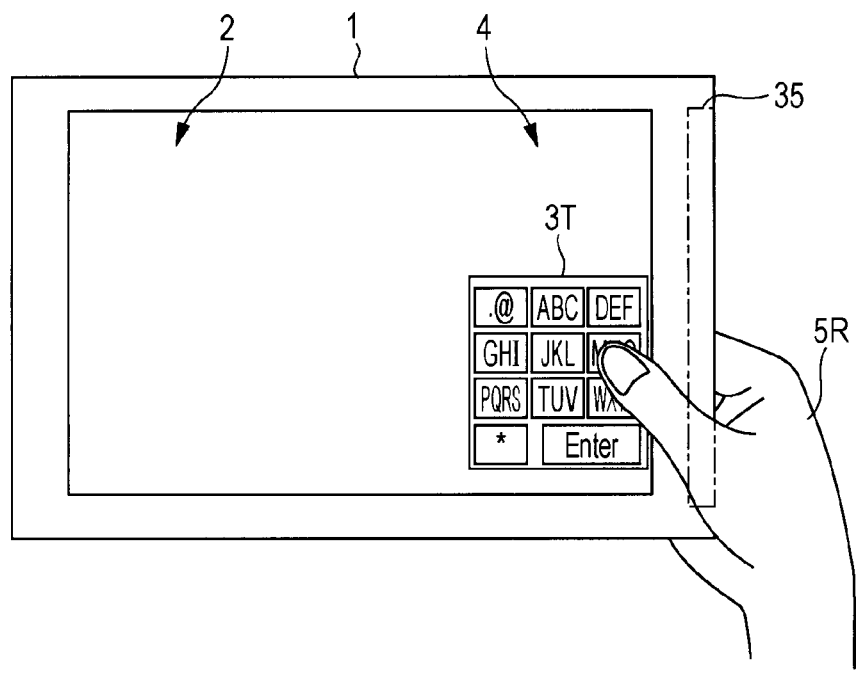
FIG. 34 is a drawing used to explain an example of improving precision in holding state judgment by using a side touch panel.
Figure 35:
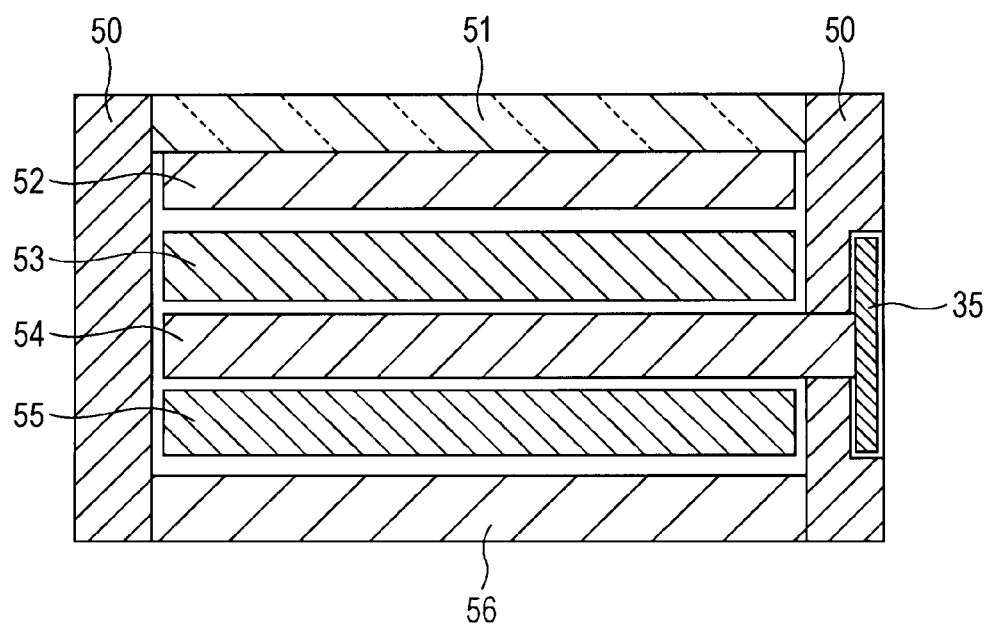
FIG. 35 schematically illustrates the sectional structure of a mobile information terminal in an embodiment that can improve precision in holding state judgment by using the side touch panel.

In this example, the mobile information terminal 1 in this embodiment has a side touch panel 35 formed by, for example, the conductive print pattern as shown in, for example, FIGS. 34 and 35. FIG. 35 schematically illustrates the sectional structure of the mobile information terminal in this embodiment as in FIG. 2. As shown in FIG. 35, the side touch panel 35 is electrically connected to the driving circuit and circuit board 54, which controls the operation of the side touch panel 35; the driving circuit and circuit board 54 includes an electronic circuit that can process touch detection signals from the side touch panel 35.

In the case of the structure shown in FIGS. 34 and 35, if the mobile information terminal 1 is held with, for example, the right hand 5R of the user, a touch detection signal is obtained from the side touch panel 35; if the mobile information terminal 1 is held with, for example, the left hand 5L, no touch detection signal is obtained from the side touch panel 35.

Accordingly, if the holding state has been decided to be, for example, the right-hand holding state from the touch detection information from the rear touch panel 27 and the touch detection signal has been obtained from the side touch panel 35, the mobile information terminal in this embodiment can reliably judge that the terminal has been placed in the right-hand holding state, in which the user holds the terminal with the right hand 5R. Conversely, if the holding state has been decided to be, for example, the left-hand holding state from the touch detection information from the rear touch panel 27 and the touch detection signal has not been obtained from the side touch panel 35, the mobile information terminal in this embodiment can reliably judge that the terminal has been placed in the left-hand holding state, in which the user holds the terminal with the left hand 5L.

Figure 36:
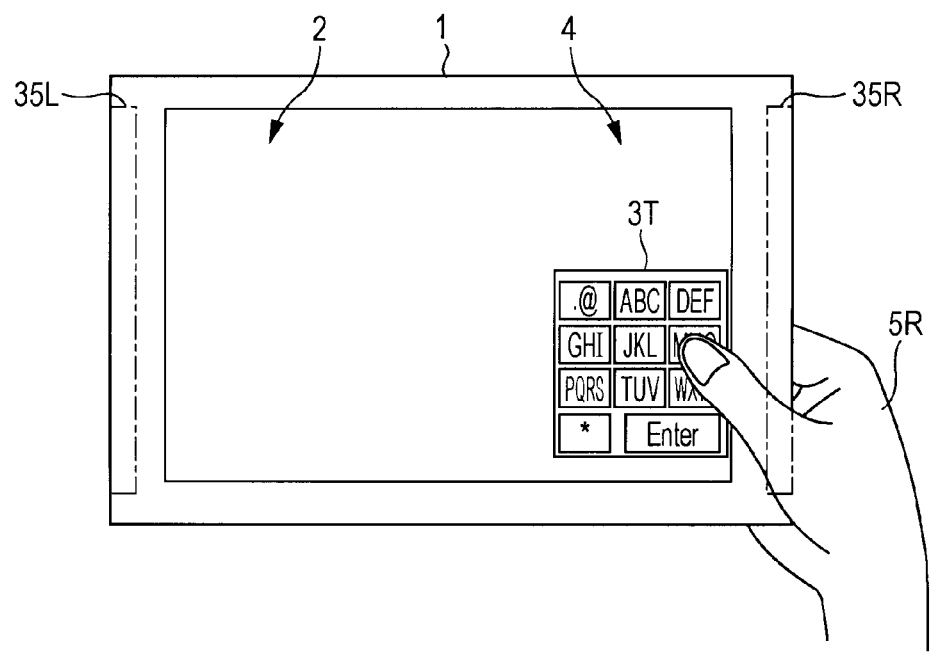
FIG. 36 is a drawing used to explain another example of further improving precision in holding state judgment by using side touch panels.
Figure 37:
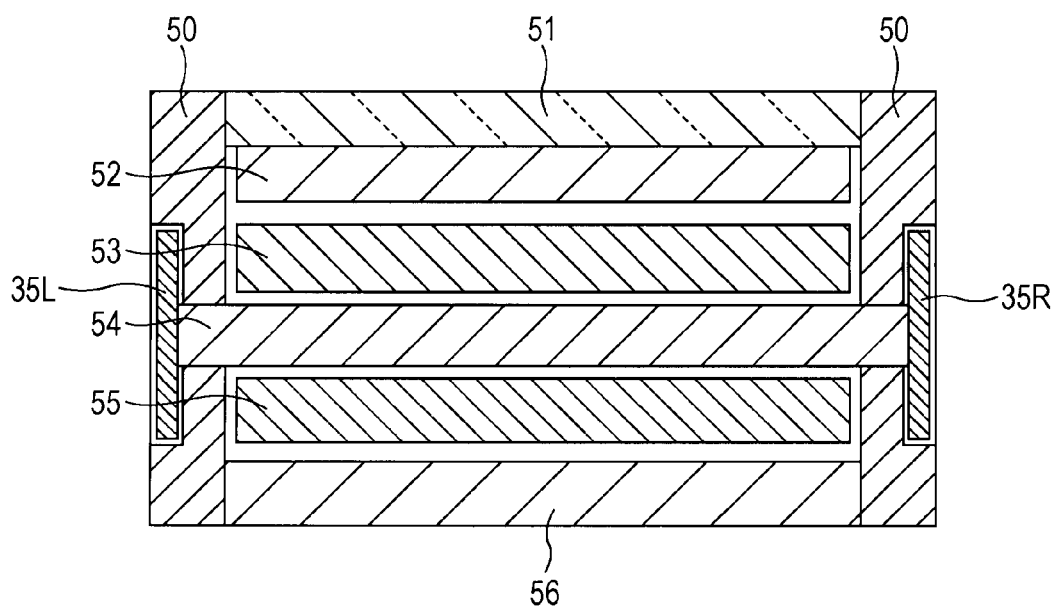
FIG. 37 schematically illustrates the sectional structure of a mobile information terminal according to another embodiment that can further improve precision in holding state judgment by using the side touch panels.

The mobile information terminal 1 in this embodiment may also have a side touch panel 35L on the left side of the case and a side touch panel 35R on the right side as shown in FIGS. 36 and 37. In addition to interface control based on touch detection information, which is obtained from the rear touch panel 27, the mobile information terminal in this embodiment can further improve precision in holding state judgment by using proximity detection information obtained from the side touch panels 35L and 35R. FIG. 37 schematically illustrates the sectional structure of the mobile information terminal in this embodiment as in FIG. 2. As shown in FIG. 37, the side touch panels 35L and 35R are electrically connected to the driving circuit and circuit board 54, which controls the operations of the side touch panels 35L and 35R; the driving circuit and circuit board 54 includes an electronic circuit that can process touch detection signals from the side touch panels 35L and 35R.

In the case of the structure shown in FIGS. 36 and 37, if the mobile information terminal 1 is held with, for example, the right hand 5R of the user, the touch detection signal from the side touch panel 35R is obtained but the touch detection signal from the side touch panel 35L is not obtained. In the case of the mobile information terminal 1, if the mobile information terminal 1 is held with, for example, the left hand 5L, the proximity detection signal from the proximity sensor 33L is obtained but the touch detection signal from the side touch panel 35R is not obtained. If the mobile information terminal 1 is held with, for example, both hands, the right hand 5R and left hand 5L, of the user as in the example in FIG. 6, touch detection signals are obtained from both the side touch panels 35R and 35L.

Accordingly, if the holding state has been decided to be, for example, the right-hand holding state from the touch detection information from the rear touch panel 27 and only the touch detection signal has been obtained from the side touch panel 35R, the mobile information terminal 1 can reliably judge that the terminal has been placed in the right-hand holding state, in which the user holds the terminal with the right hand 5R. Conversely, if the holding state has been decided to be, for example, the left-hand holding state from the touch detection information from the rear touch panel 27 and only the touch detection signal has been obtained from the side touch panel 35L, the mobile information terminal 1 in this embodiment can reliably judge that the terminal has been placed in the left-hand holding state, in which the user holds the terminal with the left hand 5L. If the holding state has been decided to be, for example, the both-hand holding state from the touch detection information from the rear touch panel 27 and both the touch detection signal from the side touch panel 35R and the touch detection signal from the side touch panel 35L have been obtained, the mobile information terminal 1 in this embodiment can reliably judge that the terminal has been placed in the both-hand holding state, in which the user holds the terminal with both hands.

Fifth Interface Example

For the first to fourth interface examples described above, examples of controlling the display on the display panel 21 according to the holding state of the case have been described. The mobile information terminal in this embodiment can also control sound outputs from right and left speakers according to the holding state of the terminal, as a fifth interface.

Figure 38:
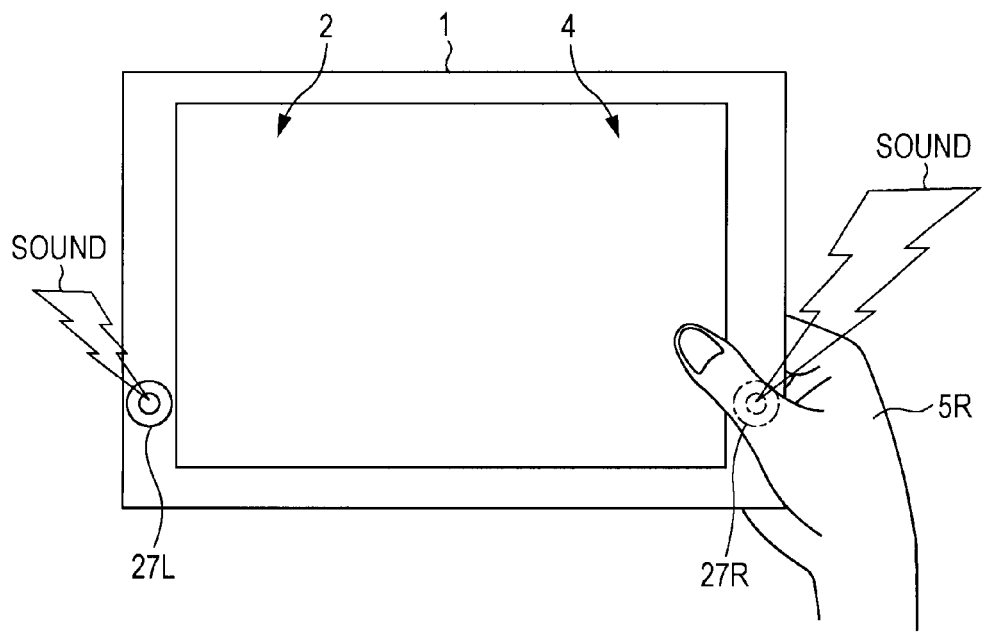
FIG. 38 is a drawing used to explain an embodiment that controls sound outputs from right and left speakers according to the holding state of the terminal.
Figure 39:
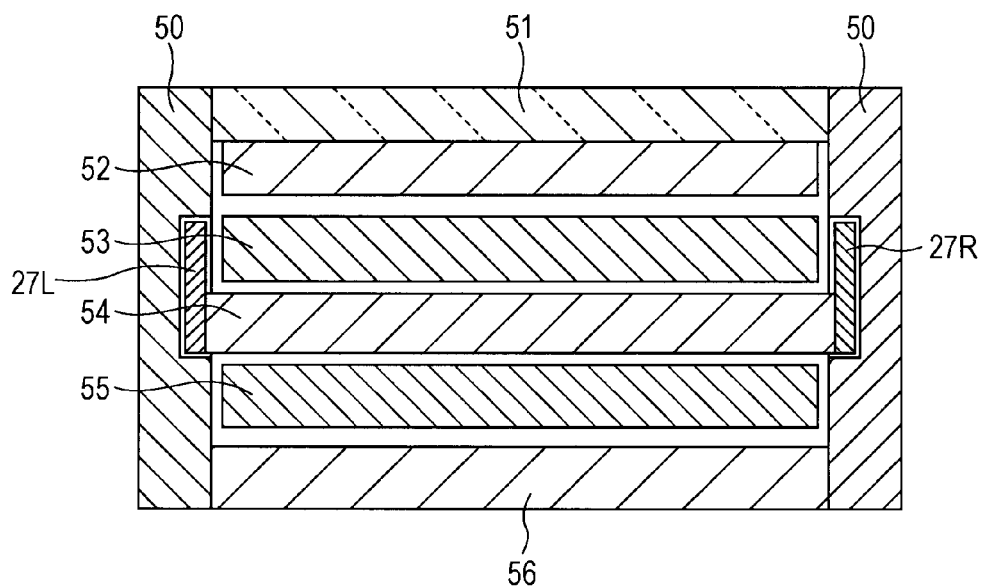
FIG. 39 schematically illustrates the sectional structure of a mobile information terminal in the embodiment that controls sound outputs from the right and left speakers according to the holding state of the terminal.

Specifically, the mobile information terminal 1 in this embodiment has a sound R-channel speaker 27R at the right edge of the case and a sound L-channel speaker 27L at the left edge of the case as shown in FIGS. 38 and 39. FIG. 39 schematically illustrates the sectional structure of the mobile information terminal in this embodiment as in FIG. 2. As shown in FIG. 39, the sound L-channel speaker 27L and sound R-channel speaker 27R are electrically connected to the driving circuit and circuit board 54, which controls the sound outputs from the sound L-channel speaker 27L and sound R-channel speaker 27R.

In the case of the structure shown in FIGS. 38 and 39, if the mobile information terminal 1 is held with, for example, the right hand 5R of the user, the sound R-channel speaker 27R is blocked with the right hand 5R but the sound L-channel speaker 27L is not blocked. If the mobile information terminal 1 is held with, for example, the left hand 5L, the sound L-channel speaker 27L is blocked with the left hand 5L but the sound R-channel speaker 27R is not blocked.

Accordingly, when the mobile information terminal in this embodiment has been placed in an operation mode in which sound outputs are generated from the sound L-channel speaker 27L and sound R-channel speaker 27R, if the holding state is decided to be, for example, the right-hand holding state from the touch detection information from the rear touch panel 27, the terminal carries out control so as to increase the sound output level of the sound R-channel speaker 27R blocked with the right hand 5R of the user. Similarly, when the mobile information terminal in this embodiment has been placed in an operation mode in which sound outputs are generated from the sound L-channel speaker 27L and sound R-channel speaker 27R, if the holding state is decided to be, for example, the left-hand holding state from the touch detection information from the rear touch panel 27, the terminal carries out control so as to increase the sound output level of the sound L-channel speaker 27L blocked with the left hand 5L of the user.

When the mobile information terminal in this embodiment has been placed in an operation mode in which sound outputs are generated from the sound L-channel speaker 27L and sound R-channel speaker 27R, if the holding state is decided to be, for example, the both-hand holding state from the touch detection information from the rear touch panel 27, the terminal carries out control so as to increase both the sound output level of the sound L-channel speaker 27L blocked with the left hand 5L of the user and the sound output level of the sound R-channel speaker 27R blocked with the right hand 5R of the user.

When the mobile information terminal in this embodiment has been placed in an operation mode in which sound outputs are generated from the sound L-channel speaker 27L and sound R-channel speaker 27R, if the holding state is decided to be, for example, the palm holding state or non-holding state from the touch detection information from the rear touch panel 27, the terminal carries out control so as to maintain the levels of the sound outputs from the sound L-channel speaker 27L and the sound R-channel speaker 27R at a normal setting.

[Flowchart for Sound Output Control According to the Holding State in the Fifth Interface]

Figure 40:
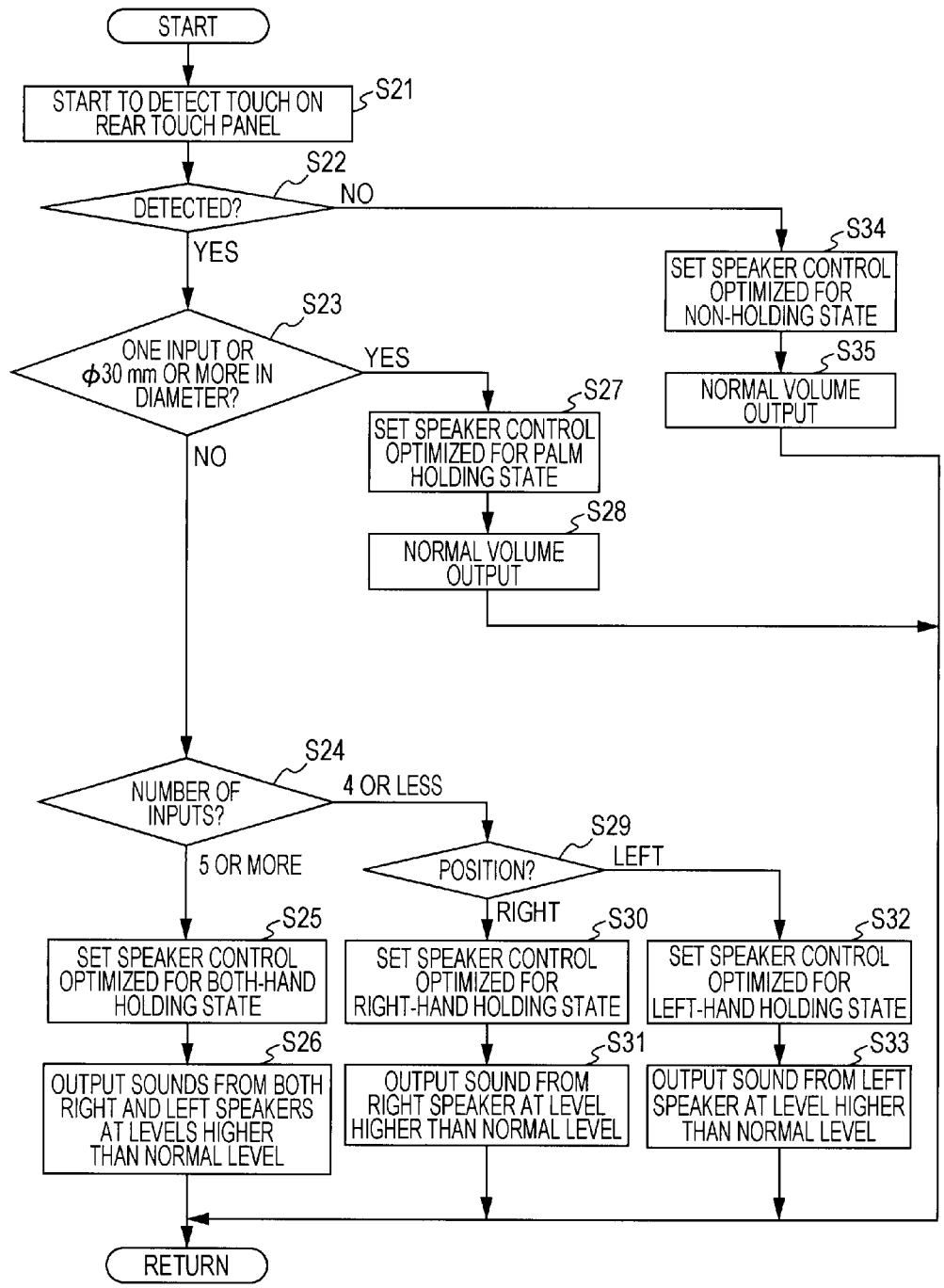
FIG. 40 is a flowchart illustrating the flow of processing carried out when sound outputs from the right and left speakers are controlled according to the holding state of the terminal.

FIG. 40 illustrates the flow of processing carried out by the mobile information terminal in this embodiment when the control and computation unit 12 in FIG. 1 controls sound outputs from the sound L-channel speaker 27L and sound R-channel speaker 27R through the sound signal processing unit 28 according to the touch detection information obtained from the front touch panel 26 through the touch panel controller 24. The processing in the flowchart in FIG. 40 is implemented when the control and computation unit 12 executes the operation control program in this embodiment. The operation control program in this embodiment may be provided as an independent program or parts of the operation control program may be included in various application programs by which, for example, sounds can be output. When the operation control program is provided separately as an independent program, the operation control program cooperates with the application program being executed in response to a request from the application program.

In the mobile information terminal in this embodiment, when the control and computation unit 12 enters an operation mode in which sounds are output from the sound L-channel speaker 27L and sound R-channel speaker 27R through the sound signal processing unit 28, the control and computation unit 12 starts the processing in the flowchart in FIG. 40.

When the processing in the flowchart in FIG. 40 starts, the control and computation unit 12 controls the touch panel controller 24 as the process in step S21 to start touch detection through the rear touch panel 27.

The control and computation unit 12 then monitors, as the process in step S22, whether a touch has been made by an external conductor on the rear touch panel 27. If a touch has been detected, the control and computation unit 12 causes the processing to proceed to step S23. If a touch has not been detected, the control and computation unit 12 causes the processing to proceed to step S34.

If the processing proceeds to step S34, the control and computation unit 12 decides that the mobile information terminal is in the non-holding state and makes a sound output setting optimized for the non-holding state, that is, makes a normal speaker control setting by which sounds are output from the sound L-channel speaker 27L and sound R-channel speaker 27R at, for example, the same sound output level. The control and computation unit 12 then causes the sound signal processing unit 28 to output sounds from the sound L-channel speaker 27L and sound R-channel speaker 27R at the same sound output level as the process in step S35. After the process in step S35 has been completed, the control and computation unit 12 returns the processing to the beginning.

If a touch has been detected in step S22 and the processing proceeds to step S23, the control and computation unit 12 decides whether the number of touch detecting areas is one or there is a touch detecting area the size of which is at least the predetermined size (30 mm or more in this embodiment).

If the control and computation unit 12 decides in step S23 that the number of touch detecting areas is not one or there is no touch detecting area 30 mm or more in size, that is, the number of touch detecting areas is two or more or the touch detecting area is less than 30 mm in size, the control and computation unit 12 causes the processing to proceed to step S24 and later. If the control and computation unit 12 decides that the number of touch detecting areas is one or there is a touch detecting area 30 mm or more in size, the control and computation unit 12 causes the processing to proceed to step S27 and later.

If the processing proceeds to step S27, the control and computation unit 12 decides that the mobile information terminal in this embodiment has been placed in the palm holding state and makes a sound output setting optimized for the non-holding state, that is, makes a normal speaker control setting by which sounds are output from the sound L-channel speaker 27L and sound R-channel speaker 27R at the same sound output level. The control and computation unit 12 then causes the sound signal processing unit 28 to output sounds from the sound L-channel speaker 27L and sound R-channel speaker 27R at the same sound output level as the process in step S28. After the process in step S28 has been completed, the control and computation unit 12 returns the processing to the beginning.

If the processing proceeds from step S23 to step S24, the control and computation unit 12 decides the number of touch detecting areas less than 30 mm in size. If that number is five or more, the control and computation unit 12 causes the processing to proceed to step S25. If that number is four or less, the control and computation unit 12 causes the processing to proceed to step S29.

If the processing proceeds to step S29, the control and computation unit 12 decides the positions of the touch detecting areas. If the positions of the touch detecting areas are near the right edge of the mobile information terminal, the control and computation unit 12 causes the processing to proceed to step S30. If the positions of the touch detecting areas are near the left edge of the mobile information terminal, the control and computation unit 12 causes the processing to proceed to step S32.

If the processing proceeds to step S30, the control and computation unit 12 decides that the mobile information terminal in this embodiment has been placed in the right-hand holding state and makes a sound output setting optimized for the right-hand holding state, that is, makes a speaker control setting by which the sound output level of the sound R-channel speaker 27R is increased. The control and computation unit 12 then causes the sound signal processing unit 28 to output sounds from the sound L-channel speaker 27L and sound R-channel speaker 27R with the sound output level of the sound R-channel speaker 27R increased as the process in step S31. After the process in step S31 has been completed, the control and computation unit 12 returns the processing to the beginning.

If the processing proceeds to step S32, the control and computation unit 12 decides that the mobile information terminal in this embodiment has been placed in the left-hand holding state and makes a sound output setting optimized for the left-hand holding state, that is, makes a speaker control setting by which the sound output level of the sound L-channel speaker 27L is increased. The control and computation unit 12 then causes the sound signal processing unit 28 to output sounds from the sound L-channel speaker 27L and sound R-channel speaker 27R with the sound output level of the sound L-channel speaker 27L increased as the process in step S33. After the process in step S33 has been completed, the control and computation unit 12 returns the processing to the beginning.

If the processing proceeds from step S24 to step S25, the control and computation unit 12 decides that the mobile information terminal in this embodiment has been placed in the both-hand holding state and makes a sound output setting optimized for the both-hand holding state, that is, makes a speaker control setting by which both the sound output level of the sound L-channel speaker 27L and the sound output level of the sound R-channel speaker 27R are increased. The control and computation unit 12 then causes the sound signal processing unit 28 to output sounds from the sound L-channel speaker 27L and sound R-channel speaker 27R at the increased sound output levels as the process in step S26. After the process in step S26 has been completed, the control and computation unit 12 returns the processing to the beginning.

Sixth Interface Example (Antenna Control According to the Holding State)

The mobile information terminal in this embodiment can also control antenna characteristics such as the sensitivity and output of an antenna according to the holding state of the terminal, as a sixth interface.

Figure 41:
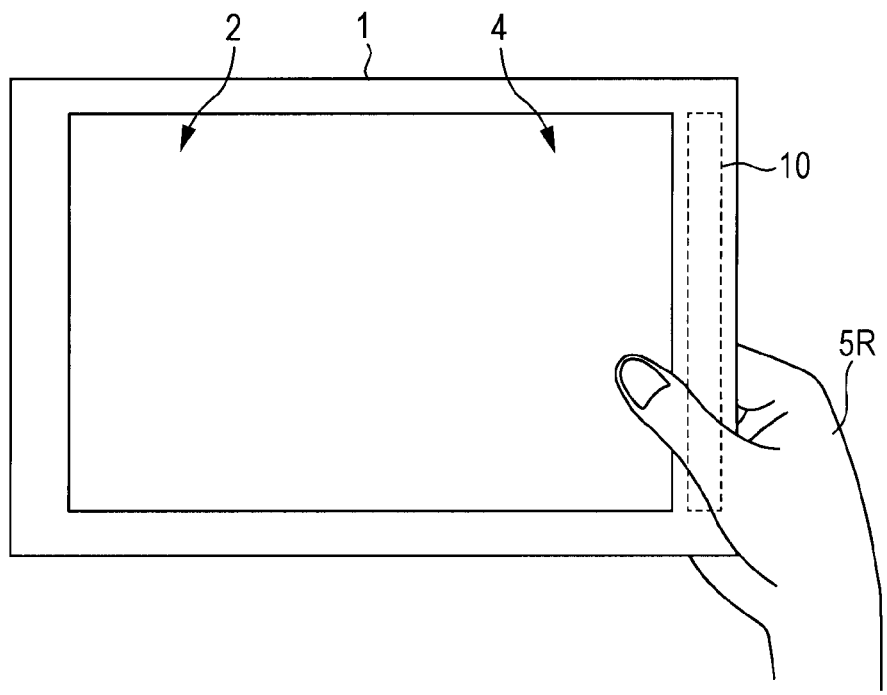
FIG. 41 is a drawing used to explain an embodiment that controls antenna characteristics according to the holding state of the terminal.
Figure 42:
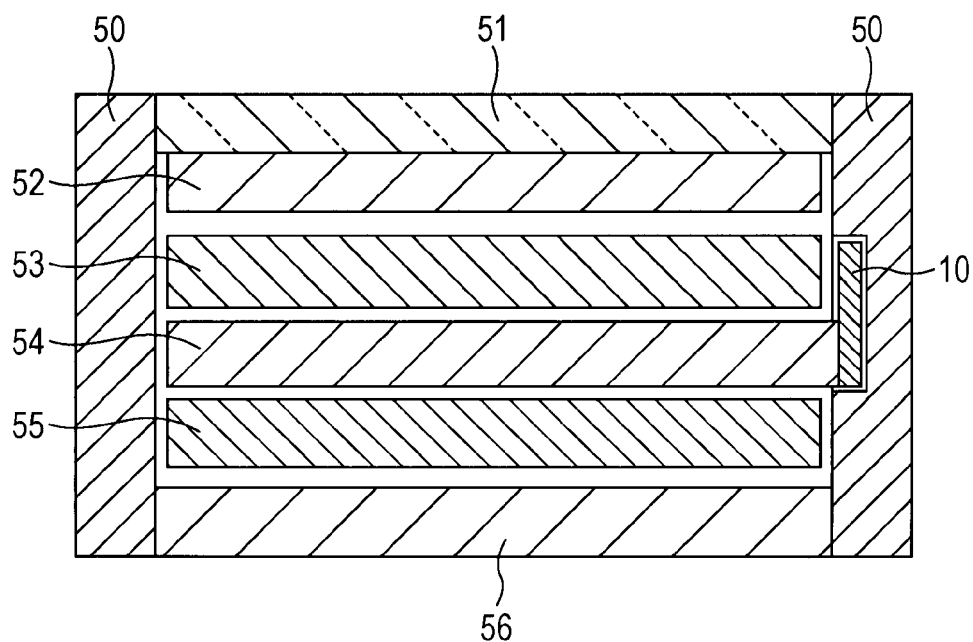
FIG. 42 schematically illustrates the sectional structure of a mobile information terminal in the embodiment that can control the antenna characteristics according to the holding state of the terminal.

Specifically, the mobile information terminal 1 in this embodiment has the communication antenna 10 at, for example, the right edge of the case as shown in FIGS. 41 and 42. FIG. 42 schematically illustrates the sectional structure of the mobile information terminal in this embodiment as in FIG. 2. As shown in FIG. 42, the communication antenna 10 is electrically connected to the driving circuit and circuit board 54, which controls the sensitivity and output of the communication antenna 10; the driving circuit and circuit board 54 includes an electronic circuit such as the communication unit 11, which enables wireless communication through the communication antenna 10.

In the case of the structure shown in FIGS. 41 and 42, if the right edge of the case of the mobile information terminal 1 is held with, for example, the right hand 5R of the user, the quality of wireless communication through the communication antenna 10 is highly likely to be deteriorated by the effect of the right hand 5R. Possible causes of the deterioration in wireless communication quality may be, for example, a reduced level of transmission from the communication antenna 10 and a reduced sensitivity in reception by the communication antenna 10. If the wireless communication quality is reduced, the error rates of transmission and reception signals may be increased and, in the worst case, wireless communication may be disabled.

Accordingly, when the mobile information terminal in this embodiment has been placed in an operation mode in which wireless communication is involved if the holding state is decided to be, for example, the right-hand holding state from the touch detection information from the rear touch panel 27, the terminal carries out control so as to suppress deterioration in wireless communication through the communication antenna 10.

Specifically, if the holding state is decided to be, for example, the right-hand holding state from the touch detection information from the rear touch panel 27, the terminal improves wireless communication quality by increasing the transmission level of the communication antenna 10, by increasing the reception gain of the communication antenna 10 to increase the sensitivity of the communication antenna 10, and by increasing the capability to correct error in communication data to reduce the error rate.

[Flowchart for Antenna Characteristic Control According to the Holding State in the Sixth Interface]

Figure 43:
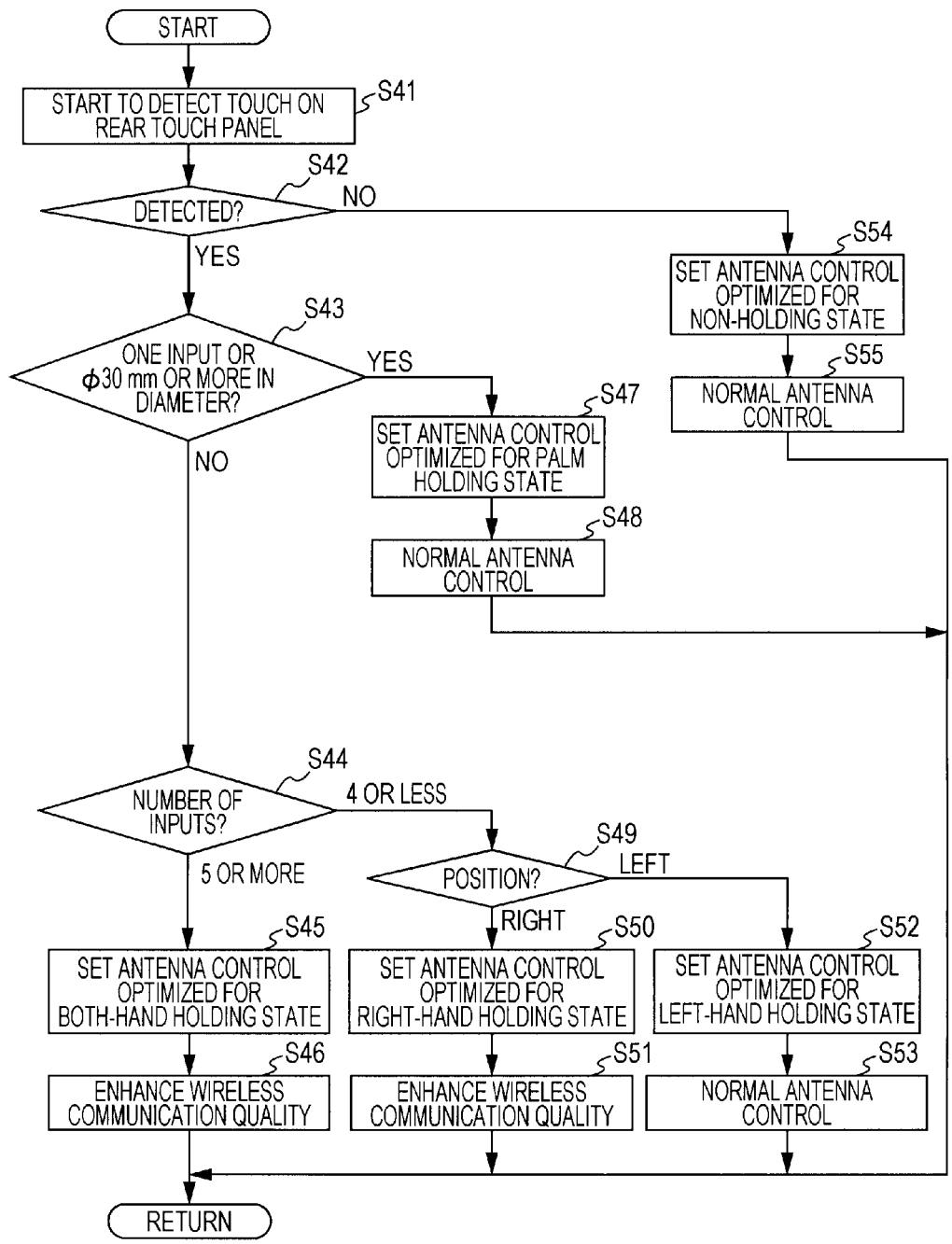
FIG. 43 is a flowchart illustrating the flow of processing carried out when the antenna characteristics are controlled according to the holding state of the terminal.

FIG. 43 illustrates the flow of processing carried out by the mobile information terminal in this embodiment when the control and computation unit 12 in FIG. 1 controls the communication unit 11 and the characteristics of the antenna 10 according to the touch detection information obtained from the front touch panel 26 through the touch panel controller 24. The processing in the flowchart in FIG. 43 is implemented when the control and computation unit 12 executes the operation control program in this embodiment. The operation control program in this embodiment may be provided as an independent program or parts of the operation control program may be included in various application programs that, for example, enable wireless communication. When the operation control program is provided separately as an independent program, the operation control program cooperates with the application program being executed in response to a request from the application program.

In the mobile information terminal in this embodiment, when the control and computation unit 12 enters an operation mode in which wireless communication is involved, that is, a mode in which the communication unit 11 carries out wireless communication through the antenna 10, the control and computation unit 12 starts the processing in the flowchart in FIG. 43.

When the processing in the flowchart in FIG. 43 starts, the control and computation unit 12 controls the touch panel controller 24 as the process in step S41 to start touch detection through the rear touch panel 27.

The control and computation unit 12 then monitors, as the process in step S42, whether a touch has been made by an external conductor on the rear touch panel 27. If a touch has been detected, the control and computation unit 12 causes the processing to proceed to step S43. If a touch has not been detected, the control and computation unit 12 causes the processing to proceed to step S54.

If the processing proceeds to step S54, the control and computation unit 12 decides that the mobile information terminal is in the non-holding state and makes an antenna control setting optimized for the non-holding state, that is, makes a normal antenna control setting effected when there is no deterioration in wireless communication quality. The control and computation unit 12 then causes the communication unit 11 to carry out wireless communication through the antenna 10, as the process in step S55. After the process in step S55 has been completed, the control and computation unit 12 returns the processing to the beginning.

If a touch has been detected in step S42 and the processing proceeds to step S43, the control and computation unit 12 decides whether the number of touch detecting areas is one or there is a touch detecting area the size of which is at least the predetermined size (30 mm or more in this embodiment). If the control and computation unit 12 decides in step S43 that the number of touch detecting areas is not one or there is no touch detecting area 30 mm or more in size, that is, the number of touch detecting areas is two or more or the touch detecting area is less than 30 mm in size, the control and computation unit 12 causes the processing to proceed to step S44 and later. If the control and computation unit 12 decides that the number of touch detecting areas is one or there is a touch detecting area 30 mm or more in size, the control and computation unit 12 causes the processing to proceed to step S47 and later.

If the processing proceeds to step S47, the control and computation unit 12 decides that the mobile information terminal in this embodiment is in the palm holding state and makes an antenna control setting optimized for the palm holding state, that is, makes a normal antenna control setting effected when there is no deterioration in wireless communication quality. The control and computation unit 12 then causes the communication unit 11 to carry out wireless communication through the antenna 10 as the process in step S48. After the process in step S48 has been completed, the control and computation unit 12 returns the processing to the beginning.

If the processing proceeds from step S43 to step S44, the control and computation unit 12 decides the number of touch detecting areas less than 30 mm in size. If that number is five or more, the control and computation unit 12 causes the processing to proceed to step S45. If that number is four or less, the control and computation unit 12 causes the processing to proceed to step S49.

If the processing proceeds to step S49, the control and computation unit 12 decides the positions of the touch detecting areas. If the positions of the touch detecting areas are near the right edge of the mobile information terminal, the control and computation unit 12 causes the processing to proceed to step S50. If the positions of the touch detecting areas are near the left edge of the mobile information terminal, the control and computation unit 12 causes the processing to proceed to step S52.

If the processing proceeds to step S50, the control and computation unit 12 decides that the mobile information terminal in this embodiment is in the right-hand holding state and makes an antenna control setting optimized for the right-hand holding state, that is, makes an antenna control setting by which wireless communication quality is enhanced through the antenna 10. The control and computation unit 12 then causes wireless communication to be carried out through the communication unit 11 and antenna 10 according to the antenna control setting by which the wireless communication quality is enhanced, as the process in step S51. After the process in step S51 has been completed, the control and computation unit 12 returns the processing to the beginning.

If the processing proceeds to step S52, the control and computation unit 12 decides that the mobile information terminal in this embodiment is in the left-hand holding state and makes an antenna control setting optimized for the left-hand holding state, that is, makes a normal antenna control setting effected when there is no deterioration in wireless communication quality. The control and computation unit 12 then causes the communication unit 11 to carry out wireless communication through the antenna 10, as the process in step S53. After the process in step S53 has been completed, the control and computation unit 12 returns the processing to the beginning.

If the processing proceeds from step S44 to step S45, the control and computation unit 12 decides that the mobile information terminal in this embodiment is in the both-hand holding state and makes an antenna control setting optimized for the both-hand holding state, that is, makes an antenna control setting by which wireless communication quality is enhanced through the antenna 10. The control and computation unit 12 then causes wireless communication to be carried out through the communication unit 11 and antenna 10 according to the antenna control setting by which the wireless communication quality is enhanced, as the process in step S46. After the process in step S46 has been completed, the control and computation unit 12 returns the processing to the beginning.

[Example of Controlling Antenna Switching According to the Holding State in the Sixth Interface]

The mobile information terminal in this embodiment can also control switching between a main antenna and a sub-antenna, as another specific example of the sixth interface.

Figure 44:
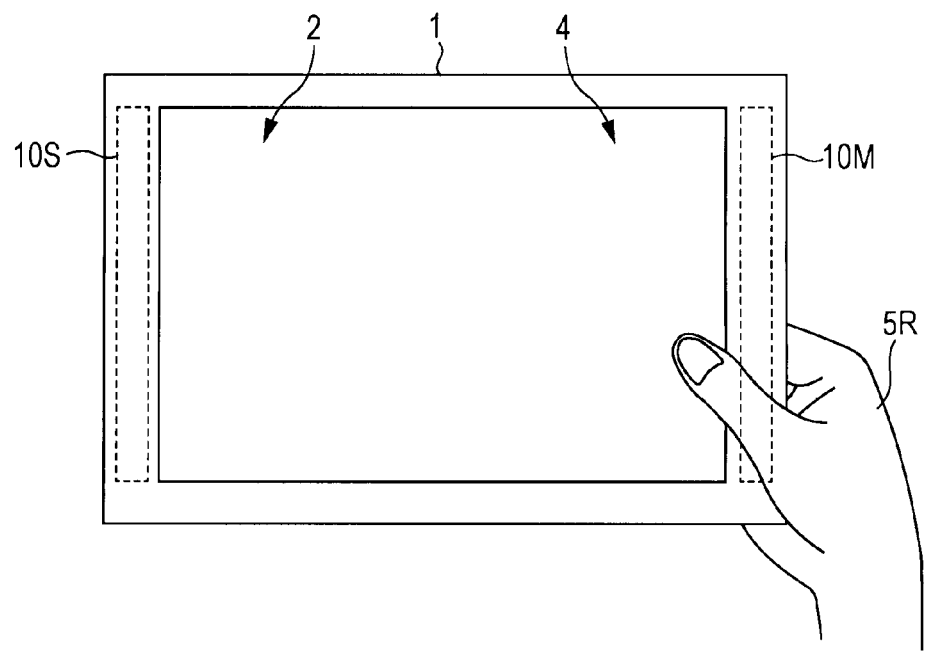
FIG. 44 is a drawing used to explain an embodiment that controls a switchover between a main antenna and a sub-antenna according to the holding state of the terminal.
Figure 45:
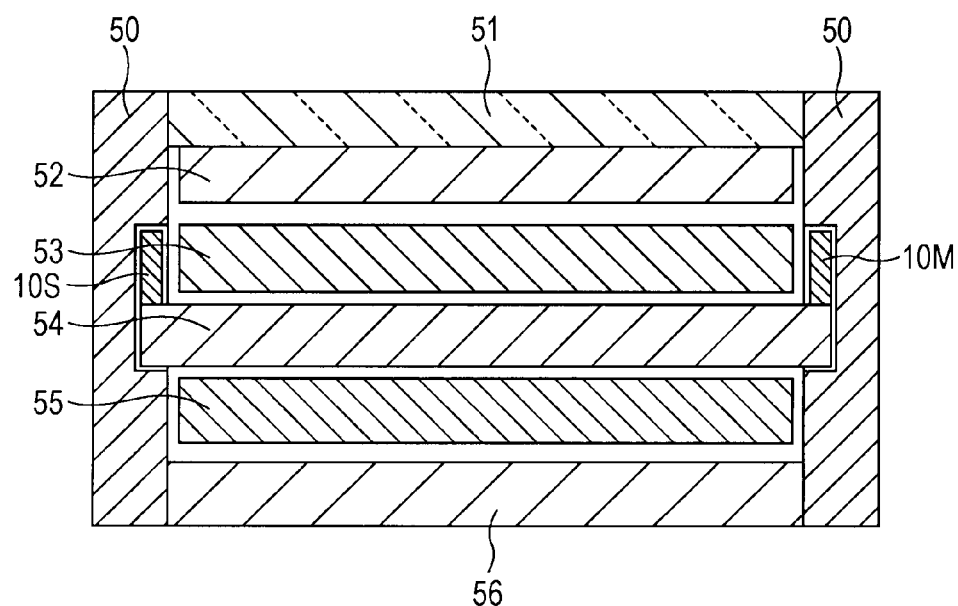
FIG. 45 schematically illustrates the sectional structure of a mobile information terminal in the embodiment that controls a switchover between the main antenna and the sub-antenna according to the holding state of the terminal.

Specifically, the mobile information terminal 1 in this embodiment has a main antenna 10M at the right edge of the case and a sub-antenna 10S at the left edge, for example, as shown in FIGS. 44 and 45. FIG. 45 schematically illustrates the sectional structure of the mobile information terminal in this embodiment as in FIG. 2. As shown in FIG. 45, the main antenna 10M and sub-antenna 10S are electrically connected to the driving circuit and circuit board 54, which controls switching between the main antenna 10M and sub-antenna 10S; the driving circuit and circuit board 54 includes an electronic circuit such as the communication unit 11, which enables wireless communication through the main antenna 10M and sub-antenna 10S.

In the case of the structure shown in FIGS. 44 and 45, if the right edge of the case of the mobile information terminal 1 is held with, for example, the right hand 5R of the user, the quality of wireless communication through the main antenna 10M is highly likely to be deteriorated by the effect of the right hand 5R, as in the example in FIG. 41.

Accordingly, when the mobile information terminal in this embodiment has been placed in an operation mode in which wireless communication is involved, if the holding state is decided to be, for example, the right-hand holding state from the touch detection information from the rear touch panel 27, the terminal carries out control so that the antenna to be used in wireless communication is switched from the main antenna 10M to the sub-antenna 10S to maintain the wireless communication quality.

If the left edge of the case of the mobile information terminal 1 is held with, for example, the left hand 5L of the user, the quality of wireless communication through the main antenna 10M does not deteriorate, so wireless communication through the main antenna 10M is continued.

[Flowchart for Antenna Switching Control According to the Holding State in the Sixth Interface]

Figure 46:
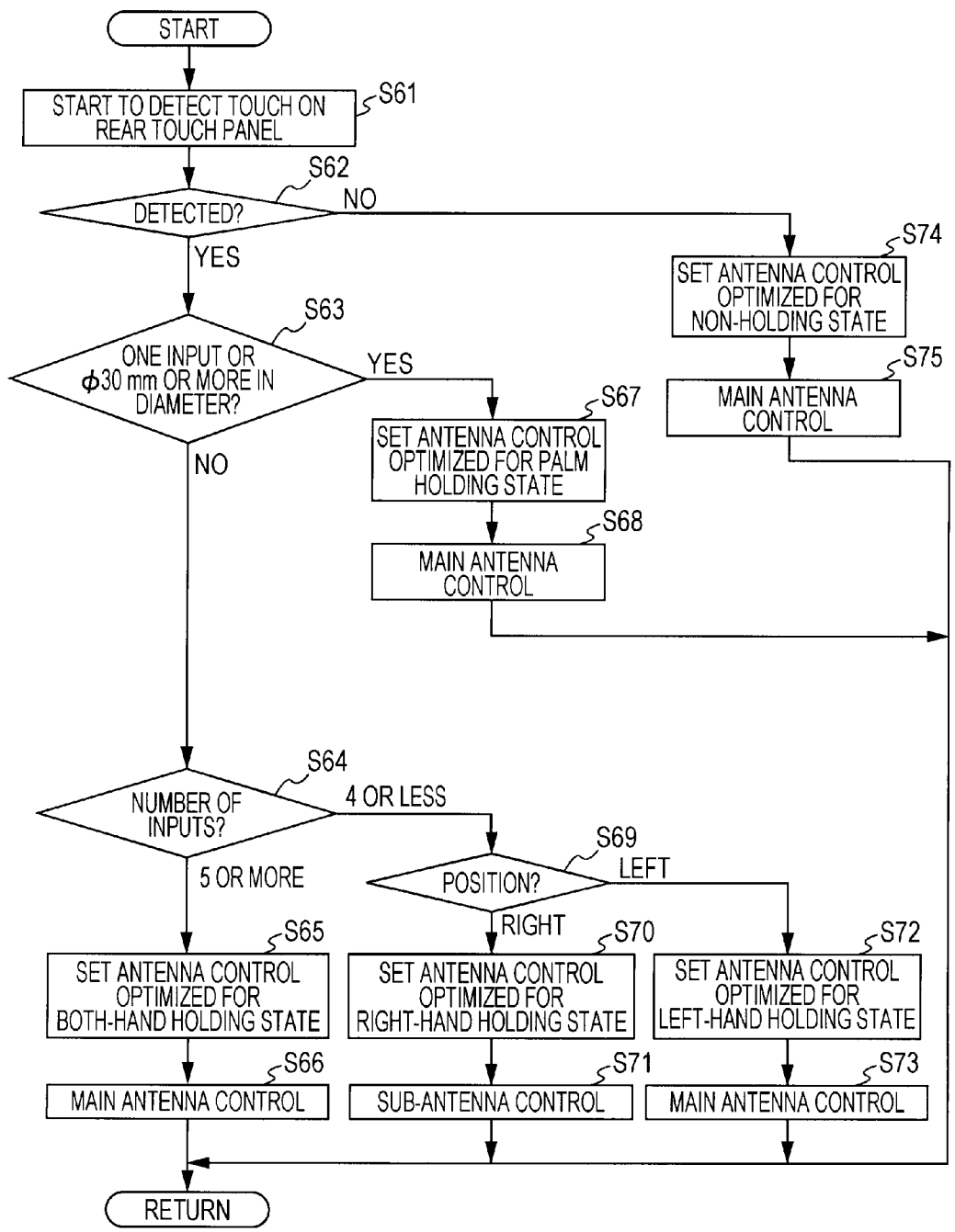
FIG. 46 is a flowchart illustrating the flow of processing carried out when a switchover is made between the main antenna and the sub-antenna according to the holding state of the terminal.

FIG. 46 illustrates the flow of processing carried out by the mobile information terminal in this embodiment when the control and computation unit 12 in FIG. 1 controls antenna switching according to the touch detection information obtained from the front touch panel 26 through the touch panel controller 24. The processing in the flowchart in FIG. 46 is implemented when the control and computation unit 12 executes the operation control program in this embodiment. The operation control program in this embodiment may be provided as an independent program or parts of the operation control program may be included in various application programs that, for example, enable wireless communication. When the operation control program is provided separately as an independent program, the operation control program cooperates with the application program being executed in response to a request from the application program.

In the mobile information terminal in this embodiment, when, for example, the control and computation unit 12 enters an operation mode in which wireless communication is involved, that is, a mode in which the communication unit 11 carries out wireless communication through the antenna 10, the control and computation unit 12 starts the processing in the flowchart in FIG. 46.

When the processing in the flowchart in FIG. 46 starts, the control and computation unit 12 controls the touch panel controller 24 as the process in step S61 to start touch detection through the rear touch panel 27.

The control and computation unit 12 then monitors, as the process in step S62, whether a touch has been made by an external conductor on the rear touch panel 27. If a touch has been detected, the control and computation unit 12 causes the processing to proceed to step S63. If a touch has not been detected, the control and computation unit 12 causes the processing to proceed to step S74.

If the processing proceeds to step S74, the control and computation unit 12 decides that the mobile information terminal is in the non-holding state and makes an antenna control setting optimized for the non-holding state, that is, makes an antenna switching control setting by which the main antenna 10M is used. The control and computation unit 12 then causes the communication unit 11 to carry out wireless communication through the antenna 10M as the process in step S75. After the process in step S75 has been completed, the control and computation unit 12 returns the processing to the beginning.

If a touch has been detected in step S62 and the processing proceeds to step S63, the control and computation unit 12 decides whether the number of touch detecting areas is one or there is a touch detecting area the size of which is at least the predetermined size (30 mm or more in this embodiment). If the control and computation unit 12 decides in step S63 that the number of touch detecting areas is not one or there is no touch detecting area 30 mm or more in size, that is, the number of touch detecting areas is two or more or the touch detecting area is less than 30 mm in size, the control and computation unit 12 causes the processing to proceed to step S64 and later. If the control and computation unit 12 decides that the number of touch detecting areas is one or there is a touch detecting area 30 mm or more in size, the control and computation unit 12 causes the processing to proceed to step S67 and later.

If the processing proceeds to step S67, the control and computation unit 12 decides that the mobile information terminal in this embodiment is in the palm holding state and makes an antenna control setting optimized for the palm holding state, that is, makes an antenna switching control setting by which the main antenna 10M is used. The control and computation unit 12 then causes the communication unit 11 to carry out wireless communication through the main antenna 10M as the process in step S68. After the process in step S68 has been completed, the control and computation unit 12 returns the processing to the beginning.

If the processing proceeds from step S63 to step S64, the control and computation unit 12 decides the number of touch detecting areas less than 30 mm in size. If that number is five or more, the control and computation unit 12 causes the processing to proceed to step S65. If that number is four or less, the control and computation unit 12 causes the processing to proceed to step S69.

If the processing proceeds to step S69, the control and computation unit 12 decides the positions of the touch detecting areas. If the positions of the touch detecting areas are near the right edge of the mobile information terminal, the control and computation unit 12 causes the processing to proceed to step S70. If the positions of the touch detecting areas are near the left edge of the mobile information terminal, the control and computation unit 12 causes the processing to proceed to step S72.

If the processing proceed to step S70, the control and computation unit 12 decides that the mobile information terminal in this embodiment is in the right-hand holding state and makes an antenna control setting optimized for the right-hand holding state, that is, makes an antenna switching control setting by which a switchover to the sub-antenna 10S occurs. The control and computation unit 12 then causes wireless communication to be carried out through the sub-antenna 10S as the process in step S71. After the process in step S71 has been completed, the control and computation unit 12 returns the processing to the beginning.

If the processing proceeds to step S72, the control and computation unit 12 decides that the mobile information terminal in this embodiment is in the left-hand holding state and makes an antenna control setting optimized for the left-hand holding state, that is, makes an antenna switching control setting by which the main antenna 10M is used. The control and computation unit 12 then causes wireless communication to be carried out through the main antenna 10M as the process in step S73. After the process in step S73 has been completed, the control and computation unit 12 returns the processing to the beginning.

If the processing proceeds from step S64 to step S65, the control and computation unit 12 decides that the mobile information terminal in this embodiment is in the both-hand holding state and makes an antenna control setting optimized for the both-hand holding state, that is, makes an antenna control setting by which the main antenna 10M is used. The control and computation unit 12 then causes wireless communication to be carried out through the main antenna 10M as the process in step S66. After the process in step S66 has been completed, the control and computation unit 12 returns the processing to the beginning.

Seventh Interface Example

The mobile information terminal in this embodiment can also control the changing of camera photography settings according to the camera photography mode and the holding state of the terminal, as a seventh interface example.

Figure 47:
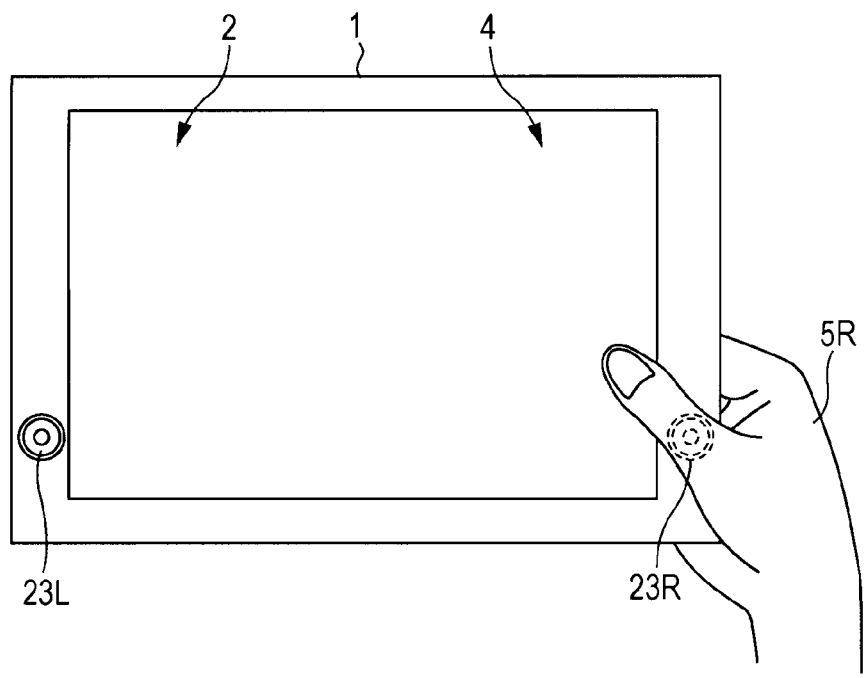
FIG. 47 is a drawing used to explain an embodiment that controls a switchover between a right camera and a left camera according to the holding state of the terminal.
Figure 48:
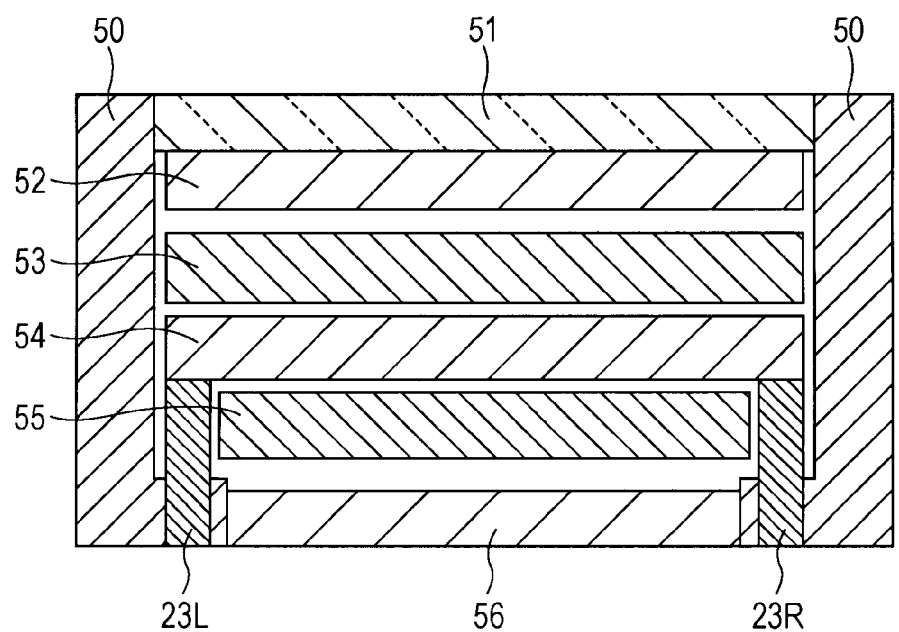
FIG. 48 schematically illustrates the sectional structure of a mobile information terminal in the embodiment that controls a switchover between the right camera and the left camera according to the holding state of the terminal.

Specifically, the mobile information terminal 1 in this embodiment has, for example, a right camera 23R at the right edge of the case and a left camera 23L at the left edge of the case as shown in FIGS. 47 and 48; in a normal two-dimensional video photography mode, for example, two-dimensional video photography is possible with one of the right camera 23R and left camera 23L. If the mobile information terminal 1 in this embodiment has been placed in a so-called three-dimensional video photography mode, the mobile information terminal 1 enables three-dimensional video photography with both the right camera 23R and left camera 23L. The mobile information terminal 1 in this embodiment also enables photography in a so-called timer photography mode. FIG. 48 schematically illustrates the sectional structure of the mobile information terminal in this embodiment as in FIG. 2. As shown in FIG. 48, the right camera 23R and left camera 23L are electrically connected to the driving circuit and circuit board 54, which enables video photography by appropriately selecting the right camera 23R or left camera 23L; the driving circuit and circuit board 54 includes electronic circuits of the camera controller 22. Videos to be photographed may be still pictures or moving pictures.

In the case of the structure shown in FIGS. 47 and 48, if the mobile information terminal 1 is held with, for example, the right hand 5R of the user, the right camera 23R is blocked with the right hand 5R but the left camera 23L remains unblocked. Conversely, if the mobile information terminal 1 is held with, for example, the left hand 5L, the left camera 23L is blocked with the left hand 5L but the right camera 23R remains unblocked.

Accordingly, when the camera photography mode of the mobile information terminal 1 in this embodiment is the normal two-dimensional video photography mode, if the holding state is decided to be, for example, the right-hand holding state from the touch detection information from the rear touch panel 27, the terminal carries out photography with the left camera 23L, which is not blocked with the hand of the user. When the camera photography mode is the two-dimensional video photography mode, if the holding state is decided to be, for example, the left-hand holding state from the touch detection information from the rear touch panel 27, the mobile information terminal 1 in this embodiment carries out photography with the right camera 23R, which is not blocked with the hand of the user.

When, for example, the camera photography mode of the mobile information terminal 1 in this embodiment is the two-dimensional video photography mode, if the holding state is decided to be, for example, the palm holding state from the touch detection information from the rear touch panel 27, the terminal displays, on the screen 2 of the display panel 21, a message indicating that photography will be carried out by using one of the right camera 23R and left camera 23L, which is an example, before carrying out two-dimensional video photography.

When, for example, the camera photography mode of the mobile information terminal 1 in this embodiment is the three-dimensional video photography mode, if the holding state is decided to be non-holding state from the touch detection information from the rear touch panel 27, the terminal judges that timer photography will carry out timer photography by using one of the right camera 23R and left camera 23L.

When, for example, the camera photography mode of the mobile information terminal 1 in this embodiment is the three-dimensional video photography mode, if the holding state is decided to be, for example, the right-hand holding state or left-hand holding state from the touch detection information from the rear touch panel 27, the terminal displays, on the screen 2 of the display panel 21, an error message indicating, for example, that three-dimensional photography is not possible.

[Flowchart for Camera Photography Control According to the Holding State in the Seventh Interface]

Figure 49:
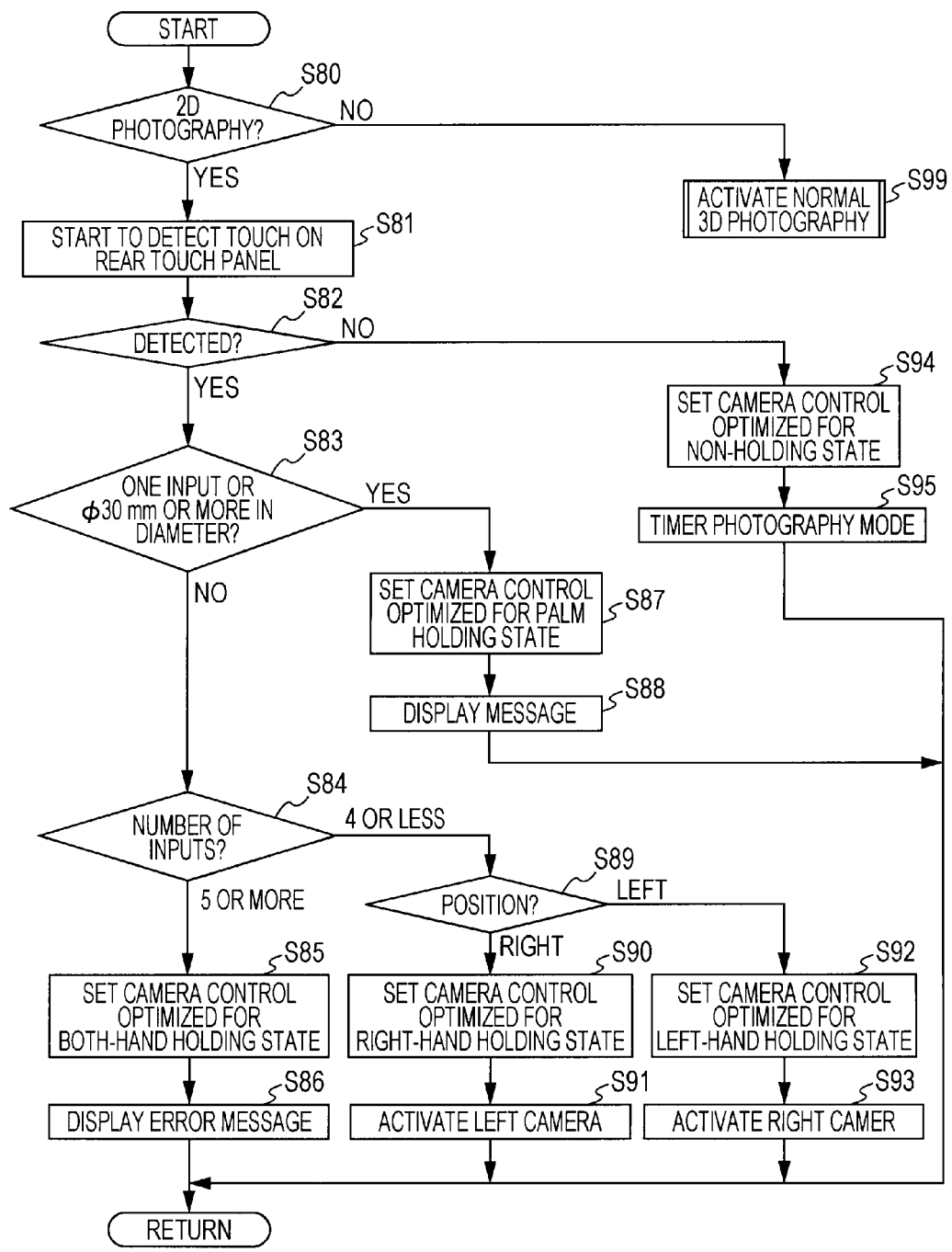
FIG. 49 is a flowchart illustrating the flow of processing carried out when a switchover is made between the right camera and the left camera according to the holding state of the terminal.
Figure 50:
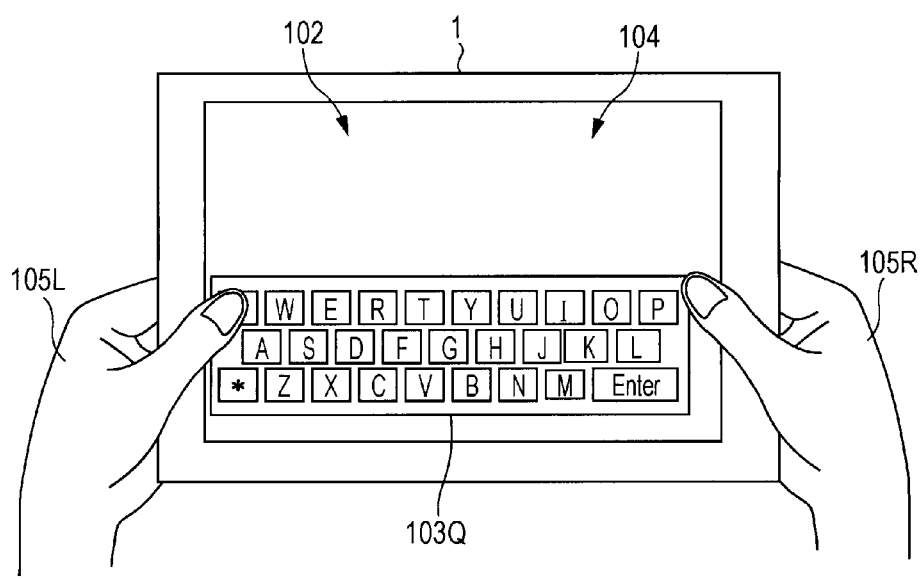
FIG. 50 illustrates an example in which a QWERTY keyboard is displayed on a display panel in a conventional user interface.

FIG. 49 illustrates the flow of processing carried out by the mobile information terminal in this embodiment when the control and computation unit 12 in FIG. 1 controls photography performed by the camera 23 through the camera controller 22 according to the touch detection information obtained from the front touch panel 26 through the touch panel controller 24. The processing in the flowchart in FIG. 49 is implemented when the control and computation unit 12 executes the operation control program in this embodiment. The operation control program in this embodiment may be provided as an independent program or parts of the operation control program may be included in various application programs that, for example, enable camera photography. When the operation control program is provided separately as an independent program, the operation control program cooperates with the application program being executed in response to a request from the application program.

When the camera photography mode is started in the mobile information terminal in this embodiment, the control and computation unit 12 starts the processing in the flowchart in FIG. 49.

When the processing in the flowchart in FIG. 49 starts, the control and computation unit 12 decides as the process in step S80 whether the camera photography mode is the two-dimensional video photography mode. If the camera photography mode is the two-dimensional video photography mode, the control and computation unit 12 causes the processing to proceed to step S81. If the camera photography mode is not the two-dimensional video photography mode, that is, the three-dimensional video photography mode, the control and computation unit 12 causes the processing to proceed to step S99.

If the processing proceeds to step S99, the control and computation unit 12 activates both the right camera 23R and left camera 23L through the camera controller 22 and executes three-dimensional video photography in which the right camera 23R and left camera 23L are used.

If the control and computation unit 12 decides in step S80 that the camera photography mode is the two-dimensional video photography mode and causes the processing to proceed to step S81, the control and computation unit 12 controls the touch panel controller 24 to start touch detection through the rear touch panel 27.

The control and computation unit 12 then monitors, as the process in step S82, whether a touch has been made by an external conductor on the rear touch panel 27. If a touch has been detected, the control and computation unit 12 causes the processing to proceed to step S83. If a touch has not been detected, the control and computation unit 12 causes the processing to proceed to step S94.

If the processing proceeds to step S94, the control and computation unit 12 decides that the mobile information terminal is in the non-holding state and makes a camera control setting in the non-holding state, that is, makes a camera control setting for photography in, for example, the timer photography mode. As the process in step S95, the control and computation unit 12 then executes timer photography in which one of the right camera 23R and left camera 23L is used, through the camera controller 22. After the process in step S95 has been completed, the control and computation unit 12 returns the processing to the beginning.

If a touch has been detected in step S82 and the processing proceeds to step S83, the control and computation unit 12 decides whether the number of touch detecting areas is one or there is a touch detecting area the size of which is at least the predetermined size (30 mm or more in this embodiment). If the control and computation unit 12 decides in step S83 that the number of touch detecting areas is not one or there is no touch detecting area 30 mm or more in size, that is, the number of touch detecting areas is two or more or the touch detecting area is less than 30 mm in size, the control and computation unit 12 causes the processing to proceed to step S84 and later. If the control and computation unit 12 decides that the number of touch detecting areas is one or there is a touch detecting area 30 mm or more in size, the control and computation unit 12 causes the processing to proceed to step S87 and later.

If the processing proceeds to step S87, the control and computation unit 12 decides that the mobile information terminal in this embodiment has been placed in the palm holding state and makes a camera control setting optimized for the palm holding state. The control and computation unit 12 then displays, on the screen 2 of the display panel 21, a message indicating that photography will be carried out by using one of the right camera 23R and left camera 23L through the camera controller 22 as the process in step S88, and executes photography, in which one of the right camera 23R and left camera 23L is used, through the camera controller 22. After the process in step S88 has been completed, the control and computation unit 12 returns the processing to the beginning.

If the processing proceeds from step S83 to step S84, the control and computation unit 12 decides the number of touch detecting areas less than 30 mm in size. If that number is five or more, the control and computation unit 12 causes the processing to proceed to step S85. If that number is four or less, the control and computation unit 12 causes the processing to proceed to step S89.

If the processing proceeds to step S89, the control and computation unit 12 decides the positions of the touch detecting areas. If the positions of the touch detecting areas are near the right edge of the mobile information terminal, the control and computation unit 12 causes the processing to proceed to step S90. If the positions of the touch detecting areas are near the left edge of the mobile information terminal, the control and computation unit 12 causes the processing to proceed to step S92.

If the processing proceeds to step S90, the control and computation unit 12 decides that the mobile information terminal in this embodiment is in the right-hand holding state and makes a camera control setting optimized for the right-hand holding state, that is, makes a camera control setting that enables photography in which the left camera 23L is used. As the process in step S91, the control and computation unit 12 then activates the left camera 23L through the camera controller 22 while leaving the right camera 23R stopped, and executes photography with the activated left camera 23L. After the process in step S91 has been completed, the control and computation unit 12 returns the processing to the beginning. Since, in this embodiment, the right camera 23R is left stopped, it also becomes possible to suppress electric power consumption.

If the processing proceeds to step S92, the control and computation unit 12 decides that the mobile information terminal in this embodiment is in the left-hand holding state and makes a camera control setting optimized for the left-hand holding state, that is, makes a camera control setting that enables photography in which the right camera 23R is used. As the process in step S93, the control and computation unit 12 then activates the right camera 23R through the camera controller 22 while leaving the left camera 23L stopped, and executes photography with the activated right camera 23R. After the process in step S93 has been completed, the control and computation unit 12 returns the processing to the beginning. Since, in this embodiment, the left camera 23L is left stopped, it also becomes possible to suppress electric power consumption.

If the processing proceeds from step S84 to step S85, the control and computation unit 12 decides that the mobile information terminal in this embodiment is in the both-hand holding state and makes a camera control setting optimized for the both-hand holding state. That is, in this case, it can be considered that neither the right camera 23R nor left camera 23L can be used. Therefore, as the process in step S86, the control and computation unit 12 displays, on the screen 2 of the display panel 21, an error message through the camera controller 22, the error message notifying the user that photography is disabled because both the right camera 23R and left camera 23L are blocked by the hands, to ask the user to release at least either hand. After the process in step S86 has been completed, the control and computation unit 12 returns the processing to the beginning.

[Generalization]

The mobile information terminal according to an embodiment of the present disclosure has a display panel with a display surface, a front touch panel that detects a touch of an external conductor, the front touch panel being provided on the display surface of the display panel, a rear touch panel that detects a touch of an external conductor, the rear touch panel being provided on the rear of a case and being opposite to the front touch panel, and a controller that controls a plurality of functions of the terminal. The controller of the mobile information terminal in this embodiment controls prescribed functions of the terminal according at least to the area of contact detecting areas at the contacts of external conductors with the rear touch panel and to the number of these contact detecting areas.

The controller controls a function that displays a keyboard including a plurality of keys used to display characters on the display surface of the display panel and also controls a function that associates the keys of the keyboard displayed on the display surface with contact sensitive areas on the front touch panel; the controller associates positions at which keys of the keyboard are displayed on the display surface of the display panel and the sizes of the keys with the positions and sizes of the contact sensitive areas on the front touch panel, according to the area of contact detecting areas at the contacts of external conductors with the rear touch panel and to the number of these contact detecting areas.

If a contact of an external conductor has not been detected on the rear touch panel or if the sizes of the contact detecting areas at the time of detecting contacts of external conductors on the rear touch panel are equal to or larger than a prescribed size and the number of these contact detecting areas is equal to or larger than a first number, the controller displays a first keyboard in a first form on the display surface of the display panel. If the size of the contact detecting areas at the time of detecting contacts of external conductors on the rear touch panel is equal to or larger than the prescribed size but the number of these contact detecting areas is smaller than the first number, the controller displays a second keyboard in the first form, which has a smaller display size than the first keyboard. If the size of the contact detecting areas at the time of detecting contacts of external conductors on the rear touch panel is smaller than the prescribed size and the number of these contact detecting areas is equal to or larger than a second number, the controller divides the first keyboard into two parts and displays the divided keyboards at separate positions on the display surface of the display panel. If the size of the contact detecting areas at the time of detecting contacts of external conductors on the rear touch panel is smaller than the prescribed size but the number of these contact detecting areas is smaller than the second number, the controller displays a third keyboard in a second form at a position, which corresponds to the contact detecting areas on the panel of the rear touch panel, on the front touch panel.

The keyboard in the first form is a QWERTY keyboard, and the keyboard in the second form is a 10-key keyboard.

When the controller divides the first keyboard into two parts and displays the divided keyboards, the controller shifts the position of the contact sensitive areas on the front touch panel in a prescribed direction from the positions at which the keys of the divided keyboards are displayed.

When the controller displays the third keyboard, the controller shifts the positions of the contact sensitive areas on the front touch panel in a prescribed direction from the positions at which the keys of the third keyboard is displayed.

The mobile information terminal in this embodiment has a proximity sensor that detects a proximity of an external object. In this case, the controller controls prescribed functions of the terminal according at least to the area of contact detecting areas at the contacts of external conductors with the rear touch panel, to the number of these contact detecting areas, and to a proximity detecting signal generated by the proximity sensor for the external object.

The mobile information terminal in this embodiment has a side touch panel, which is placed on a side of the case of the terminal to detect a contact of an external conductor. In this case, the controller controls prescribed functions of the terminal according at least to the area of contact detecting areas at the contacts of external conductors with the rear touch panel, to the number of these contact detecting areas, and to a contact detecting signal generated when the external conductor touches the side touch panel.

The mobile information terminal in this embodiment has a right-channel sound output unit and a left-channel sound output unit. In this case, the controller controls sound output functions of the right-channel sound output unit and left-channel sound output unit and adjusts output volumes from the right-channel sound output unit and the left-channel sound output unit according at least to the area of contact detecting areas at the contacts of external conductors with the rear touch panel and to the number of these contact detecting areas.

In this case, if a contact of an external conductor has not been detected on the rear touch panel or if contact detecting areas at the time of detecting contacts of external conductors on the rear touch panel are equal to or larger than a prescribed size or the number of these contact detecting areas is a first number, the controller adjusts both output volumes from the right-channel sound output unit and left-channel sound output unit to a normal volume. If the contact detecting areas at the time of detecting contacts of external conductors on the rear touch panel are smaller than the prescribed size, the number of these contact detecting areas is equal to or larger than a second number, and the contact detecting areas on the rear touch panel correspond to the location of the right-channel sound output unit, the controller adjusts an output volume from the right-channel sound output unit to a volume larger than an output volume from the left-channel sound output unit. If the contact detecting areas at the time of detecting contacts of external conductors on the rear touch panel are smaller than the prescribed size, the number of these contact detecting areas is equal to or larger than the second number, and the contact detecting areas on the rear touch panel correspond to the location of the left-channel sound output unit, the controller adjusts the output volume from the left-channel sound output unit to a volume larger than the output volume from the right-channel sound output unit. If the contact detecting areas at the time of detecting contacts of external conductors on the rear touch panel are smaller than the prescribed size and the number of these contact detecting areas is equal to or larger than a third number, the controller adjusts both the output volumes from the right-channel sound output unit and left-channel sound output unit to a volume larger than the normal volume.

The mobile information terminal in this embodiment has an antenna and a communication unit for use in wireless communication. In this case, the controller controls a function of setting antenna characteristics of the antenna and communication unit, and changes the setting of the antenna and communication unit according at least to the area of contact detecting areas at the contacts of external conductors with the rear touch panel and to the number of these contact detecting areas.

In this case, if a contact of an external conductor has not been detected on the rear touch panel or if contact detecting areas at the time of detecting contacts of external conductors on the rear touch panel are equal to or larger than a prescribed size or the number of these contact detecting areas is a first number, the controller sets the antenna characteristics of the antenna and communication unit to normal antenna characteristics. If the contact detecting areas at the time of detecting contacts of external conductors on the rear touch panel are smaller than the prescribed size, the number of these contact detecting areas is equal to or larger than a second number, and the contact detecting areas on the rear touch panel correspond to the location of the antenna, the controller makes an adjustment so that the antenna characteristics of the antenna and communication unit become higher than the normal antenna characteristics. If the contact detecting areas at the time of detecting contacts of external conductors on the rear touch panel are smaller than the prescribed size, the number of these contact detecting areas is equal to or larger than the second number, and the contact detecting areas on the rear touch panel does not correspond to the location of the antenna, the controller sets the antenna characteristics of the antenna and communication unit to the normal antenna characteristics. If the contact detecting areas at the time of detecting contacts of external conductors on the rear touch panel are smaller than the prescribed size and the number of these contact detecting areas is equal to or larger than a third number, the controller sets the antenna characteristics of the antenna and communication unit to the normal antenna characteristics.

The mobile information terminal in this embodiment has a main antenna and a second antenna. In this case, the controller controls a function of switching between the main antenna and the sub-antenna, and switches an antenna to be used in wireless communication to one of the main antenna and the sub-antenna according at least to the area of contact detecting areas at the contacts of external conductors with the rear touch panel and to the number of these contact detecting areas.

In this case, if a contact of an external conductor has not been detected on the rear touch panel or if contact detecting areas at the time of detecting contacts of external conductors on the rear touch panel are equal to or larger than a prescribed size or the number of these contact detecting areas is a first number, the controller switches the antenna to be used in wireless communication to the main antenna. If the contact detecting areas at the time of detecting contacts of external conductors on the rear touch panel are smaller than the prescribed size, the number of these contact detecting areas is equal to or larger than a second number, and the contact detecting areas on the rear touch panel correspond to the location of the main antenna, the controller switches the antenna to be used in wireless communication to the sub-antenna. If the contact detecting areas at the time of detecting contacts of external conductors on the rear touch panel are smaller than the prescribed size, the number of these contact detecting areas is equal to or larger than the second number, and the contact detecting areas on the rear touch panel correspond to the location of the sub-antenna, the controller switches the antenna to be used in wireless communication to the main antenna. If the contact detecting areas at the time of detecting contacts of external conductors on the rear touch panel are smaller than the prescribed size and the number of these contact detecting areas is equal to or larger than a third number, the controller switches the antenna to be used in wireless communication to the main antenna.

The mobile information terminal in this embodiment has a first camera and a second camera. In this case, the controller controls a function of switching between the first camera and the second camera and a function of providing a display on the display surface of the display panel, and carries out photography by using one of the first camera and the second camera according at least to the area of contact detecting areas at the contacts of external conductors with the rear touch panel and to the number of these contact detecting areas.

In this case, if a contact of an external conductor has not been detected on the rear touch panel, the controller carries out timer photography by using one of the first camera and the second camera. If contact detecting areas at the time of detecting contacts of external conductors on the rear touch panel are equal to or larger than a prescribed size or the number of these contact detecting areas is a first number, the controller displays a prescribed notification message on the display surface of the display panel and carries out photography by using one of the first camera and the second camera. If the contact detecting areas at the time of detecting contacts of external conductors on the rear touch panel are smaller than the prescribed size, the number of these contact detecting areas is equal to or larger than a second number, and the contact detecting areas on the rear touch panel correspond to the location of the first camera, the controller carries out photography by using the second camera. If the contact detecting areas at the time of detecting contacts of external conductors on the rear touch panel are smaller than the prescribed size, the number of these contact detecting areas is equal to or larger than the second number, and the contact detecting areas on the rear touch panel correspond to the location of the second camera, the controller carries out photography by using the first camera. If the contact detecting areas at the time of detecting contacts of external conductors on the rear touch panel are smaller than the prescribed size and the number of these contact detecting areas is equal to or larger than a third number, the controller displays a prescribed error message on the display surface of the display panel.

An operation control program according to an embodiment of the present invention is an operation control program for a mobile information terminal has a display panel with a display surface, a front touch panel that detects a touch of an external conductor, the front touch panel being provided on the display surface of the display panel, a rear touch panel that detects a touch of an external conductor, the rear touch panel being provided on the rear of a case and being opposite to the front touch panel, and a controller that controls a plurality of functions of the terminal. The operation control program in this embodiment operates the mobile information terminal according at least to the area of contact detecting areas at the contacts of external conductors with the rear touch panel and to the number of these contact detecting areas so that prescribed functions of the terminal are controlled.

An operation control method according to an embodiment of the present invention is a method by which the operation of a mobile information terminal is controlled that has a display panel with a display surface, a front touch panel that detects a touch of an external conductor, the front touch panel being provided on the display surface of the display panel, a rear touch panel that detects a touch of an external conductor, the rear touch panel being provided on the rear of a case and being opposite to the front touch panel, and a controller that controls a plurality of functions of the terminal. The operation control method in this embodiment controls prescribed functions of the terminal according at least to the area of contact detecting areas at the contacts of external conductors with the rear touch panel and to the number of these contact detecting areas.

A storage medium according to an embodiment of the present invention is a storage medium that stores an operation control program for a mobile information terminal that has a display panel with a display surface, a front touch panel that detects a touch of an external conductor, the front touch panel being provided on the display surface of the display panel, a rear touch panel that detects a touch of an external conductor, the rear touch panel being provided on the rear of a case and being opposite to the front touch panel, and a controller that controls a plurality of functions of the terminal. The operation control program stored on the storage medium in this embodiment operates the mobile information terminal according at least to the area of contact detecting areas at the contacts of external conductors with the rear touch panel and to the number of these contact detecting areas so that prescribed functions of the terminal are controlled.

As described above, the mobile information terminal according to an embodiment of the present invention has various functions such as a function of displaying a user interface screen, a function of controlling an antenna setting, and a function of controlling a camera setting, so the mobile information terminal can achieve optimum functions for various holding states when, for example, the user holds the mobile information terminal, without increasing the cost.

The mobile information terminal according to this embodiment can be applied not only to mobile terminals having a rear touch panel such as, for example, advanced mobile telephone terminals, tablet terminals, and slate personal computers (PCs), as well as, for example, so-called personal digital assistants (PDAs), notebook personal computers, mobile game machines, and mobile navigation terminals, but also to various stationary electronic devices.

Although the present invention has been described through the embodiments above, these embodiments are an example of the present invention. It will be appreciated that variations and modifications are possible according to, for example, design without departing from the technical concept of the present invention.

It will be also understood by those skilled in the art that various modification and combinations and other embodiments may be derived from design and other elements within the range of the claims of the present invention or an equivalent range of the claims.

The invention claimed is:

1. A mobile communication terminal comprising: a display panel; a first touch panel provided on a surface of the display panel; a second touch panel provided on at least one surface of the mobile communication terminal other than the surface of the display panel; and circuitry configured to control the display panel to display a QWERTY keyboard when a size corresponding to a touch input detected at the second touch panel is greater than or equal to a predetermined size; control the display panel to display a QWERTY keyboard divided into two separate parts when the size corresponding to the touch input is less than the predetermined size and a number of contacts corresponding to the touch input is equal to or greater than a first predetermined number; control the display panel to display a second keyboard having a size smaller than the QWERTY keyboard near a right edge of the display panel when the size corresponding to the touch input is less than the predetermined size, the number of contacts corresponding to the touch input is less than or equal to the second predetermined number, and a position corresponding to the touch input is near a right edge of the mobile communication terminal; and control the display panel to display the second keyboard near a left edge of the display panel when the size corresponding to the touch input is less than the predetermined size, the number of contacts corresponding to the touch input is less than or equal to a second predetermined number that is less than the first predetermined number, and a position corresponding to the touch input is near a right edge of the mobile communication terminal.

2. The mobile communication terminal of claim 1, wherein
the display panel and the first touch panel are provided on a front surface of the mobile communication terminal, and the second touch panel is provided on a rear surface of the mobile communication terminal.

3. The mobile communication terminal of claim 1, wherein
the circuitry is configured to control the display to display the QWERTY keyboard when no touch input is detected at the second touch panel.

4. The mobile communication terminal of claim 1, wherein the circuitry is configured to control the display panel such that the second keyboard near the right edge of the display panel is the only keyboard displayed by the display panel when the size corresponding to the touch input is less than the predetermined size, the number of contacts corresponding to the touch input is less than or equal to the second predetermined number, and the position corresponding to the touch input is near a right edge of the mobile communication terminal.

5. The mobile communication terminal of claim 1, wherein the circuitry is configured to control the display panel such that the second keyboard near the left edge of the display panel is the only keyboard displayed by the display panel when the size corresponding to the touch input is less than the predetermined size, the number of contacts corresponding to the touch input is less than or equal to the second predetermined number, and the position corresponding to the touch input is near a right edge of the mobile communication terminal.

6. A method performed by a mobile communication terminal, the method comprising: displaying data at a display panel of the mobile communication terminal; detecting a first touch input at a first touch panel provided on a surface of the display panel; detecting a second touch input at a second touch panel provided on at least one surface of the mobile communication terminal other than the surface of the display panel; controlling the display panel to display a QWERTY keyboard when a size corresponding to the second touch input is greater than or equal to a predetermined size; controlling the display panel to display a QWERTY keyboard divided into two separate parts when the size corresponding to the second touch input is less than the predetermined size and a number of contacts corresponding to the touch input is equal to or greater than a first predetermined number; controlling the display panel to display a second keyboard having a size smaller than the QWERTY keyboard near a right edge of the display panel when the size corresponding to the second touch input is less than the predetermined size, the number of contacts corresponding to the touch input is less than or equal to the second predetermined number, and a position corresponding to the second touch input is near a right edge of the mobile communication terminal; and controlling the display panel to display the second keyboard near a left edge of the display panel when the size corresponding to the second touch input is less than the predetermined size, the number of contacts corresponding to the touch input is less than or equal to a second predetermined number that is less than the first predetermined number, and a position corresponding to the touch input is near a right edge of the mobile communication terminal.

7. A non-transitory computer-readable medium including computer program code, which when executed by a mobile communication terminal, causes the mobile communication terminal to perform a method comprising: displaying data at a display panel of the mobile communication terminal; detecting a first touch input at a first touch panel provided on a surface of the display panel; detecting a second touch input at a second touch panel provided on at least one surface of the mobile communication terminal other than the surface of the display panel; controlling the display panel to display a QWERTY keyboard when a size corresponding to the second touch input is greater than or equal to a predetermined size; controlling the display panel to display a QWERTY keyboard divided into two separate parts when the size corresponding to the second touch input is less than the predetermined size and a number of contacts corresponding to the touch input is equal to or greater than a first predetermined number; controlling the display panel to display a second keyboard having a size smaller than the QWERTY keyboard near a right edge of the display panel when the size corresponding to the second touch input is less than the predetermined size, the number of contacts corresponding to the touch input is less than or equal to the second predetermined number, and a position corresponding to the second touch input is near a right edge of the mobile communication terminal; and controlling the display panel to display the second keyboard near a left edge of the display panel when the size corresponding to the second touch input is less than the predetermined size, the number of contacts corresponding to the touch input is less than or equal to a second predetermined number that is less than the first predetermined number, and a position corresponding to the touch input is near a right edge of the mobile communication terminal.

* * * * *